United States Patent
Otoupalik et al.

(10) Patent No.: US 11,543,329 B2
(45) Date of Patent: Jan. 3, 2023

(54) DIAGNOSTIC SYSTEM OF MACHINES

(71) Applicant: 4DOT MECHATRONIC SYSTEMS S.R.O., Brno (CZ)

(72) Inventors: Jan Otoupalik, Strelice (CZ); Josef Burian, Stanoviste (CZ)

(73) Assignee: 4DOT Mechatronic Systems s.r.o., Brno (CZ)

(*) Notice: Subject to any disclaimer, the term of this patent is extended or adjusted under 35 U.S.C. 154(b) by 0 days.

(21) Appl. No.: 17/280,412

(22) PCT Filed: Sep. 26, 2019

(86) PCT No.: PCT/CZ2019/050039
§ 371 (c)(1),
(2) Date: Mar. 26, 2021

(87) PCT Pub. No.: WO2020/064033
PCT Pub. Date: Apr. 2, 2020

(65) Prior Publication Data
US 2022/0034756 A1    Feb. 3, 2022

(30) Foreign Application Priority Data
Sep. 30, 2018  (CZ) .............................. PV 2018-517

(51) Int. Cl.
*G06F 11/30*    (2006.01)
*G01M 99/00*    (2011.01)

(52) U.S. Cl.
CPC ............................ *G01M 99/005* (2013.01)

(58) Field of Classification Search
CPC .................................................. G01M 99/005
See application file for complete search history.

(56) References Cited

U.S. PATENT DOCUMENTS

| | | | |
|---|---|---|---|
| 2002/0103626 | A1 | 8/2002 | Zhao et al. |
| 2010/0284546 | A1 | 11/2010 | DeBrunner et al. |
| 2015/0025814 | A1 | 1/2015 | Giannini et al. |
| 2016/0334269 | A1* | 11/2016 | Hedin .................. G01H 1/003 |

FOREIGN PATENT DOCUMENTS

| | | | | |
|---|---|---|---|---|
| WO | | 2015187220 A2 | 12/2015 | |
| WO | WO-2015187220 A2 * | 12/2015 | ........... B64C 27/006 |

OTHER PUBLICATIONS

European Patent Office, International Search Report, dated Jan. 15, 2020, in PCT/2019/050039, filed Sep. 26, 2019.
European Patent Office, Written Opinion, dated Jan. 15, 2020, in PCT/2019/050039, filed Sep. 26, 2019.

* cited by examiner

*Primary Examiner* — Phuong Huynh
(74) *Attorney, Agent, or Firm* — Thedford I. Hitaffer; Hitaffer & Hitaffer, PLLC

(57) ABSTRACT

A method for performing technical diagnostics of machines is carried our by means of a diagnostic system of machines that employs at least two sensors to be placed on the machines, wherein the sensors are selected from the group of vibration sensors, strain sensors, position sensors, and distance sensors, and wherein measured data is evaluated by an evaluation process comprising a step of pairing the measured data and a step of comparing processed data with model states.

10 Claims, 48 Drawing Sheets

TIME POINT OF FORMING 1

TIME POINT OF FORMING 5

TIME POINT OF FORMING 7

TIME POINT OF FORMING 10

TIME POINT OF FORMING 15

TIME POINT OF FORMING 20

TIME POINT OF FORMING 25

TIME POINT OF FORMING 30

TIME POINT OF FORMING 35

TIME POINT OF FORMING 40

TIME POINT OF FORMING 43

TIME POINT OF FORMING 45

TIME POINT OF FORMING 50

The difference between the minimum and maximum of the strain gauge signal amplitudes processed with a low pass with a limit frequency of 100 Hz between the forming times 20 to 35

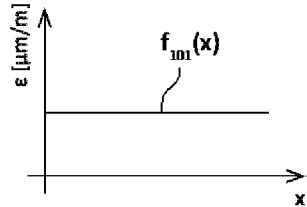

The difference between the minimum and maximum of the accelerometer signal amplitudes processed with a low pass with a limit frequency of 100 Hz between the forming times 20 to 35

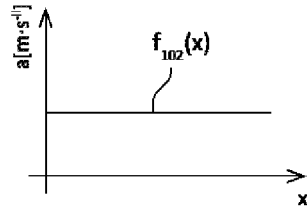

Effective value of an accelerometer signal processed with a high pass with a limit frequency of 20 kHz between the forming times of 20 to 35

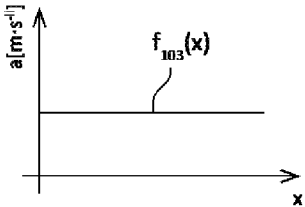

The difference between the minimum and maximum of the strain gauge signal amplitudes processed with a low pass with a limit frequency of 100 Hz between the forming times 0 to 50

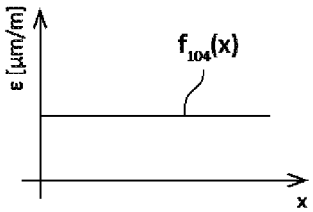

The difference between the minimum and maximum of the accelerometer signal amplitudes processed with a low pass with a limit frequency of 100 Hz between the forming times 0 to 50

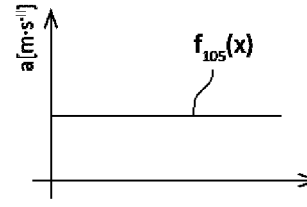

Effective value of an accelerometer signal processed with a high pass with a limit frequency of 20 kHz between the forming times of 0 to 50

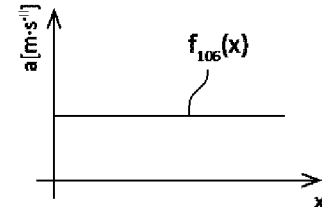

Fig. 25

The difference between the minimum and maximum of the strain gauge signal amplitudes processed with a low pass with a limit frequency of 100 Hz between the forming times 20 to 35

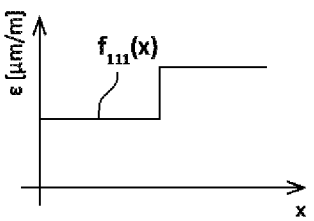

The difference between the minimum and maximum of the accelerometer signal amplitudes processed with a low pass with a limit frequency of 100 Hz between the forming times 20 to 35

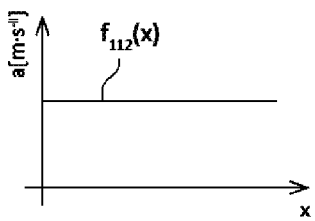

Effective value of an accelerometer signal processed with a high pass with a limit frequency of 20 kHz between the forming times of 20 to 35

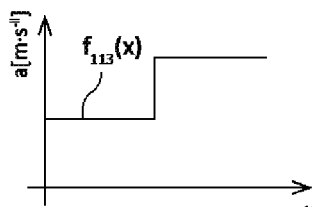

The difference between the minimum and maximum of the strain gauge signal amplitudes processed with a low pass with a limit frequency of 100 Hz between the forming times 0 to 50

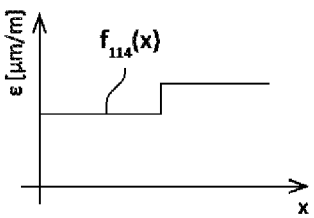

The difference between the minimum and maximum of the accelerometer signal amplitudes processed with a low pass with a limit frequency of 100 Hz between the forming times 0 to 50

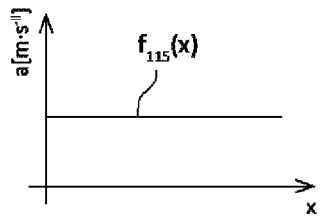

Effective value of an accelerometer signal processed with a high pass with a limit frequency of 20 kHz between the forming times of 0 to 50

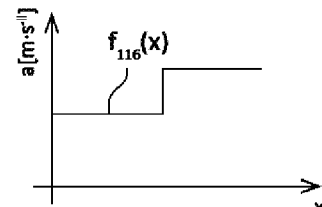

Fig. 26

The difference between the minimum and maximum of the strain gauge signal amplitudes processed with a low pass with a limit frequency of 100 Hz between the forming times 20 to 35

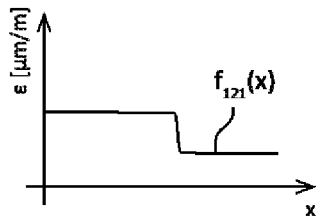

The difference between the minimum and maximum of the accelerometer signal amplitudes processed with a low pass with a limit frequency of 100 Hz between the forming times 20 to 35

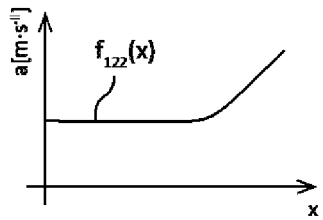

Effective value of an accelerometer signal processed with a high pass with a limit frequency of 20 kHz between the forming times of 20 to 35

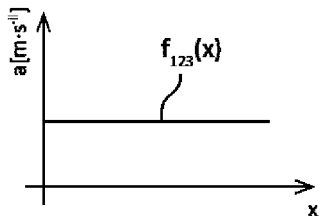

The difference between the minimum and maximum of the strain gauge signal amplitudes processed with a low pass with a limit frequency of 100 Hz between the forming times 0 to 50

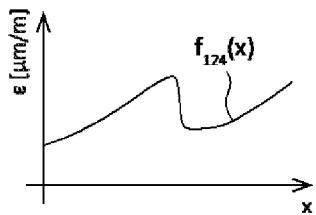

The difference between the minimum and maximum of the accelerometer signal amplitudes processed with a low pass with a limit frequency of 100 Hz between the forming times 0 to 50

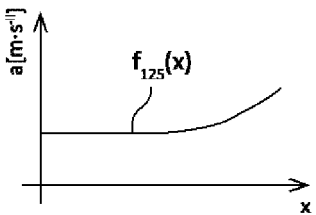

Effective value of an accelerometer signal processed with a high pass with a limit frequency of 20 kHz between the forming times of 0 to 50

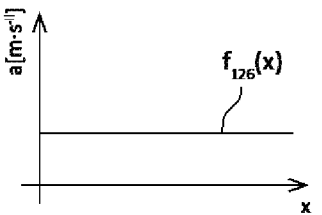

Fig. 27

The difference between the minimum and maximum of the strain gauge signal amplitudes processed with a low pass with a limit frequency of 100 Hz between the forming times 20 to 35

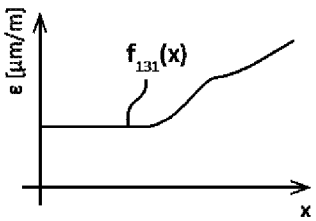

The difference between the minimum and maximum of the accelerometer signal amplitudes processed with a low pass with a limit frequency of 100 Hz between the forming times 20 to 35

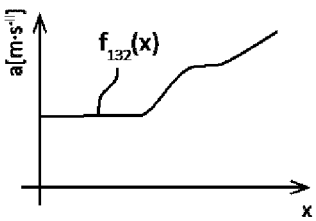

Effective value of an accelerometer signal processed with a high pass with a limit frequency of 20 kHz between the forming times of 20 to 35

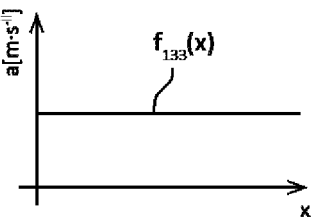

The difference between the minimum and maximum of the strain gauge signal amplitudes processed with a low pass with a limit frequency of 100 Hz between the forming times 0 to 50

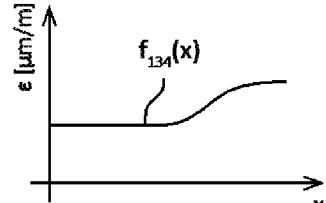

The difference between the minimum and maximum of the accelerometer signal amplitudes processed with a low pass with a limit frequency of 100 Hz between the forming times 0 to 50

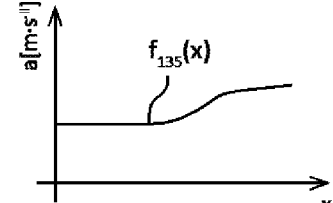

Effective value of an accelerometer signal processed with a high pass with a limit frequency of 20 kHz between the forming times of 0 to 50

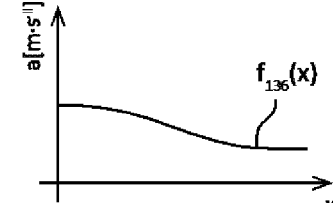

Fig. 28

The difference between the minimum and maximum of the strain gauge signal amplitudes processed with a low pass with a limit frequency of 100 Hz between the forming times 20 to 35

The difference between the minimum and maximum of the accelerometer signal amplitudes processed with a low pass with a limit frequency of 100 Hz between the forming times 20 to 35

Effective value of an accelerometer signal processed with a high pass with a limit frequency of 20 kHz between the forming times of 20 to 35

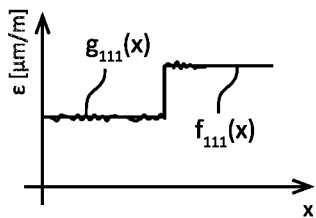
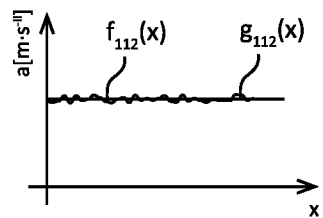
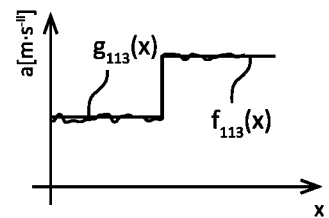

The difference between the minimum and maximum of the strain gauge signal amplitudes processed with a low pass with a limit frequency of 100 Hz between the forming times 0 to 50

The difference between the minimum and maximum of the accelerometer signal amplitudes processed with a low pass with a limit frequency of 100 Hz between the forming times 0 to 50

Effective value of an accelerometer signal processed with a high pass with a limit frequency of 20 kHz between the forming times of 0 to 50

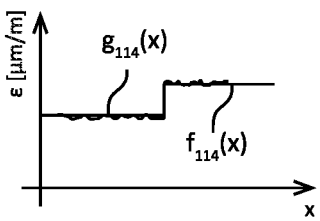
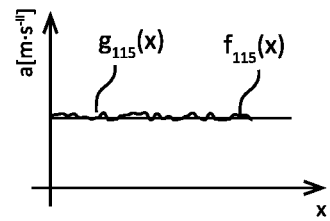
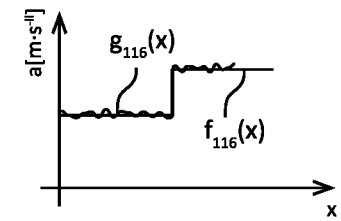

Fig. 29

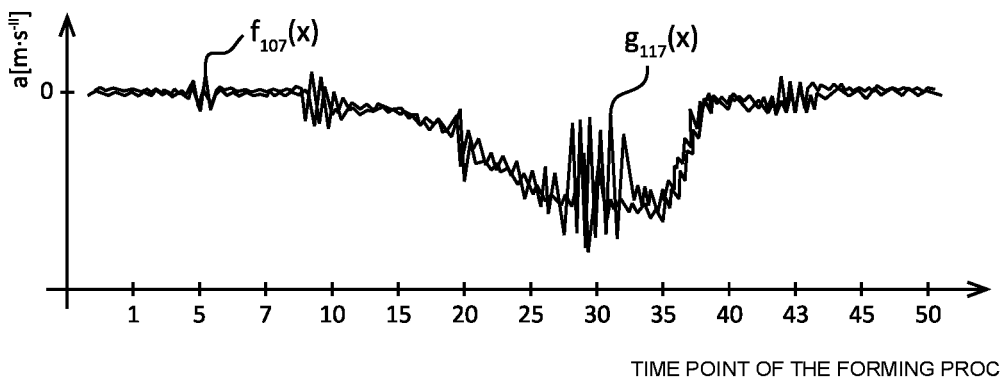

TIME POINT OF THE FORMING PROCESS

Fig. 30

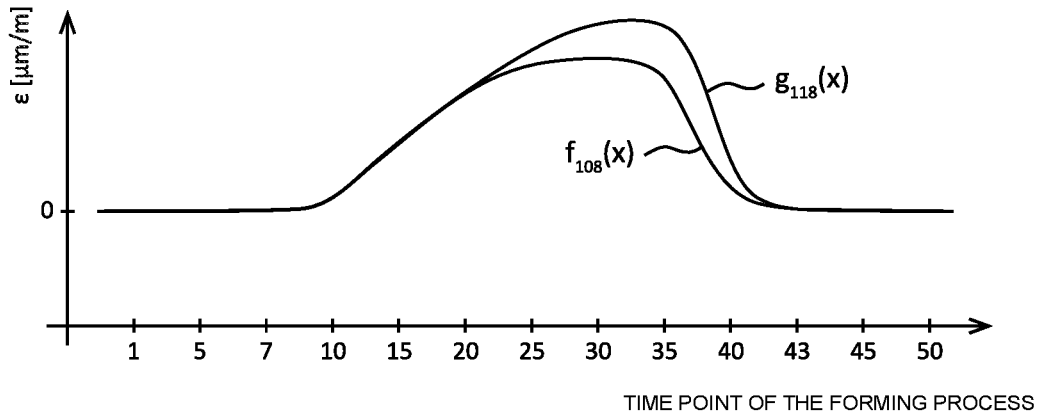

Fig. 31

The difference between the minimum and maximum of the strain gauge signal amplitudes processed with a low pass with a limit frequency of 100 Hz between the forming times 20 to 35

The difference between the minimum and maximum of the accelerometer signal amplitudes processed with a low pass with a limit frequency of 100 Hz between the forming times 20 to 35

Effective value of an accelerometer signal processed with a high pass with a limit frequency of 20 kHz between the forming times of 20 to 35

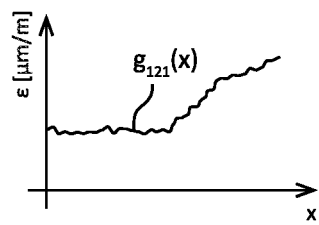 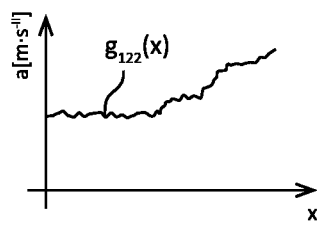 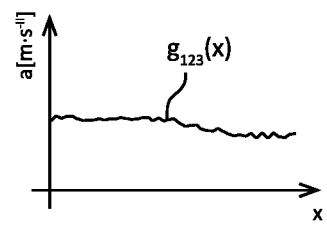

The difference between the minimum and maximum of the strain gauge signal amplitudes processed with a low pass with a limit frequency of 100 Hz between the forming times 0 to 50

The difference between the minimum and maximum of the accelerometer signal amplitudes processed with a low pass with a limit frequency of 100 Hz between the forming times 0 to 50

Effective value of an accelerometer signal processed with a high pass with a limit frequency of 20 kHz between the forming times of 0 to 50

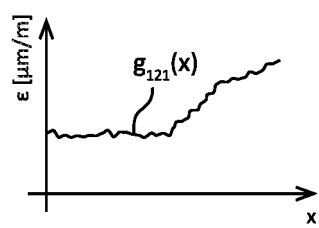 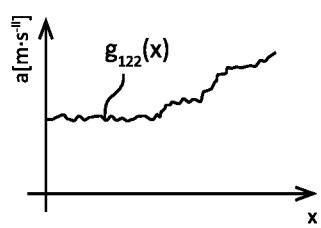 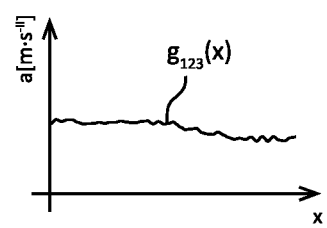

Fig. 32

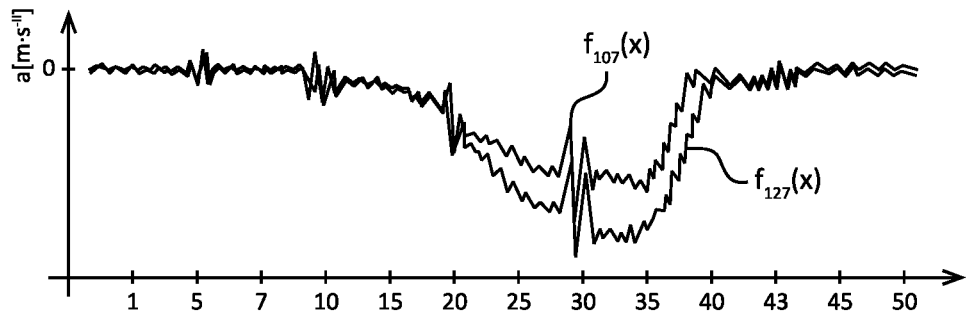

TIME POINT OF THE FORMING PROCESS

Fig. 33

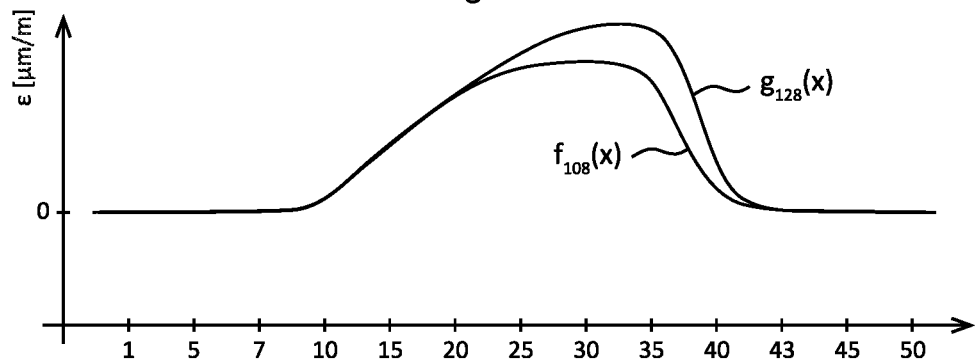

TIME POINT OF THE FORMING PROCESS

Fig. 34

| The difference between the minimum and maximum of the strain gauge signal amplitudes processed with a low pass with a limit frequency of 100 Hz between the forming times 20 to 35 | The difference between the minimum and maximum of the accelerometer signal amplitudes processed with a low pass with a limit frequency of 100 Hz between the forming times 20 to 35 | Effective value of an accelerometer signal processed with a high pass with a limit frequency of 20 kHz between the forming times of 20 to 35 |
|---|---|---|
| 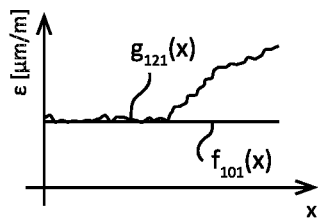 | 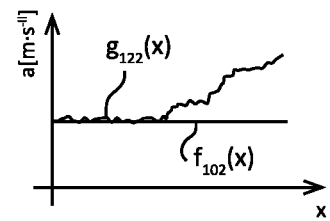 | 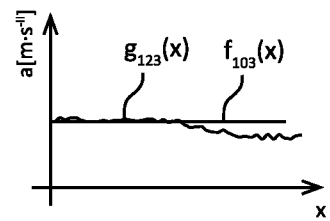 |
| The difference between the minimum and maximum of the strain gauge signal amplitudes processed with a low pass with a limit frequency of 100 Hz between the forming times 0 to 50 | The difference between the minimum and maximum of the accelerometer signal amplitudes processed with a low pass with a limit frequency of 100 Hz between the forming times 0 to 50 | Effective value of an accelerometer signal processed with a high pass with a limit frequency of 20 kHz between the forming times of 0 to 50 |
| 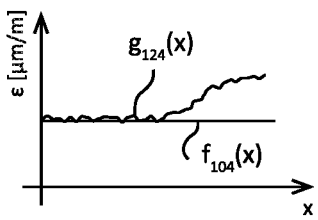 | 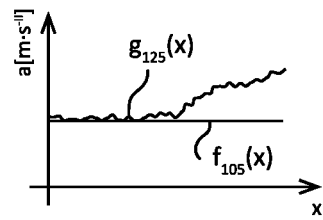 | 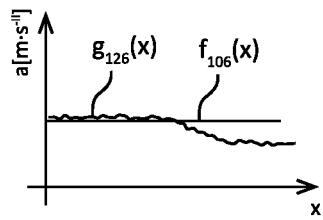 |

Fig. 35

The difference between the minimum and maximum of the strain gauge signal amplitudes processed with a low pass with a limit frequency of 100 Hz between the forming times 20 to 35

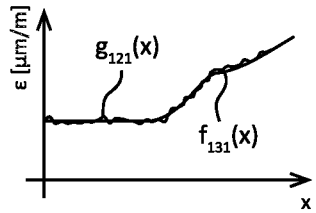

The difference between the minimum and maximum of the strain gauge signal amplitudes processed with a low pass with a limit frequency of 100 Hz between the forming times 0 to 50

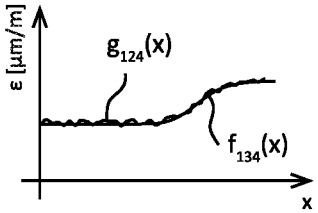

The difference between the minimum and maximum of the accelerometer signal amplitudes processed with a low pass with a limit frequency of 100 Hz between the forming times 20 to 35

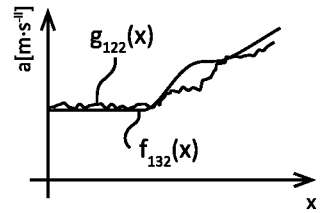

The difference between the minimum and maximum of the accelerometer signal amplitudes processed with a low pass with a limit frequency of 100 Hz between the forming times 0 to 50

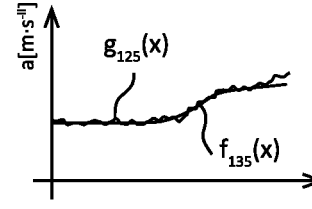

Effective value of an accelerometer signal processed with a high pass with a limit frequency of 20 kHz between the forming times of 20 to 35

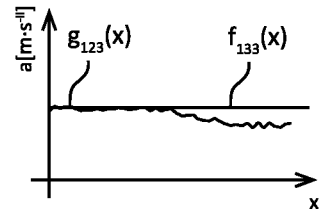

Effective value of an accelerometer signal processed with a high pass with a limit frequency of 20 kHz between the forming times of 0 to 50

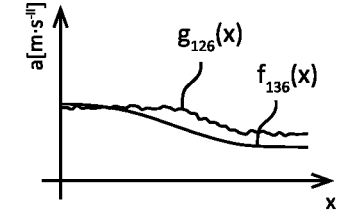

Fig. 36

The difference between the minimum and maximum of the strain gauge signal amplitudes processed with a low pass with a limit frequency of 100 Hz between the forming times 20 to 35

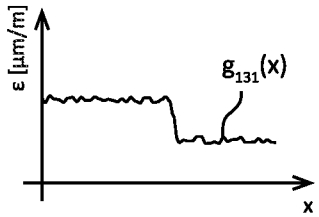

The difference between the minimum and maximum of the strain gauge signal amplitudes processed with a low pass with a limit frequency of 100 Hz between the forming times 0 to 50

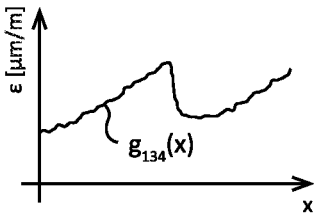

The difference between the minimum and maximum of the accelerometer signal amplitudes processed with a low pass with a limit frequency of 100 Hz between the forming times 20 to 35

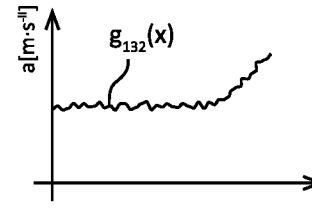

The difference between the minimum and maximum of the accelerometer signal amplitudes processed with a low pass with a limit frequency of 100 Hz between the forming times 0 to 50

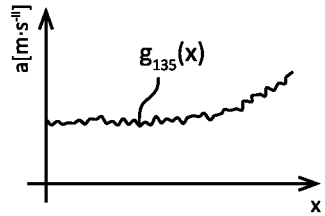

Effective value of an accelerometer signal processed with a high pass with a limit frequency of 20 kHz between the forming times of 20 to 35

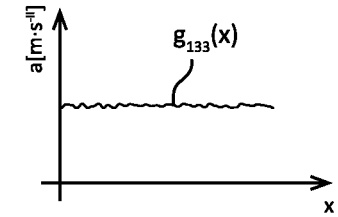

Effective value of an accelerometer signal processed with a high pass with a limit frequency of 20 kHz between the forming times of 0 to 50

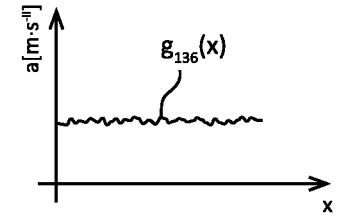

Fig. 37

The difference between the minimum and maximum of the strain gauge signal amplitudes processed with a low pass with a limit frequency of 100 Hz between the forming times 20 to 35

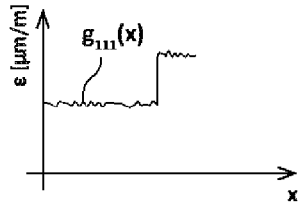

The difference between the minimum and maximum of the accelerometer signal amplitudes processed with a low pass with a limit frequency of 100 Hz between the forming times 20 to 35

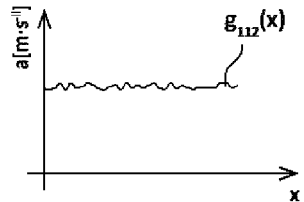

Effective value of an accelerometer signal processed with a high pass with a limit frequency of 20 kHz between the forming times of 20 to 35

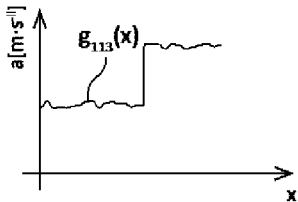

The difference between the minimum and maximum of the strain gauge signal amplitudes processed with a low pass with a limit frequency of 100 Hz between the forming times 0 to 50

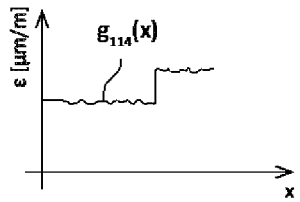

The difference between the minimum and maximum of the accelerometer signal amplitudes processed with a low pass with a limit frequency of 100 Hz between the forming times 0 to 50

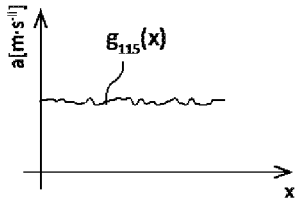

Effective value of an accelerometer signal processed with a high pass with a limit frequency of 20 kHz between the forming times of 0 to 50

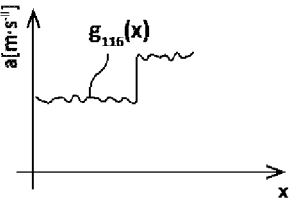

Fig. 40

The difference between the minimum and maximum of the strain gauge signal amplitudes processed with a low pass with a limit frequency of 100 Hz between the forming times 20 to 35

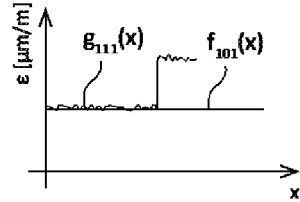

The difference between the minimum and maximum of the accelerometer signal amplitudes processed with a low pass with a limit frequency of 100 Hz between the forming times 20 to 35

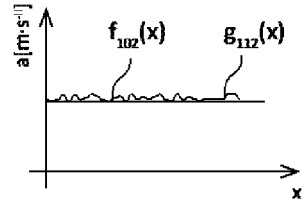

Effective value of an accelerometer signal processed with a high pass with a limit frequency of 20 kHz between the forming times of 20 to 35

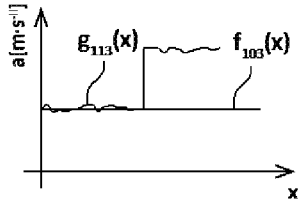

The difference between the minimum and maximum of the strain gauge signal amplitudes processed with a low pass with a limit frequency of 100 Hz between the forming times 0 to 50

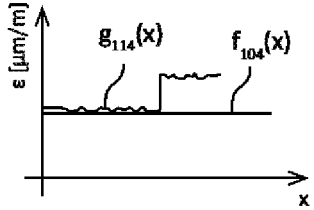

The difference between the minimum and maximum of the accelerometer signal amplitudes processed with a low pass with a limit frequency of 100 Hz between the forming times 0 to 50

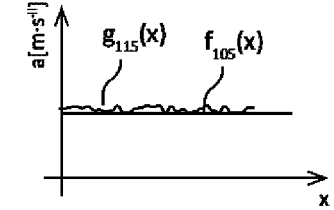

Effective value of an accelerometer signal processed with a high pass with a limit frequency of 20 kHz between the forming times of 0 to 50

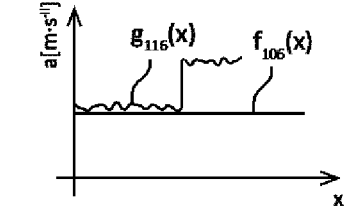

Fig. 41

The difference between the minimum and maximum of the accelerometer signal amplitudes processed with a low pass with a limit frequency of 100 Hz between the forming times 10 - 35

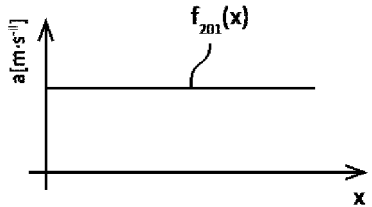

Effective value of an accelerometer signal processed with a high pass with a limit frequency of 20 kHz between the forming times of 10 - 35

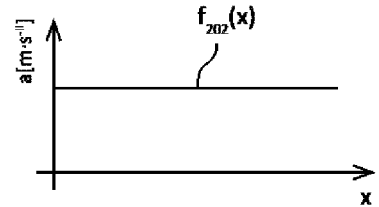

The difference between the minimum and maximum of the accelerometer signal amplitudes processed with a low pass with a limit frequency of 100 Hz between the forming times 7 - 43

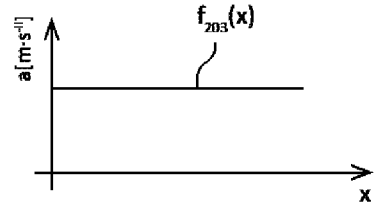

Effective value of an accelerometer signal processed with a high pass with a limit frequency of 20 kHz between the forming times of 7 - 43

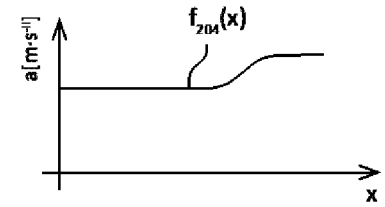

The difference between the minimum and maximum of the accelerometer signal amplitudes processed with a low pass with a limit frequency of 100 Hz between the forming times 1 - 7

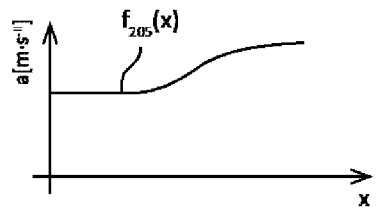

Effective value of an accelerometer signal processed with a high pass with a limit frequency of 20 kHz between the forming times of 1 - 7

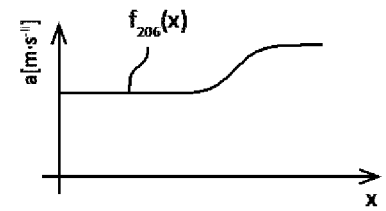

Fig. 49

The difference between the minimum and maximum of the accelerometer signal amplitudes processed with a low pass with a limit frequency of 100 Hz between the forming times 10 - 35

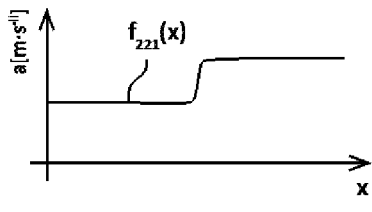

Effective value of an accelerometer signal processed with a high pass with a limit frequency of 20 kHz between the forming times of 10 - 35

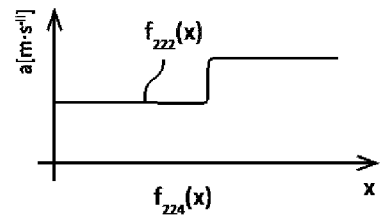

The difference between the minimum and maximum of the accelerometer signal amplitudes processed with a low pass with a limit frequency of 100 Hz between the forming times 7 - 43

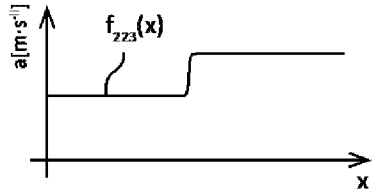

Effective value of an accelerometer signal processed with a high pass with a limit frequency of 20 kHz between the forming times of 7 - 43

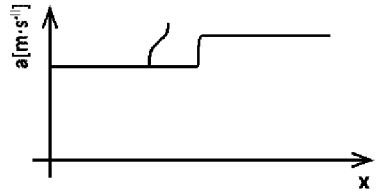

The difference between the minimum and maximum of the accelerometer signal amplitudes processed with a low pass with a limit frequency of 100 Hz between the forming times 1 - 7

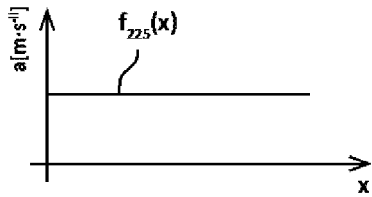

Effective value of an accelerometer signal processed with a high pass with a limit frequency of 20 kHz between the forming times of 1 - 7

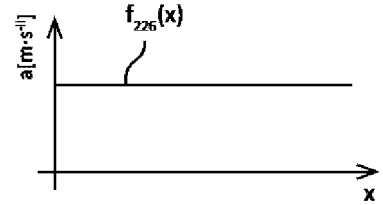

Fig. 50

The difference between the minimum and maximum of the accelerometer signal amplitudes processed with a low pass with a limit frequency of 100 Hz between the forming times 10 - 35

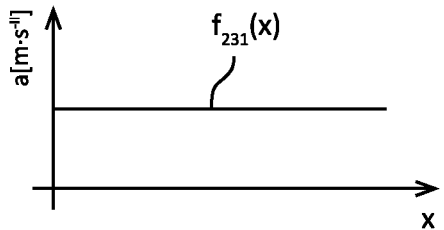

Effective value of an accelerometer signal processed with a high pass with a limit frequency of 20 kHz between the forming times of 10 - 35

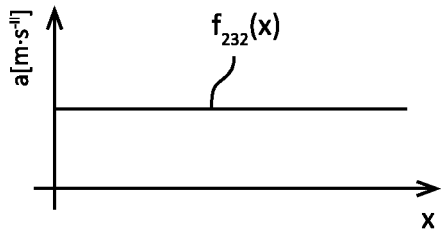

The difference between the minimum and maximum of the accelerometer signal amplitudes processed with a low pass with a limit frequency of 100 Hz between the forming times 7 - 43

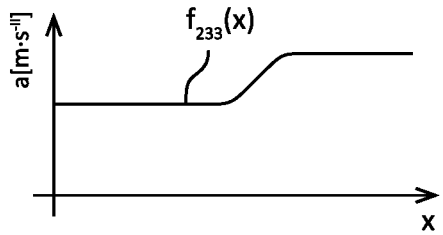

Effective value of an accelerometer signal processed with a high pass with a limit frequency of 20 kHz between the forming times of 7 - 43

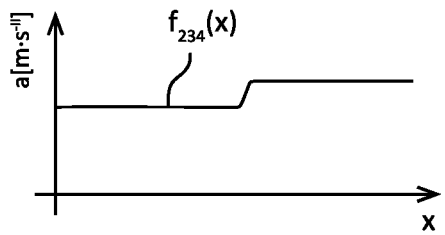

The difference between the minimum and maximum of the accelerometer signal amplitudes processed with a low pass with a limit frequency of 100 Hz between the forming times 1 - 7

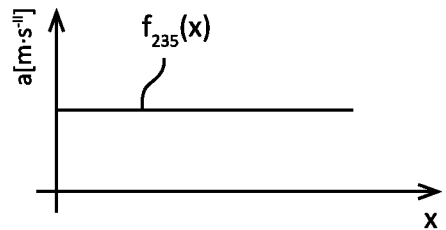

Effective value of an accelerometer signal processed with a high pass with a limit frequency of 20 kHz between the forming times of 1 - 7

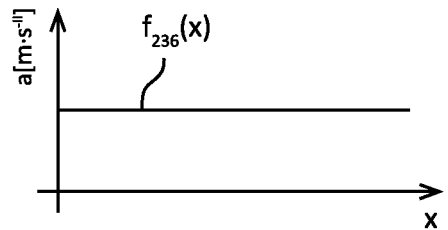

Fig. 51

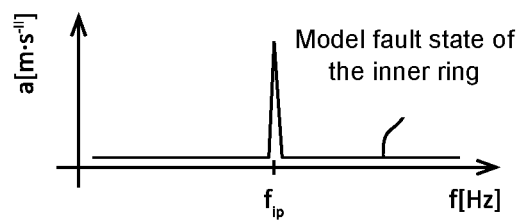

Fig. 52

The difference between the minimum and maximum of the accelerometer signal amplitudes processed with a low pass with a limit frequency of 100 Hz between the forming times 10 - 35

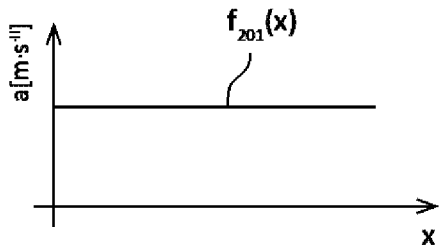

Effective value of an accelerometer signal processed with a high pass with a limit frequency of 20 kHz between the forming times of 10 – 35

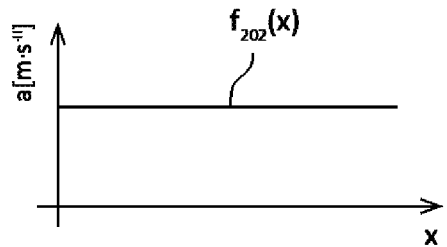

The difference between the minimum and maximum of the accelerometer signal amplitudes processed with a low pass with a limit frequency of 100 Hz between the forming times 7 - 43

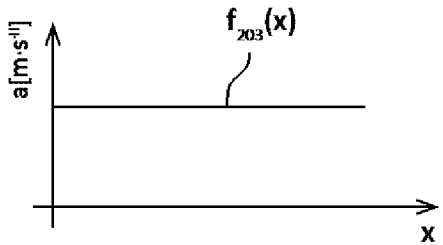

Effective value of an accelerometer signal processed with a high pass with a limit frequency of 20 kHz between the forming times of 7 - 43

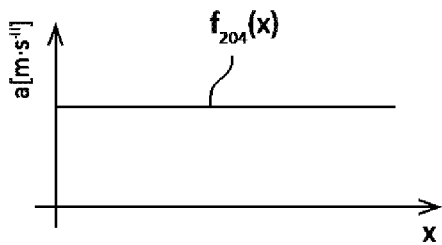

The difference between the minimum and maximum of the accelerometer signal amplitudes processed with a low pass with a limit frequency of 100 Hz between the forming times 1 - 7

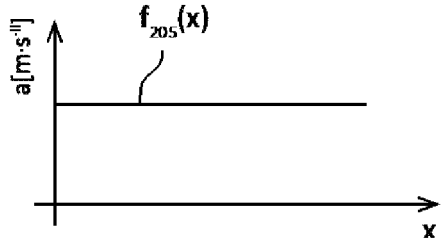

Effective value of an accelerometer signal processed with a high pass with a limit frequency of 20 kHz between the forming times of 1 – 7

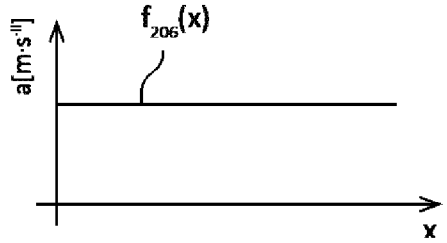

Fig. 61

The difference between the minimum and maximum of the accelerometer signal amplitudes processed with a low pass with a limit frequency of 100 Hz between the forming times 10 - 35

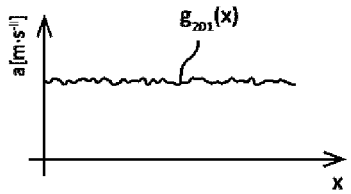

Effective value of an accelerometer signal processed with a high pass with a limit frequency of 20 kHz between the forming times of 10 – 35

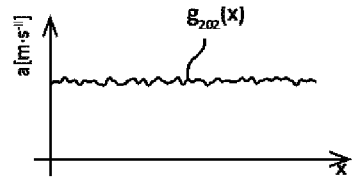

The difference between the minimum and maximum of the accelerometer signal amplitudes processed with a low pass with a limit frequency of 100 Hz between the forming times 7 - 43

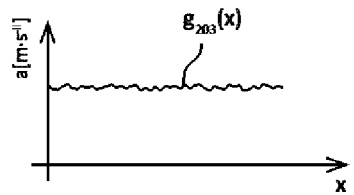

Effective value of an accelerometer signal processed with a high pass with a limit frequency of 20 kHz between the forming times of 7 - 43

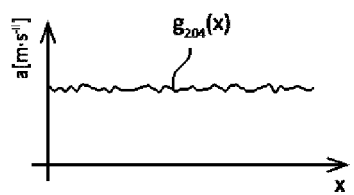

The difference between the minimum and maximum of the accelerometer signal amplitudes processed with a low pass with a limit frequency of 100 Hz between the forming times 1 - 7

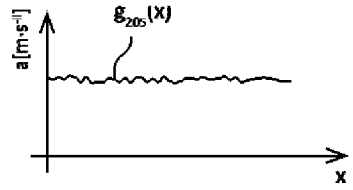

Effective value of an accelerometer signal processed with a high pass with a limit frequency of 20 kHz between the forming times of 1 – 7

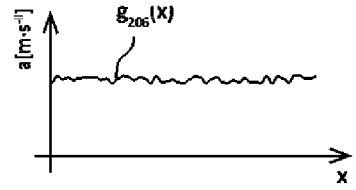

Fig. 62

The difference between the minimum and maximum of the accelerometer signal amplitudes processed with a low pass with a limit frequency of 100 Hz between the forming times 10 - 35

Effective value of an accelerometer signal processed with a high pass with a limit frequency of 20 kHz between the forming times of 10 – 35

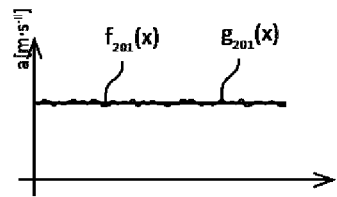
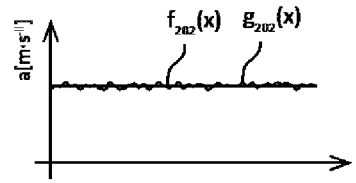

The difference between the minimum and maximum of the accelerometer signal amplitudes processed with a low pass with a limit frequency of 100 Hz between the forming times 7 - 43

Effective value of an accelerometer signal processed with a high pass with a limit frequency of 20 kHz between the forming times of 7 - 43

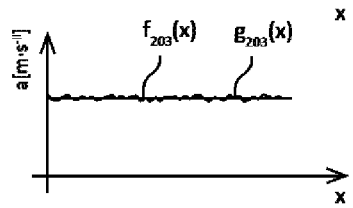
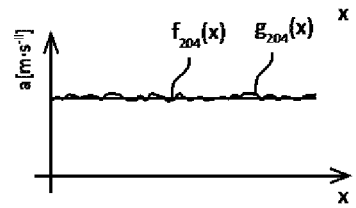

The difference between the minimum and maximum of the accelerometer signal amplitudes processed with a low pass with a limit frequency of 100 Hz between the forming times 1 – 7

Effective value of an accelerometer signal processed with a high pass with a limit frequency of 20 kHz between the forming times of 1 – 7

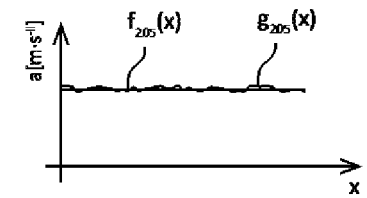
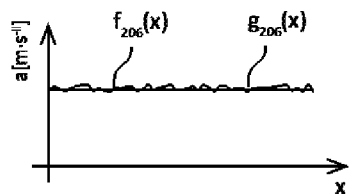

Fig. 63

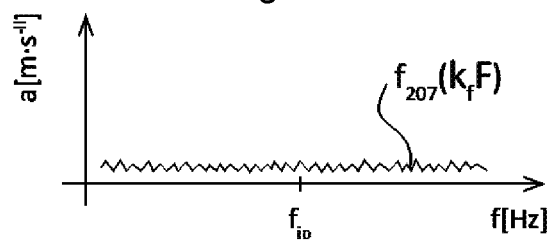

Fig. 64

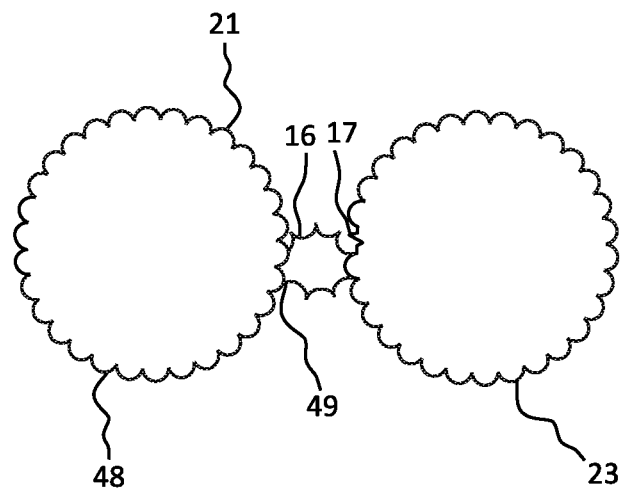
Fig. 68
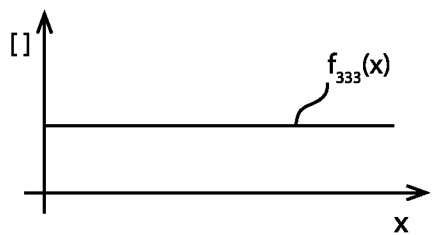
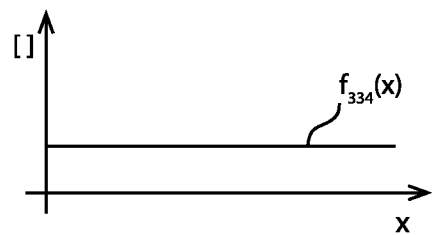
Fig. 69
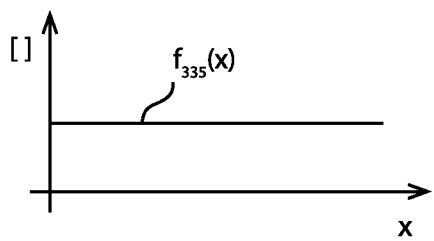
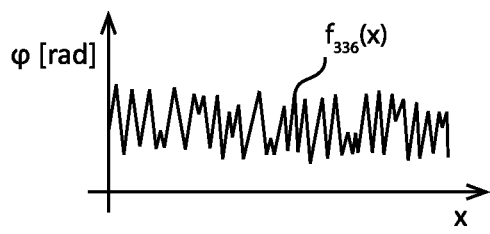
Fig. 70

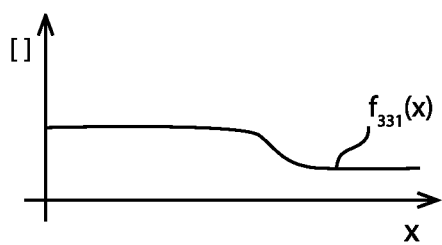
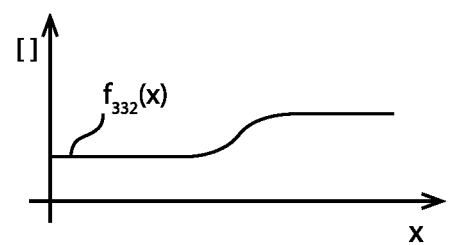
Fig. 71
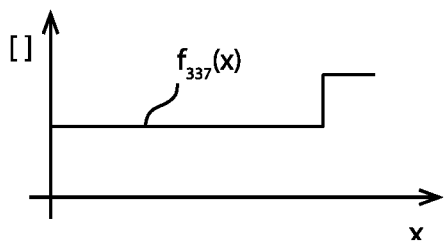
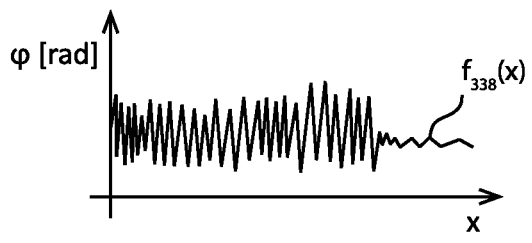
Fig. 72

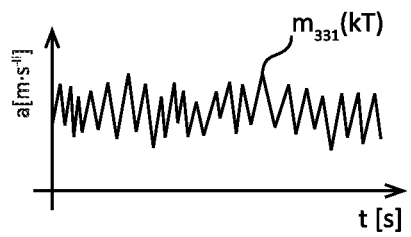
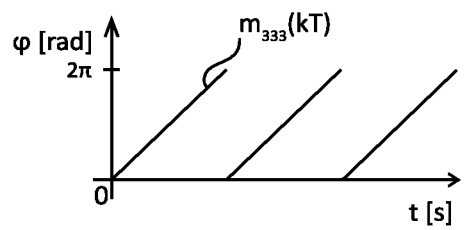
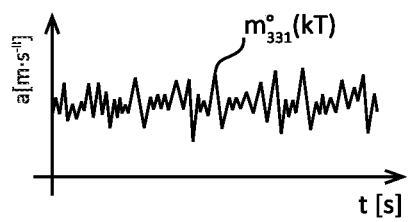
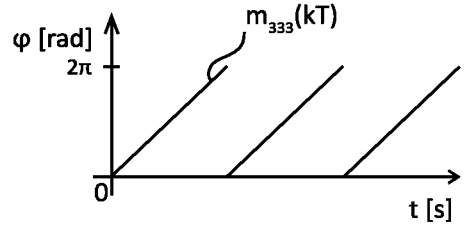
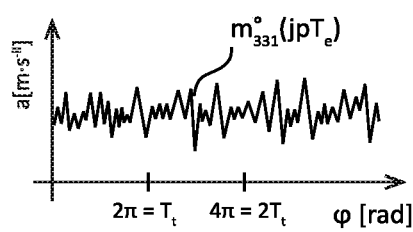
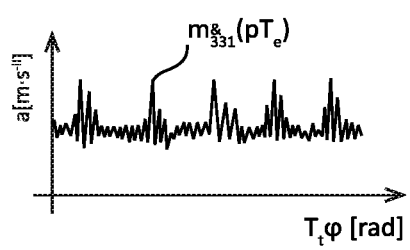
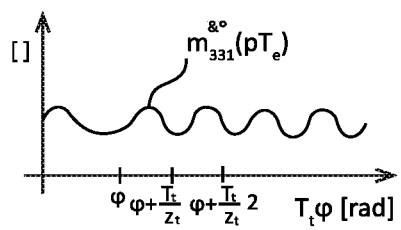
Fig. 73

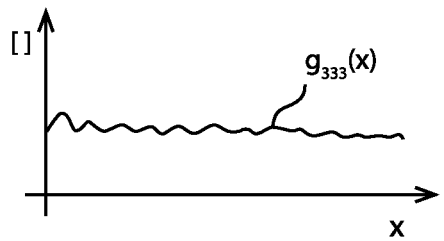 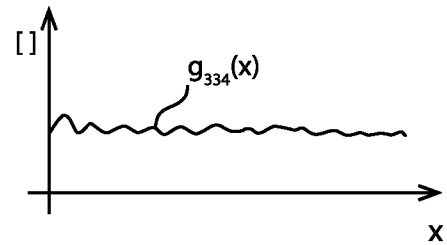
Fig. 75
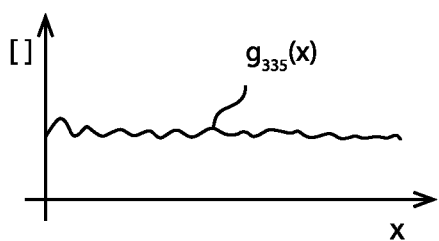 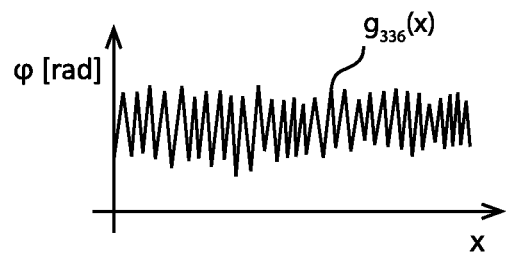
Fig. 76
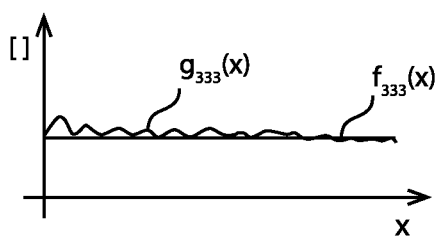 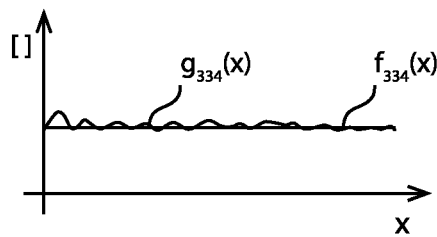
Fig. 77
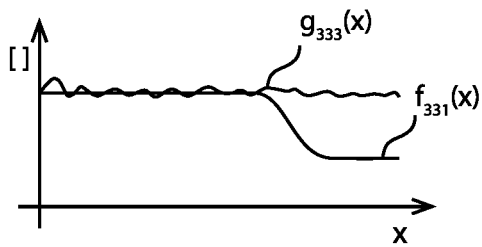 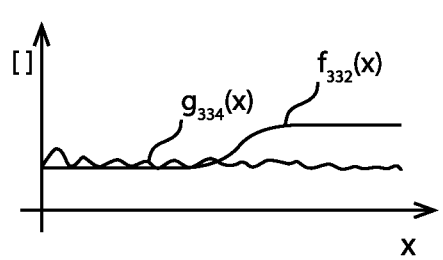
Fig. 78

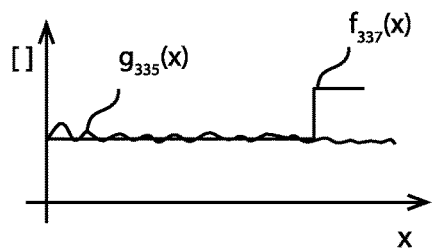
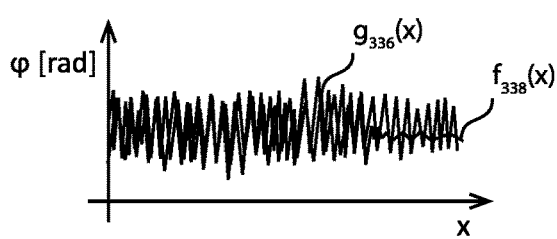
Fig. 79
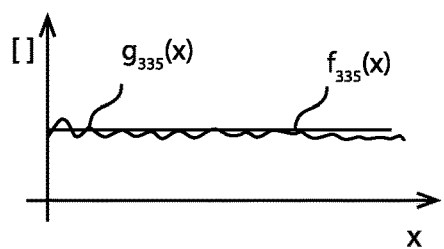
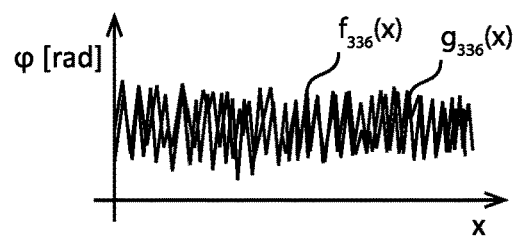
Fig. 80
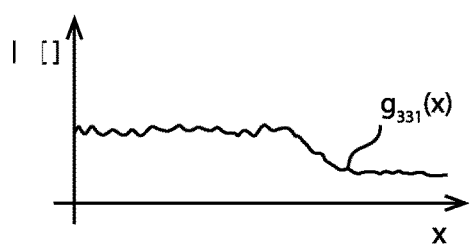
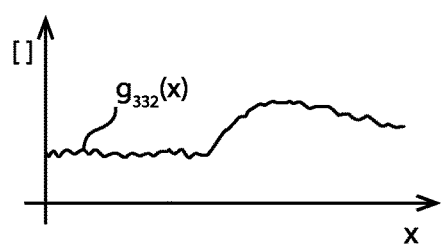
Fig. 81
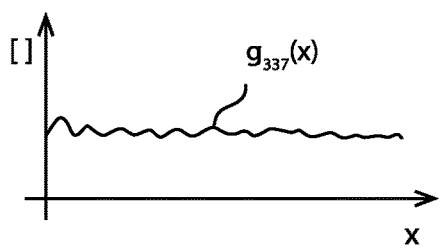
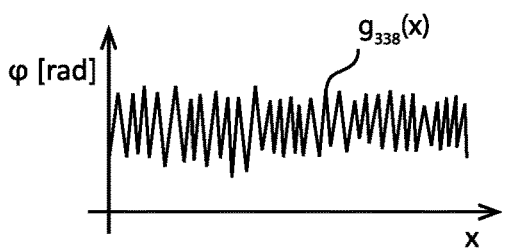
Fig. 82

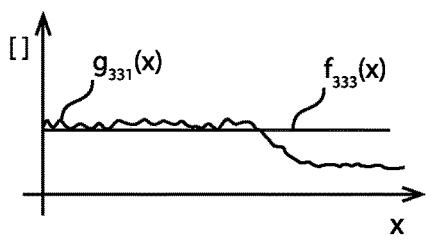 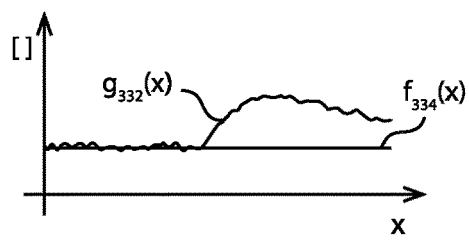
Fig. 83
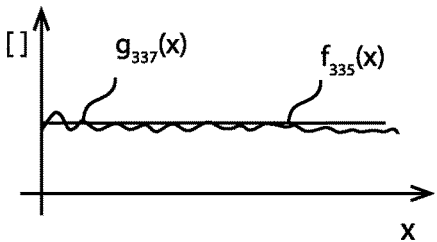 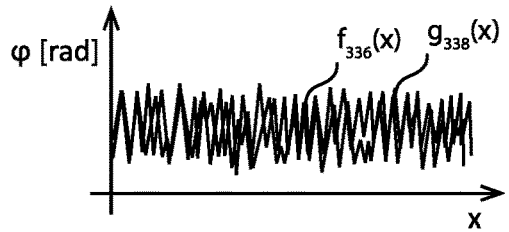
Fig. 84
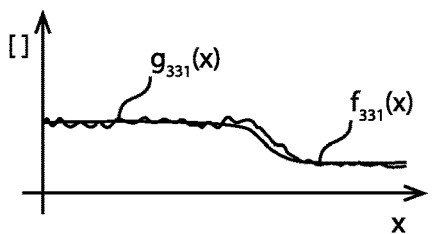 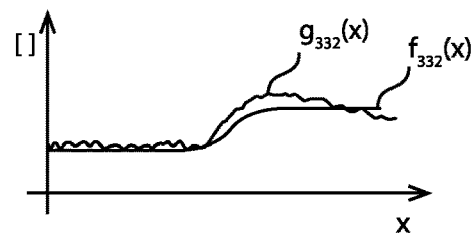
Fig. 85
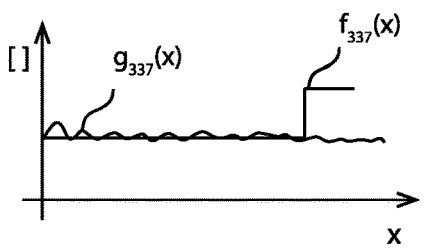 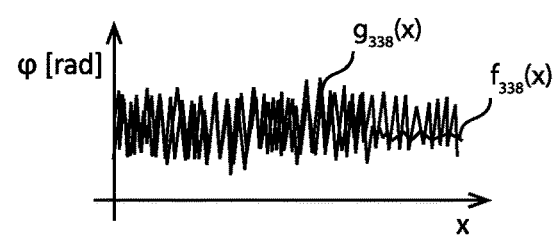
Fig. 86
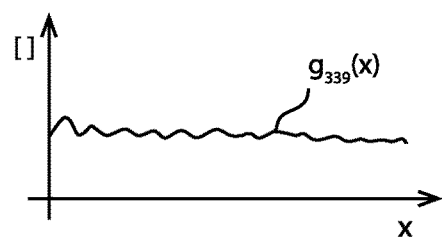 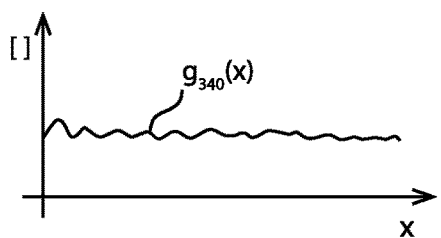
Fig. 87

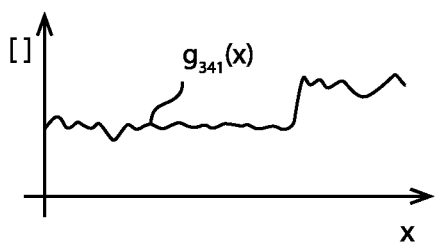 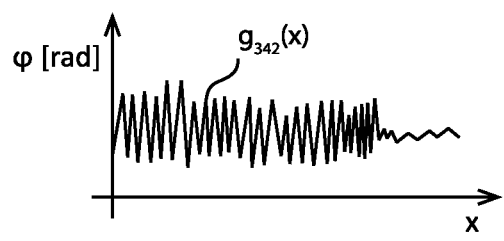
Fig. 88
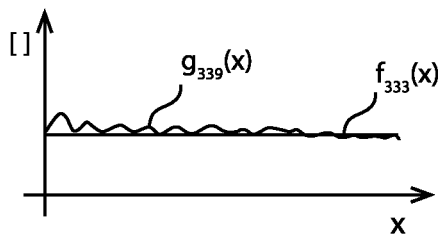 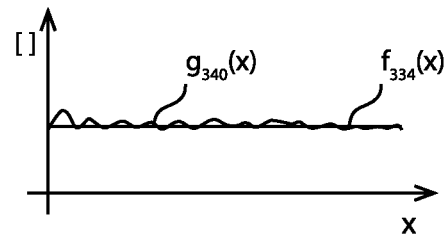
Fig. 89
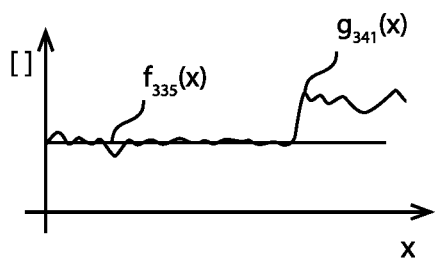 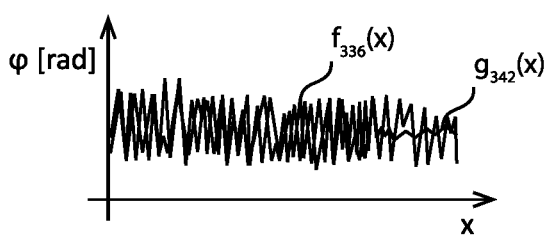
Fig. 90
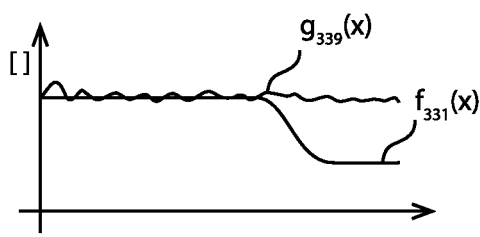 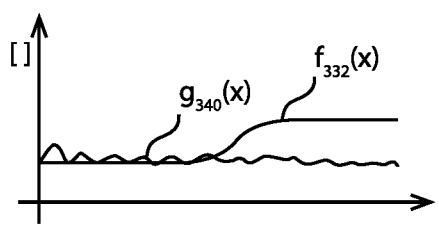
Fig. 91

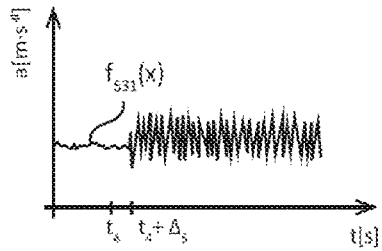 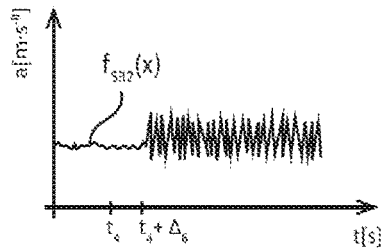 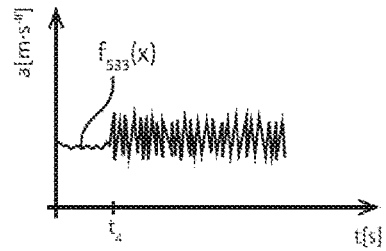
Fig. 109
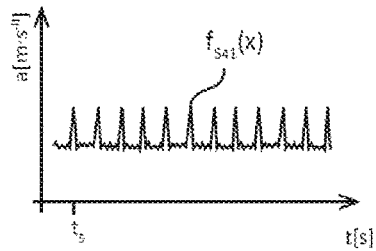 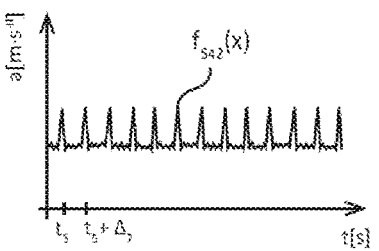 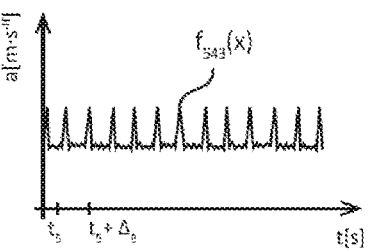
Fig. 110
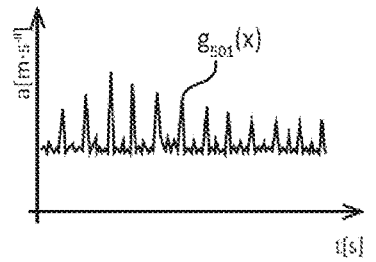 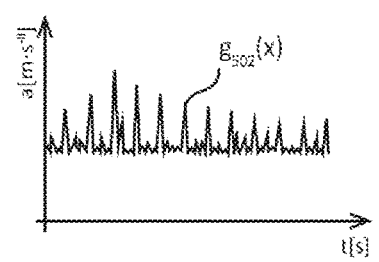 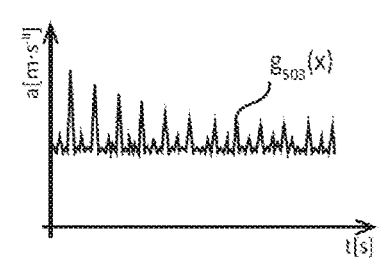
Fig. 111
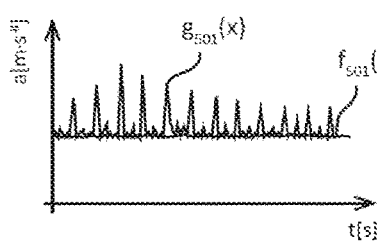 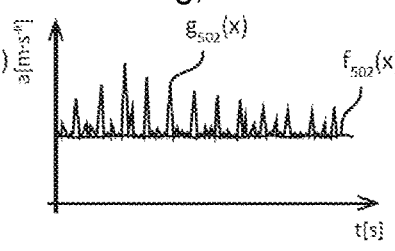 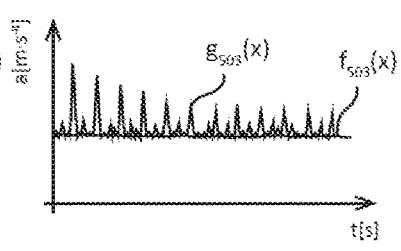
Fig. 112
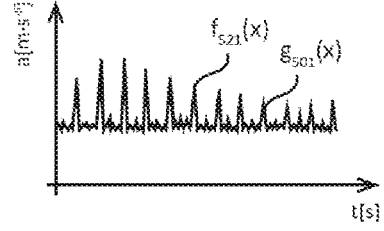 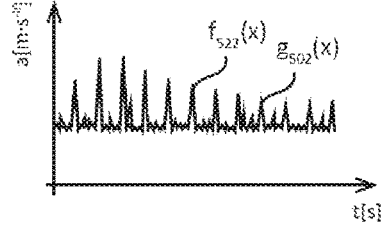 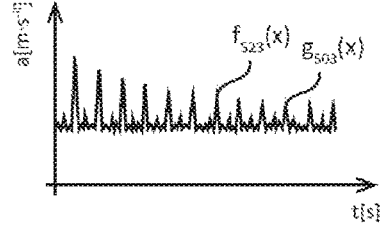
Fig. 113

DIAGNOSTIC SYSTEM OF MACHINES

CROSS-REFERENCE TO RELATED APPLICATIONS

This application, filed under 35 USC 371, is a United States National Stage Application of International Application No. PCT/CZ2019/050039, filed Sep. 26, 2019, which claims priority to CZ Application No. PV 2018-517, filed on Sep. 30, 2018, the disclosures of which are incorporated herein by reference.

FIELD OF THE INVENTION

The invention relates to a diagnostic system of machines, for the use in reducing the risk of machine damage, increasing the use of machines, reducing the risk of deviations on products, increasing productivity and process monitoring.

BACKGROUND OF THE INVENTION

During operation of machines, different forces can be applied which can cause significant deformations of machine parts. During operation, high vibration due to different processes during operation can occur. For this reason, it is advisable to use diagnostic systems to measure physical quantities acting on different parts of machines.

Systems utilizing different types of sensors as protective members are known in the art. The sensors measure only exceeding the limit value and thus do not allow diagnostics of the machines.

In addition, diagnostic systems using various types of sensors are known, with individual types of sensors being used to measure certain phenomena and the fault states resulting therefrom. However, this solution is inappropriate, since fault states can be detected incorrectly due to fault recognition only on the basis of data measured by one type of sensors.

It would therefore be advantageous to provide a diagnostic system, which would allow a sufficiently precise evaluation of the various fault states of parts of the machines, optionally tools of the machines or the product. At the same time, the solution should allow identification of various stages of the machine operation. Present solution should also allow identification of new, previously unknown, fault states and their storage in a set of model states.

SUMMARY OF THE INVENTION

The above mentioned drawbacks are eliminated by a method of performing technical diagnostics of machines by means of a diagnostic system of machines comprising an information interface and a control part, the control part comprising a memory, characterized in that the diagnostic system of a machine further comprises at least two sensors for positioning on the machine selected from a group of vibration sensors, strain sensors, position sensors and distance sensors, in the memory of the control part is further stored a model fault-free state comprising waveforms corresponding to waveforms and quantities measured by at least two selected sensors in fault-free operation, and further stored in the memory of the control part is at least a first model fault state and a second model fault state, both the first model fault state and the second model fault state comprising waveforms corresponding to waveforms and quantities measured by at least two selected sensors during a fault state during operation, following measurement, measured data from the sensors are sent to the control part, subsequently the measured data from the at least two selected sensors in the control part are processed by an evaluation process comprising a step of pairing the measured data so that the data from individual sensors correspond time wise to each other, the processed data being subsequently compared to the model states in the control part, and on the basis of this comparison the control part on an information interface will issue an information that the machine is in a fault-free state or in at least one of the model fault states. The above described method of performing mechanical diagnostics of machines by means of a diagnostics system for machines with at least two sensors, the measured data of which are further processed by the evaluation process including the step of pairing the measured data, allows to achieve a goal of sufficiently accurate evaluation of various fault states, as using the data processed in this manner it is possible to identify fault states that could not be identified using data measured by only one sensor or using data measured by multiple sensors but without the step of pairing the measured data, since the evaluation takes into account data measured by all sensors.

If the processed data do not correspond to the model fault-free state and at the same time do not correspond to any model fault state, the control part will issue information to the information interface that the machine is in an unknown state. An evaluation that this is an unknown state helps to achieve the goal of identifying unknown states, as this state can be identified and saved as a new model state by the user interface.

The evaluation process further comprises a step of data modification using a transmission function. The step of data modification with the transmission function allows for the impact removal of individual sensors location in case the location of the sensors is different from the location of the sensors for which the model states waveforms were determined.

The diagnostic system further comprises at least one temperature sensor and the evaluation process further comprises a step of performing temperature compensation of data measured by sensors selected from the group of vibration sensors, strain sensors and distance sensors and position sensors, wherein the temperature compensation is performed on the basis of data measured by the temperature sensor. By temperature compensation of the data measured by sensors other than temperature sensor, it is possible to eliminate the effect of changing ambient temperature of the sensors, thereby increasing the accuracy of evaluation of various fault states of parts of machine, tools, or formed products.

The evaluation process further comprises a step of filtering the processed data, wherein the data from at least one sensor are used to set filter parameters for filtering data from at least one sensor. Using data from one sensor to set filter parameters for filtering data from at least one sensor allows for more accurate identification of the relevant data portion.

The diagnostics system for machines comprises an information interface and a control part, the control part comprising a memory, characterized in that the diagnostic system of the machines further comprises at least two sensors for placing on a machine selected from the group of vibration sensors, strain sensors, position sensors and distance sensors, further stored in the memory of the control part is a fault-free state comprising waveforms corresponding to the waveforms and quantities measured by at least two selected sensors in fault-free operation, and further stored in the memory of the control part are at least the first model fault state and the second model fault state, wherein both the first model fault state and the second model fault state include waveforms corresponding to waveforms and quantities measured by at least two selected sensors in case of a fault during operation. The use of the diagnostics system for machines allows achieving the goal of sufficiently accurate evaluation of various fault states, as it is possible to identify fault states by means of two sensors, which would not be possible to determine using data measured by only one sensor.

The machine can be a production machine.

The machine can be a vehicle.

If the machine is a production machine, the model fault-free state is a model fault-free state of at least one member of the group consisting of a machine part, tool, or product.

If the machine is a production machine, the model fault state is any model fault state selected from the group of a model fault state of a machine part, a model fault state of a tool or a model fault state of the product.

If the machine is a vehicle, the model fault-free state is a model fault-free state of a machine part.

If the machine is a vehicle, model fault state is a model fault state of a machine part. The control part includes a monitoring unit and a remote server, the sensors being data connected to the monitoring unit and the monitoring unit being data connected to the remote server.

In one case, at least one of the sensors is a vibration sensor and at least one other sensor is a position sensor.

In one case, at least one of the sensors is a vibration sensor and at least one other sensor is a strain sensor.

In one case, at least two sensors are vibration sensors.

In one case, the sensors are thin-walled sensors.

The position sensor is a linear encoder or a rotary encoder.

At least one of the sensors is a temperature sensor, wherein the temperature is located in close proximity to at least one sensor of another type. By using the temperature sensor, it is possible to perform temperature compensation of data measured by sensors of another type.

DESCRIPTION OF DRAWINGS

The invention is further explained with the use of exemplary embodiments, which are described by means of the accompanying drawings, wherein:

FIG. 25 shows a model fault-free state.

FIG. 26 shows a model fault state of higher ductile resistance of the formed blank.

FIG. 27 shows a model fault state of a crack in a clamp.

FIG. 28 shows a model fault state of a crack in a frame.

FIG. 29 shows a comparison of the processed data of the first specific exemplary embodiment and the model fault state of the higher ductile resistance of the formed blank.

FIG. 30 shows vibration waveforms when comparing the processed data of the first specific exemplary embodiment and the model fault-free state.

FIG. 31 shows strain waveforms when comparing the processed data of the first specific exemplary embodiment and the model fault-free state.

FIG. 32 shows processed data of the second specific exemplary embodiment.

FIG. 33 shows vibration waveforms when comparing the processed data of the second specific exemplary embodiment and the model fault-free state.

FIG. 34 shows strain waveforms when comparing the processed data of the second specific exemplary embodiment and the model fault-free state.

FIG. 35 shows a comparison of the processed data of the second specific exemplary embodiment and the model fault state.

FIG. 36 shows a comparison of the processed data of the second specific exemplary embodiment and the model fault state of a crack in a frame.

FIG. 37 shows processed data of the third specific exemplary embodiment.

FIG. 40 shows processed data of the first specific exemplary embodiment.

FIG. 41 shows a comparison of the processed data of the first specific exemplary embodiment and the model fault state.

FIG. 49 shows a model fault state of a guide clearance.

FIG. 50 shows a model fault state of a die clearance.

FIG. 51 shows a model fault state of a clamp clearance.

FIG. 52 shows a model fault state of an inner bearing ring in the frequency domain.

FIG. 61 shows a model fault-free state.

FIG. 62 shows processed data of the fifth specific exemplary embodiment.

FIG. 63 shows a comparison of the processed data of the fifth specific exemplary embodiment and the model fault-free state.

FIG. 64 shows the model fault-free state in the frequency domain.

FIG. 68 shows a sectional view of a rolling machine with two tools.

FIG. 69 shows a model fault-free state of a rolling machine.

FIG. 70 shows a model fault-free state of a rolling machine.

FIG. 71 shows a model fault state of tool tooth damage.

FIG. 72 shows a model fault state of a crack in a blank.

FIG. 73 shows the processing of simulated data in a fault state of tool tooth damage.

FIG. 75 shows processed data of the seventh specific exemplary embodiment.

FIG. 76 shows processed data of the seventh specific exemplary embodiment.

FIG. 77 shows a comparison of the processed data of the seventh specific exemplary embodiment and the model fault-free state of the rolling machine.

FIG. 78 shows a comparison of the processed data of the seventh specific exemplary embodiment and the model fault state of tool tooth damage.

FIG. 79 shows a comparison of the processed data of the seventh specific exemplary embodiment and the model fault state of a crack in a blank.

FIG. 80 shows a comparison of the processed data of the seventh specific exemplary embodiment and the model fault-free state of the rolling machine.

FIG. 81 shows processed data of the eighth specific exemplary embodiment.

FIG. 82 shows processed data of the eighth specific exemplary embodiment.

FIG. 83 shows a comparison of the processed data of the eighth specific exemplary embodiment and the model fault-free state.

FIG. 84 shows a comparison of the processed data of the eighth specific exemplary embodiment and the model fault-free state.

FIG. 85 shows a comparison of the processed data of the eighth specific exemplary embodiment and the model fault state of tool tooth damage.

FIG. 86 shows a comparison of the processed data of the eighth specific exemplary embodiment and the model fault state of a crack in a blank.

FIG. 87 shows processed data of the ninth specific exemplary embodiment.

FIG. 88 shows processed data of the ninth specific exemplary embodiment.

FIG. 89 shows a comparison of the processed data of the ninth specific exemplary embodiment and the model fault-free state of the rolling machine.

FIG. 90 shows a comparison of the processed data of the ninth specific exemplary embodiment and the model fault-free state of the rolling machine.

FIG. 91 shows a comparison of the processed data of the ninth specific exemplary embodiment and the model fault state of tool tooth damage.

FIG. 109 shows a model fault state of a third axle break.

FIG. 110 shows a model fault state of a gear transmission.

FIG. 111 shows processed data of eleventh specific exemplary embodiment.

FIG. 112 shows a comparison of processed data of eleventh exemplary embodiment and fault-free state of a vehicle.

FIG. 113 shows a comparison of processed data of eleventh exemplary embodiment and fault state of the third axle bearing.

EXEMPLARY EMBODIMENTS OF THE INVENTION

Figure 1:
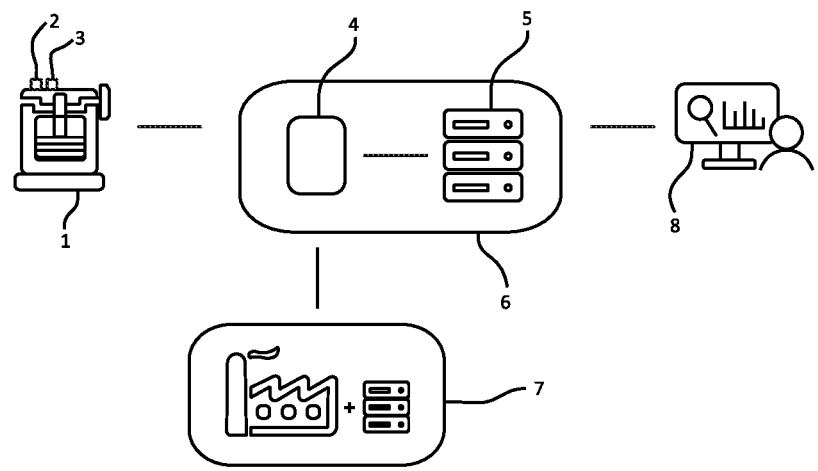
FIG. 1 shows a diagnostics system for machines on a machine.

An example of the invention is a diagnostic system of machines. Machines are either production machines or vehicles. The production machine is any production machine from the group of forming machines, machine-tools, or any other production machines. Vehicle is any vehicle from the group of land vehicles, air vehicles, water vehicles, and rail vehicles.

The diagnostics system of machines comprises at least two sensors placed on the machine. The sensors are selected from a group of vibration sensors, strain sensors, distance sensors and position sensors. The vibration sensor is an accelerometer. In this exemplary embodiment of the vibration sensor, the vibration sensor used is a piezoelectric accelerometer with integrated electronics. Compared to other types of accelerometers, it has higher resilience in the industrial environment and a larger measurement range. The piezoelectric accelerometer can only measure changes in acceleration, thus it is not possible to measure the stationary gravitational field of the earth (acceleration "g"), and so it serves to scan the absolute acceleration of dynamic processes. In an alternative exemplary embodiment of the vibration sensor, the vibration sensor is any type of accelerometer other than piezoelectric accelerometer. The strain sensor is a strain gauge. The strain gauge is any strain sensor from the group of foil, semiconductor, piezoresistive, MEMS, optical strain gauge or thin-walled strain gauge. In the exemplary embodiment, a semiconductor strain gauge is used, which is the most advantageous type for use in industrial environment due to its high sensitivity and resistance to environmental influences. Strain sensors are used here to measure relative dynamic and static processes. The position sensor is any sensor from the group of linear encoder and rotary encoder. The distance sensor is any sensor from the group of the capacitive distance sensor, laser position sensor, confocal distance sensor, optical rangefinder, inductive sensor, magneto-inductive sensor or wire sensor. Distance sensors are used to measure relative dynamic and static processes. The sensors are located on the machine. The diagnostic system of machines also includes a control part. In one of the exemplary embodiments of the control part, the control part includes a monitoring unit and a computing device. The sensors are data connected to the monitoring unit. The sensor data connection with the monitoring unit is wired or wireless. The sensor connection with the monitoring unit is further direct or via a bus or via another computing unit. The computing unit means, for example, a control system of a machine. The sensors are connected to the monitoring unit either analogically or digitally. In the case of an analogue connection, the monitoring unit is equipped with an analogue-to-digital converter, which converts the signal from the sensor so that it is further digitally processable. In the case of a digital connection, the sensor is equipped with an analogue-to-digital converter and a digital signal is sent to the monitoring unit of the diagnostic system. The monitoring unit is located near the monitored machine. The monitoring unit is data connected with the computing device. The data connection between the monitoring unit and the computing device is wired or wireless. The computing device is a remote server. In an alternative embodiment, the computing device is a machine control system or a monitoring unit or any other relevant computing device. The diagnostic system of machines further comprises an information interface data connected to the control part. The information interface is any device capable of transmitting information that the machine is in a certain state. In the first exemplary embodiment of the information interface, the information interface is a personal computer. In an alternative exemplary embodiment, the information interface is any electronic device with a display or an autonomous cooperating system affecting the operation of the machine. The data connection of the information interface and the control part is wired or wireless. In one of the exemplary embodiments, the information interface is part of the computing device.

In one of the exemplary embodiments, the monitoring unit is further data connected with peripheral devices. A peripheral device is any device from the group of a machine control unit, a production planning system, an engine changer of machine, an external database, other sensors and company information systems, quality monitoring systems, various other machines affecting the diagnosed machine, storage systems, security systems, gauges or any other relevant peripheral devices.

In one of the exemplary embodiments, the diagnostic system further comprises at least one additional sensor from the group of temperature sensors, thin-walled temperature sensors, force sensors, pressure sensors, thin-walled pressure sensors, position sensors, velocity sensors, gyroscopes, voltage meters, torque meters or any other sensors that refines the state evaluation of the machine.

An example of the diagnostic system of machine is shown in FIG. 1 where the machine is a machine 1, the two sensors are a first sensor 2 and a second sensor 3, the monitoring unit is a monitoring unit 4, the computing device is a computing device 5, the control part is a control part 6, the peripheral device is a peripheral device 7 and the information interface is an information interface 8.

Figure 2:
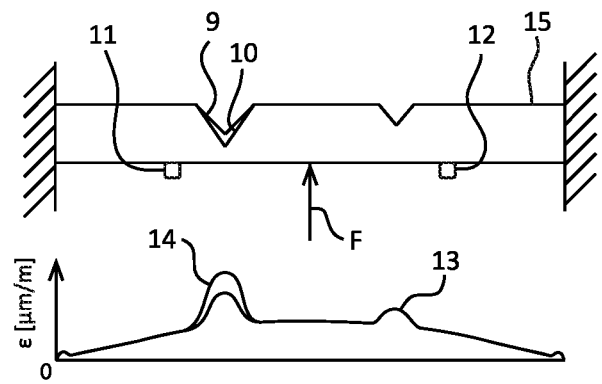
FIG. 2 shows a built-in beam with two notches.
Figure 3:
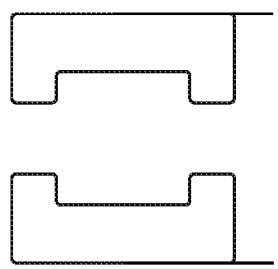
FIG. 3 shows a time point of forming 1.
Figure 4:
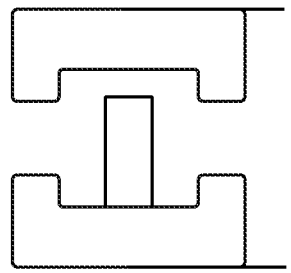
FIG. 4 shows a time point of forming 5.

In all exemplary embodiments, the control part further comprises a memory. Model states are stored in the memory of the control part. Model states are model fault states or model fault-free state. Model fault states are any model fault states from the group of model fault states of a machine part, machine tool model fault states, or product model fault states. The model fault-free state is the model fault-free state of at least one member from the group of a machine part, a machine tool, or a product. In one of exemplary embodiments of the model fault-free states, when a machine part and the product are diagnosed, the model fault-free state is a model fault-free state of the machine part and of the product. The model fault-free state and at least the first model fault state and at least the second model fault state are stored in the memory of the control part. None of the model fault states is the same as any other model fault state. All model states include variables and waveforms that change during the operation and correspond to waveforms and quantities measured during fault-free operation or during a fault during operation. Physical parameters affecting the model states are parameters related to material properties of individual machine parts, their mutual connection, waveforms of physical quantities, such as the force waveform, machine geometry, strain waveform, voltage waveform, the components dynamics and kinematics, heat transfer parameters, acoustic and electromagnetic properties. In the first exemplary embodiment of the model state waveforms derivations, the model state waveforms are derived based on theoretical physical description of the behaviour of the machine during machine operation. Model state waveforms derived in such way enable the use on new machines without the need for prior measurements. In an alternative embodiment of model state waveforms derivations, the model state waveforms are derived based on the theoretical physical description of the behaviour of the machine during machine operation, modified based on the previous measurements of the actual behaviour of the machine during machine operation. Model state waveforms derived in such way enable the modifications of the theoretical physical description of the machine behaviour based on the actual machine behaviour during the machine operation and is therefore a refined physical description. An exemplary embodiment of refinement of a physical description based on measurements during actual operation can be seen in FIG. 2. In this exemplary embodiment, the behaviour of a built-in beam 15 with two notches is described. This built-in beam is a part of the frame of the machine, which is, in this example, a forming machine, and the physical description of the behaviour describes the strain 13 of the beams with a notch during machine operation. On the basis of vibration measurements by the first vibration sensor 11 on the beam and by the second vibration sensor 12 on the beam, the physical description of the behaviour of the built-in beam is modified so that one of the notches of the built-in beam is virtually enlarged. By virtual enlargement of the notch of the built-in beam and the physical behaviour description, the strain described during the machine operation is larger and thus corresponds to the actual behaviour. The model was refined and the original notch 9 was changed to an enlarged notch 10 which is bigger than the notch 9. Based on the refined model, the beam strain 14 with the enlarged notch from the force F is larger and closer to the actual machine. In another alternative embodiment of the model state waveform derivations, the model state waveform derivations are derived from the machine created mathematical model created by machine on the basis of learned knowledge utilizing previous measurements of the actual behaviour of the machine during operation. Machine creation of mathematical model based on the learned knowledge is implemented in this exemplary embodiment through a neural network. Model state waveforms derived in such way allow for the use on machines without manufacturing documentation or on machines that have been in operation for a long time and various parts thereof have clearances which are not included in the manufacturing documentation. In another alternative embodiment of the model state waveform derivations, the model state waveform derivations are measured on the basis of previous measurements of the actual behaviour of the machine during its operation. Model state waveforms derived in such way allow for the use without the need to create any mathematical models. When deriving different model states, multiple derivation methods can be used. Exemplary embodiments of model state waveform derivations described above can be combined to obtain different model states in various ways. The fault of a machine part is a fault of any part of the machine, such fault is for example a fault of the machine engine, hydraulic cylinder, brake, clutch, gear, bearings, guide or frame. The machine tool fault is for example a cracked tool, wear of the tool, clearance in the tool, damage to the surface of the tool or damage to the geometry of the tool. The formed product fault is a fault of the input blank or the final product of the forming machine, such as, for example, poor geometry, material structure, chemical properties of the material or surface structure.

In all exemplary embodiments, sensor data are after measurement sent to the control part. In the control part, the measured data are processed by an evaluation process comprising the step of pairing the measured data. In the step of pairing the measured data, the measured data from at least two sensors are paired so that the data have the same time stamp. Pairing the data so that the data have the same time stamp means that the measured waveforms are displaced so that data related to the identical impulse measured by sensors begin on the time axis of the measured waveforms at the same time. In an alternative embodiment of the step of pairing the measured data, the measured data of at least two sensors are paired so that they are sorted according to a certain repeating pattern consecutively.

Once the step of pairing the measured data has been completed, the measured data become processed data, wherein the processed data can be further processed by any other steps.

The data thus processed are in the following step compared to the model states in the control part, and on the basis of this comparison, the control part issues information to the information interface that the machine is in a fault-free state or in at least one of the model fault states. The control part issues information to the information interface that the machine is in a certain state, if the processed data is similar to the model state waveforms. The similarity is determined either through the information interface or by machine on the basis of knowledge input or learned knowledge. Machine determination of similarity based on knowledge input is in one of the exemplary embodiments of similarity determination implemented through a state machine or multi-valued logic. The state machine needs to have clearly defined criteria, it is therefore suitable for determining the similarity of uniquely defined waveforms. Multi-valued logic is, in turn, suitable for working with indefinite outputs. Several processing methods can be used to determine similarity. The control part issues information on the state of the machine to the information interface that displays it.

In one of the exemplary embodiments of similarity determination, in the case of machine-based similarity determination based on the knowledge input, a COM similarity definition operation is first defined to determine whether the waveforms are similar. The operation of determining the COM similarity is defined by the formula $$\underset{x \in \langle A, B \rangle}{COM} [F @ G^*] < E,$$

where F is a group of model states, G * are the data for which similarity on the interval <A, B> with states E is determined. Operation @ represents an operation of comparison of functions, such as subtraction and division, optionally subtraction of derivations, integrations and others. The COM operation represents a statistical evaluation of the subtractions of, for example, maximum value, average value, and others.

In one of the exemplary embodiments of similarity determination, in case of machine-based similarity determination on the basis of learned knowledge, a decision algorithm based on the processed data and designation of the respective states is created. Similarity determination according to this exemplary embodiment includes the step of preparing data to determine when the respective states of the processed data are designated. Subsequently, a step of creating a decision algorithm is performed. In this exemplary embodiment, a neural network represents the decision algorithm, and the creation of the decision algorithm thus includes the setting of input and output parameters of the neural network. Subsequently, the decision algorithm-learning step is carried out, when the processed data are sent to the decision algorithm together with the designation of the respective processed data states until the fault in determining the state of the processed data is removed. The result of this step is the creation of model states and the decision algorithm. In the next step, the decision algorithm is used to recognize the respective states of the machine. In this exemplary embodiment, similarity determination by machine-based similarity determination based on learned knowledge, together with the above-mentioned steps, it is advantageously possible to carry out a decision algorithm improvement step, in which additional processed data are sent to the existing decision algorithm together with the designation of the respective states of the processed data, wherein re-learning of the decision algorithm takes place. In this exemplary embodiment of the similarity determination by machine-based similarity determination based on learned knowledge together with the above-mentioned steps, it is advantageously possible to perform a step of pairing the measured data, wherein this step precedes the step of preparing data for learning. Machine-based similarity determination based on learned knowledge according to the exemplary embodiment is suitable for similarity determination of complex processes with inaccurate models and with a large amount of measured data for learning.

In another exemplary embodiment of similarity determination, a decision algorithm based on the processed data and model states where the physical significance of the processed data and the model states correspond to each other is generated in the case of machine-based similarity determination based on learned knowledge. Similarity determination according to this exemplary embodiment includes a step of preparing data for learning when corresponding model states are assigned to the processed data. The decision algorithm in this exemplary embodiment is represented by neural network, and the creation of the decision algorithm includes the setting of the input and output parameters of the neural network. Subsequently, the decision algorithm-learning step is carried out when the processed data are sent to the decision algorithm along with the model states until the fault in determining the state of the processed data is removed. The result of this step is the creation of the decision algorithm. In the next step, the decision algorithm is used to recognize the respective states of the machine. In this exemplary embodiment of similarity determination by means of machine-based similarity determination based on the learned knowledge, together with the above-mentioned steps, it is advantageously possible to carry out a decision algorithm improvement step, when additional processed data are sent to the existing decision algorithm together with the corresponding model states, wherein re-learning of the decision algorithm thus takes place. In this exemplary embodiment of similarity determination by machine-based similarity determination based on learned knowledge, together with the above-mentioned steps, it is advantageously possible to perform a step of pairing the measured data, wherein this step precedes the step of preparing data for learning. Machine-based similarity determination based on learned knowledge according to the exemplary embodiment is suitable for similarity determination without the need of utilizing previous measured data and it thus can be used for new machines.

In one of the exemplary embodiments of the evaluation process, in the step of comparing processed data and model states, in the case that the processed data do not correspond to the model fault-free state of the machine and at the same time they do not correspond to any model fault state, the control part determines that this is an unknown state. The control part issues information that the machine is in an unknown state to the information interface that displays it, and at the same time allows the user to assign the displayed unknown state to a fault-free or a specific fault state of the machine. After assigning the displayed unknown state to a fault-free or a specific fault state of the part of the machine, machine tool, or product, this information is stored in the memory of the control part as a new model fault-free or fault state.

In one of the exemplary embodiments, the evaluation process further comprises a step of data modification by means of a transmission function. Waveforms of model states are determined for a specific spacing of sensors on the machine. The transmission function describes signal transmission from the area of origin to its scanning area. In one of the exemplary embodiments of the use of the transmission function, the data transmission function modifies the data so as to eliminate the effect of the location of the individual sensors if the location of the sensors is different from the location of sensors for which the model state waveforms were determined. In another exemplary embodiment of the use of the transmission function, the transmission function allows a replacement of multiple-location measurements using multiple sensors of the same type by a measurements in one spot using one sensor by adjusting the data measured by one sensor by applying several different transmission functions, wherein each of these transmission functions modifies the data so that the data will be comparable to the data otherwise measured by multiple sensors in multiple locations. The location of the sensors affects the amplitude and the phase shift of individual data frequencies, wherein the transmission function is described in a complex form by the equation:

$$G(j\omega)\frac{\gamma(t)}{u(t)} = \frac{\gamma_0 e^{j \cdot (\omega t + \varphi)}}{u_0 e^{j(\omega t)}} = \frac{\gamma_0}{u_0} e^{j\varphi},$$

where $$\frac{\gamma_0}{u_0}$$

is the amplitude ratio and $\varphi$ is the phase shift.

The transmission function is obtained analytically from the knowledge of the mechanical behaviour of the machine and the analytical equations thereof. In alternative embodiments of obtaining the transmission function, the transmission function is obtained by means of a parametric physical model or model created by artificial intelligence or experimentally by means of an impulse response.

In one exemplary embodiment of the data modification step by means of the transmission function, the modified data are the measured data. In another exemplary embodiment of the data modification step by means of the transmission function, the modified data are the processed data.

In one exemplary embodiment, the evaluation process includes the process of normalizing the processed data. In order to determine the state, it is necessary for the analysed data and the model waveform to match each other. This is accomplished by the process of selecting the interval of processed data and by normalizing it to the desired definition domain corresponding to the definition domain of the model waveform values. This process is essential for the process of the machine-based data comparison. In one exemplary embodiment, there may be an "F" state described by functions $f_1(x)$ to $f_n(x)$ and measured data "G" described by functions $g_1(x)$ to $g_n(x)$, where n indicates the number of signals describing the state. In exemplary comparison of the $f_1(x)$ and $g_1(x)$ functions with various definition domains, the function $g_1(x)$ is normalized to the function $g_1^*(x)$ with the same definition domain as $f_1(x)$ function, according to the equation:

$$g_i^*(x) = \frac{g_i\left(\frac{x-a_i}{b_i-a_i}*(d_i-c_i)+c_i\right)-\gamma_i}{\delta_i-\gamma_i}*(\beta_i-\alpha_i)+\alpha_i,$$

$$x \in \langle a_i, b_i \rangle; i = 1.$$

In one exemplary embodiment, the evaluation process further comprises a step of filtering the processed data. In the step of filtering the processed data, the data of at least one sensor are used to set filter parameters for filtering data from at least one sensor.

In the first exemplary embodiment of filtering the processed data, the filtering is performed so that the filter parameter is a time interval determined on the basis of data from one sensor. The filter thus set is then applied to data from the second sensor, and after filtering, only a certain time interval remains from these data. In the second exemplary embodiment of filtering the processed data, the filtration is performed so that the filter parameter is a time waveform of data from one sensor, which then determines the amplification or attenuation of the filtered data. The filter thus set is then applied to data from the second sensor, and after filtering, non-status information is suppressed in the data. Examples of non-status information are shocks, shock sequences, signals from other parts, process signals, component friction, certain frequencies captured by one sensor. In the third exemplary embodiment of filtering the processed data, the filtration is performed so that the filter parameter is the actual data waveform from one sensor. The filter thus set is then applied to the data from the second sensor and the data from the first sensor are subtracted from the data from the second sensor. In the fourth exemplary embodiment of the filtering of the processed data, the filtration is performed so that the filter parameter is the actual data waveform from one sensor, which is the position sensor and the kinematic model of the diagnosed machine. The filter thus set is then applied to data from the second sensor, where the arithmetic mean of all measurements at the filter set points is formed. This eliminates noise and highlights the carrier information. Measurements must be performed until at least the minimum number of measurement values at each measured point is obtained. This may vary depending on the noise—carrier information ratio in the data.

Figure 22:
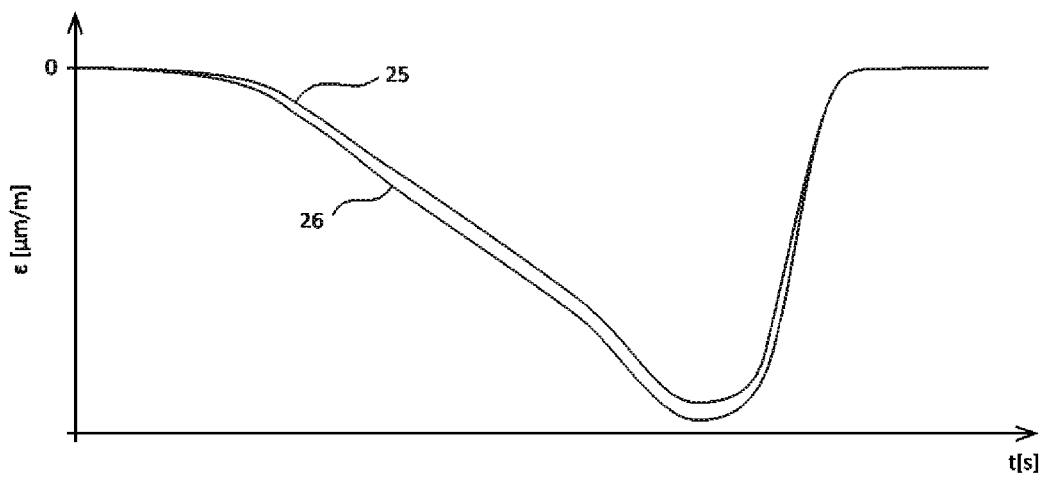
FIG. 22 shows the measured strain waveform and the measured strain waveform after temperature compensation.

In another exemplary embodiment of the machine diagnostic system and the evaluation process, a temperature sensor is further located on the machine. Data measured by the temperature sensor are sent to the control part. The temperature sensor is located close to at least one sensor of another type. During the machine operation, the sensor environment is heated from the product by energy release during the machine operation, by friction of bearings during operation or by heat transfer from other parts of the machine. Heating from the above-mentioned parts can cause temperature changes in the sensor environment, thereby changing the sensitivity of the sensors. If the strain sensor is made of a material with a different thermal expansion than that of the material of the machine at a given location, it is necessary to perform temperature compensation of the measured data. Thus, in FIG. 22, it is possible to see the difference between the same measured data, wherein the waveform 26 represents the measured data without the temperature compensation, and the waveform 25 represents the same measured data with the temperature compensation. In this exemplary embodiment, the evaluation process thus includes the temperature compensation step. Based on the data from the temperature sensor, during the step of temperature compensation the control part performs temperature compensation of the data measured by the sensors selected from the group of vibration sensor, strain sensor, distance sensor, and position sensor.

An exemplary embodiment of the temperature compensation step of the data measured by the strain sensor is performed as follows. The data measured by the strain sensor are data related to the force stress. Force stress is measured by means of strain sensor by measuring the change in voltage relative to the excitation voltage, wherein the voltage change occurs due to the change of resistance depending on the deformation. The change in voltage relative to the excitation voltage is converted to a change in length expressed by the relative elongation c using the formula:

$$\varepsilon = \frac{4}{K} * \frac{\Delta U}{U},$$

where ΔU/U represents a voltage change relative to the excitation voltage, and K represents the conversion constant. The temperature compensation of data is then performed by changing the conversion constant K in dependence on temperature.

Figure 23:
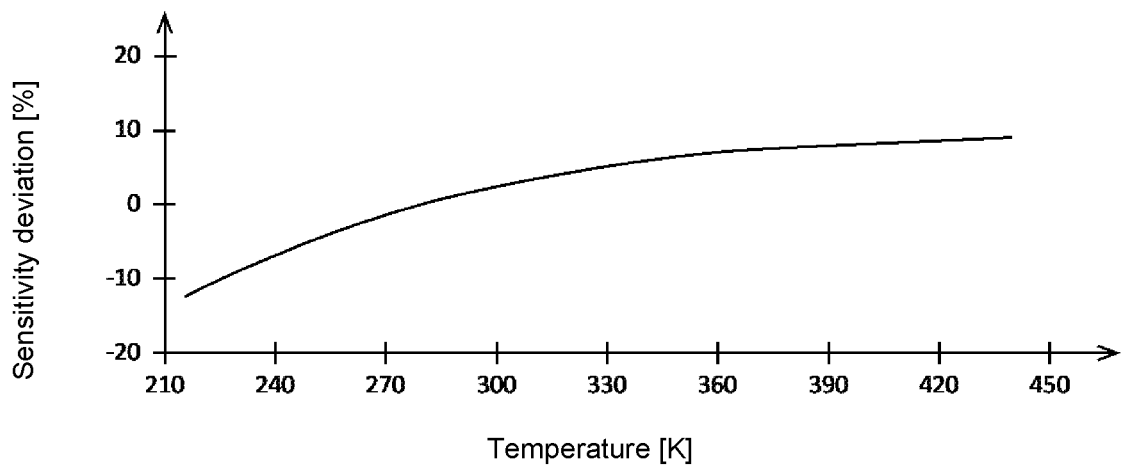
FIG. 23 shows a change in sensitivity of the piezoelectric accelerometer depending on temperature.
Figure 24:
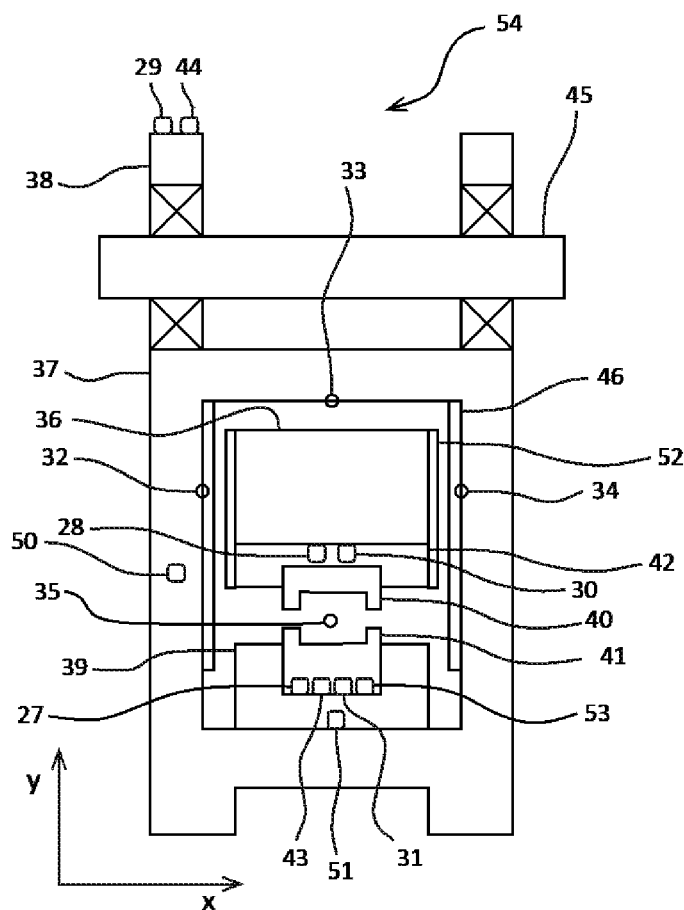
FIG. 24 shows a horizontal crank press.

FIG. 23 shows sensitivity change waveform of the vibration sensor, namely of the piezoelectric accelerometer. An exemplary embodiment of the temperature compensation step of the data measured by the vibration sensor is carried out in the following manner. The data measured by the vibration sensor are data related to dynamic processes. These processes are measured by changing the charge in piezoelectricity. The charge change is then converted to voltage, which is then converted to acceleration. The temperature compensation of the data is then performed by changing the charge $B_{qa}$:

$$B_{qa} = \frac{q}{a}$$

In another exemplary embodiment of the evaluation process, the evaluation process includes step of data modification. In the step of data modification, the relevant information is separated from the rest of the data. Relevant information is information that describes physical processes that are relevant to a given state. Data modification means at least one operation from the group of noise abatement, data conversion to another space, integration, derivation, signal modulation, signal demodulation, resampling, trending, or static evaluation. An example of noise abatement operation is filtration through a top, bottom, or bandwidth filter, envelope method, and more. Conversion into another space allows for more convenient processing and display of some fault states. An example of conversion to another space is the Fourier Transform in which the time domain signal is converted to the frequency domain. Trends are created based on the result of certain operations performed at individual time points above the signal segment. An example of such operations is the evaluation of the effective value of the measured quantities, the amplitude of the measured quantities, the number of peak values or the wavelength.

In one of the exemplary embodiments of the data modification step, the modified data are the measured data. In another exemplary embodiment of the data modification step, modified data are the processed data.

The evaluation process always includes at least steps of pairing the measured data and step of comparing the processed data with the model states.

In the first exemplary embodiment of the evaluation process step sequence, the evaluation process step sequence is as follows: the temperature compensation step, the step of data modification using the transmission function, the step of pairing the measured data, the step of filtering the processed data, the step of data modification, the step of normalization of the processed data, and the step of evaluating the similarity of the processed data to the model states.

In the second exemplary embodiment of the evaluation process step sequence, the evaluation process step sequence is as follows: the temperature compensation step, the step of data modification using the transmission function, the step of pairing the measured data, and the step of evaluating the similarity of the processed data to the model states.

In the third exemplary embodiment of the evaluation process step sequence, the evaluation process step sequence is as follows: the temperature compensation step, the step of pairing the measured data, the step of data modification using the transmission function, the step of data modification, the step of filtering the processed data, the step of data modification, the step of normalization of the processed data, and the step of evaluating the similarity of the processed data to the model states.

In the fourth exemplary embodiment of the evaluation process step sequence, the evaluation process step sequence is as follows: the temperature compensation step, the step of pairing the measured data and the step of evaluating the similarity of the processed data to the model states.

In the fifth exemplary embodiment of the evaluation process step sequence, the evaluation process step sequence is as follows: the step of data modification using the transmission function, the step of pairing the measured data and the step of evaluating the similarity of the processed data to the model states.

In the sixth exemplary embodiment of the evaluation process step sequence, the evaluation process step sequence is as follows: the step of pairing the measured data and the step of evaluating the similarity of the processed data to the model states.

In the seventh exemplary embodiment of the evaluation process step sequence, the evaluation process step sequence is as follows: the temperature compensation step, the step of pairing the measured data, the step of data modification and the step of evaluating the similarity of the processed data to the model states.

In the eighth embodiment of the evaluation process step sequence, the evaluation process step sequence is as follows: the step of data modification using the transmission function, the step of pairing the measured data, the step of data modification, and the step of evaluating the similarity of the processed data to the model states.

In the ninth exemplary embodiment of the evaluation process step sequence, the evaluation process step sequence is as follows: the step of pairing the measured data, the step of data modification, the step of filtering the processed data, the step of data modification and the step of evaluating the similarity of the processed data to the model states.

In the tenth exemplary embodiment of the evaluation process step sequence, the evaluation process step sequence is as follows: the step of measured data modification, the temperature compensation step, the step of data modification using the transmission function, the step of pairing the measured data, the step of filtering the processed data, the step of data modification, the step of normalization of the processed data and the step of evaluating the similarity of the processed data to the model states.

In the eleventh exemplary embodiment of the evaluation process step sequence, the evaluation process step sequence is as follows: the temperature compensation step, the step of data modification using the transmission function, the step of pairing the measured data, the step of data modification, the step of filtering the processed data, the step of normalization of the processed data and the step of evaluating the similarity of the processed data to the model states.

In the twelfth exemplary embodiment of the evaluation process step sequence, the evaluation process step sequence is as follows: the temperature compensation step, the step of pairing the measured data, the step of data modification using the transmission function, the step of filtering the processed data, the step of data modification, the step of normalization of the processed data and the step of evaluating the similarity of the processed data to the model states.

In the first specific embodiment, the machine is a forming machine, specifically a crank forging press 54 comprising a drive, a forming part and a frame 37. The forming part comprises a clamp 39 used to clamp a tool comprising a lower and upper die. The sensors used according to this exemplary embodiment are the first piezoelectric accelerometer 27, the semiconductor strain gauge 31, the first temperature sensor 43, and the force sensor 50. All sensors, with the exception of the force sensor 50, are located on the forming part of the crank forging press 54, specifically in the lower die 41. The control part in this exemplary embodiment comprises a monitoring unit. The monitoring unit is directly data connected to the first piezoelectric accelerometer 27, the semiconductor strain gauge 31 and the temperature sensor 43. Further, it is data connected via a machine control system with the force sensor 50 located on the frame 37. The force sensor 50 located on the frame 37 allows the acquisition of data about the size of the forming force. The control part of the diagnostic system consists of monitoring unit and computing device, which is a remote server. Further in this exemplary embodiment, four model states are stored in the memory of the control part: a model fault-free state that includes a plurality of functions $\{f_{101}(x), \ldots, f_{108}(x)\}$, the waveform of which can be seen in FIGS. 25, 30 and 31, the model fault state of the higher ductile resistance of the transformed blank which includes a plurality of functions $\{f_{111}(x), \ldots, f_{118}(x)\}$, the exemplary waveform of which can be seen in FIG. 26, the model fault state of a crack in the frame comprising a plurality of functions $\{f_{121}(x), \ldots, f_{128}(x)\}$, the exemplary waveform of which can be seen in FIG. 28, and the model fault state of the crack at the clamp, which includes a plurality of functions $\{f_{131}(x), \ldots, f_{138}(x)\}$, the exemplary waveform of which can be seen in FIG. 27. The model fault-free state and the model fault state of the higher ductile resistance of the transformed blank are formed on the basis of previous measurements of the actual behaviour of the machine during operation. The model fault state of the crack in the frame and the model fault state of the crack at the clamp are based on the theoretical physical description of the behaviour of the machine during operation. Model state waveforms are created using the same processing method as the actual measured data in the description below. The sensor-measured data are measured during the forming process. During the forming process, there is a high temperature expansion in the clamp, and it is thus necessary to carry out the temperature compensation step first. The temperature compensation step of the semiconductor strain gauge 31 consists of measuring the temperature by the temperature sensor 43 at the measuring point of the semiconductor strain gauge 31 and subsequently utilizing the data to convert the deformation sensitivity coefficient of the semiconductor strain gauge 31. The converted coefficient of strain sensitivity of the semiconductor strain gage 31 according to the instantaneous temperature at the measuring point is then used to convert the values measured by the semiconductor strain gauge 31 to actual strain values. The dependence of the resistance of the semiconductor strain gauge 31 on the deformation and temperature is not linear and is expressed by the equation:

$$R_{\varepsilon,t} = R_{0,t} + R_{0.25}[C_1(\varepsilon + (\alpha_{mat} - \alpha_{Si})(t-25)) + C_2(\varepsilon(\alpha_{mat} - \alpha_{Si})(t-25))^2].$$

Resistance further enters the equation (applicable for 25° C.):

$$K_{\varepsilon,25} = C_1 + 2C_2\varepsilon = \frac{\Delta R}{\Delta \varepsilon}.$$

The final equation of the dependence of deformation sensitivity coefficient on temperature and deformation is as follows:

$$K_{\varepsilon,t} = K_{\varepsilon,25}\left(1 + \frac{B}{100}(t-25)\right)$$

The constants $C_1$, $C_2$, B are given by the manufacturer and their exact calculation is done empirically. The temperature compensation of the data measured by the semiconductor strain gauge 31 is performed by means of the above-mentioned equations. The second step is to pair the measured data. The third step is the step of modifying the data with time waveforms $g_{117}(x)$, $g_{118}(x)$ shown in FIGS. 30, 31. The data from the semiconductor strain gauge 31 are filtered through a low pass filter type with a limit frequency of 100 Hz, the resulting data thus carry information about the strain of the clamp during the forming process. Piezoelectric accelerometer 27 data are used for two independent types of modification. The first type of data modification from the piezoelectric accelerometer 27 is a low pass filter type filtration with a limit frequency of 100 Hz, the resulting data thus carry information about the absolute acceleration of the clamp 39. The second type of data modification from the piezoelectric accelerometer 27 is a high pass filter type filtration with a limit frequency of 20 kHz, the resulting data thus carry the information about the shocks, the contact of the forming part and the product and the structure of the product. The fourth step is the step of filtering the processed data where the data measured by the piezoelectric accelerometer 27 and the semiconductor strain gauge 31 are used as filter parameter through which the data measured by the semiconductor strain gage 31 are filtered. During the vibration, it is possible to see a pulse at time point 20, which is caused by the clearance between the machine frame and the forming part. During strain, it is possible to see the maximum strain value at time point 35. Thus, the time interval between time points 20 and 35 is selected as the filter parameter. The result of filtration is, therefore, complete attenuation of the strain waveform at all time points outside the interval between time points 20 to 35. For further processing, the original strain waveform between time points 0 to 50 is also used. The fifth step is the step of data modification. In the fifth step, the processed data are further statistically evaluated, wherein the data from the semiconductor strain gauge 31 are evaluated by the difference between the minimum and maximum amplitudes, the data from the piezoelectric accelerometer 27 modified by the low pass filter type with the limit frequency of 100 Hz are evaluated by the difference between the minimum and maximum amplitudes and the data from the piezoelectric accelerometer 27 modified by a high pass filter type with the limit frequency of 20 kHz are evaluated by calculating the root mean square (RMS) signal value. A set of trends $\{g_{111}(x), \ldots, g_{116}(x)\}$, which can be seen in FIG. 40, is then created from data modified in this way. The sixth step is the step of evaluating the similarity of the processed data $\{g_{111}(x), \ldots, g_{118}(x)\}$ with a set of model states $\{f_{111}(x), \ldots, f_{118}(x)\}$. The evaluation of similarity in this exemplary embodiment is carried out by the information interface, which is in this exemplary embodiment a forming machine 54 interface comprising a screen and a user input. As can be seen in FIGS. 30, 31 and 41, the processed data $\{g_{111}(x), \ldots, g_{118}(x)\}$ do not correspond to the model fault-free state determined by the set $\{f_{101}(x), \ldots, f_{108}(x)\}$, since the waveforms are not similar. As can be seen in FIG. 29, the processed data $\{g_{111}(x), \ldots, g_{118}(x)\}$ and the model fault state of the higher ductile resistance of the transformed blank, determined by the set $\{f_{111}(x), \ldots, f_{118}(x)\}$, are similar. Higher ductile resistance of the transformed blank is caused by the incorrect setting of the forming process parameter, specifically of the forming temperature.

The second specific embodiment, with the exception of the measured data and the sixth step, corresponds to the first specific exemplary embodiment. The sixth step is the step of evaluating the similarity of the processed data to the model states. The evaluation of similarity in this exemplary embodiment is carried out by means of the information interface, which is in this exemplary embodiment a personal computer. As can be seen in FIGS. 33, 34, 35, the processed data $\{g_{121}(x), \ldots, g_{128}(x)\}$ shown in FIG. 32 do not correspond to the model fault-free state determined by the set $\{f_{101}(x), \ldots, f_{108}(x)\}$ since the waveforms are not similar. As can be seen in FIG. 36, the processed data $\{g_{131}(x), \ldots, g_{136}(x)\}$ and the model fault state of the crack in the frame $\{f_{131}(x), \ldots, f_{636}(x)\}$ correspond to each other, since the waveforms are similar. The crack in the frame 37 is in this model fault state is at a frame 37 location approximately below the forming part.

Figure 42:
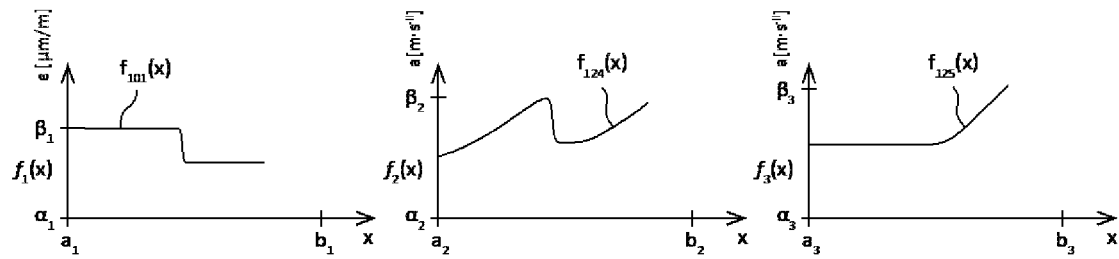
FIG. 42 shows a subset $F_{120}$ of the model fault state of a crack in a clamp.
Figure 43:
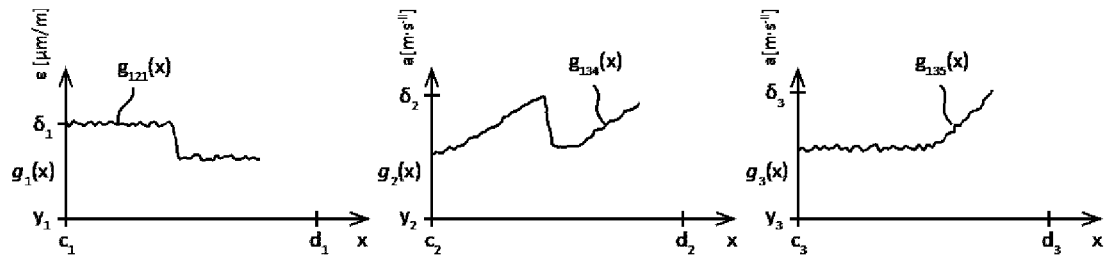
FIG. 43 shows a subset $G_{130}$ of the processed data of the third specific exemplary embodiment.

The third specific exemplary embodiment, with the exception of the measured data and the fifth step, corresponds to the first specific exemplary embodiment. The fifth step is the step of normalization of the processed data. Normalization inputs are waveforms of processed data 6130 and the function set $F_{120}$. The function set $F_{120}=\{f_{121}(x), f_{124}(x), f_{125}(x)\}$ shown in FIG. 42 is a subset of the set $\{f_{121}(x), \ldots, f_{126}(x)\}$, wherein these functions represent the model fault state waveforms of the crack on the clamp 39. Waveforms of the processed data $G_{130}=\{g_{131}(x), g_{134}(x), g_{135}(x)\}$ in FIG. 43 are a subset of the set $\{g_{131}(x), \ldots, g_{138}(x)\}$, shown in FIGS. 37, 38 and 39. Function $g_{131}(x)$ represents the processed data measured by the semiconductor strain gauge 31 between time points 20 to 35 and modified by a low pass filter type with a limit frequency of 100 Hz. Function $g_{134}(x)$ represents the processed data measured by the semiconductor strain gage 31 between time points 0 to 50 and modified by a low pass filter type with a limit frequency of 100 Hz. Function $g_{135}(x)$ represents the processed data measured by the piezoelectric accelerometer 27 between time points 0 to 50 and modified by a low pass filter type with a limit frequency of 100 Hz. Waveforms of processed data $G_{130}$ are transformed into $G_{130}^*$ data waveforms, which have the same definition domain and value domain as the functions of the $F_{120}$ function set. Functions from the $F_{120}$ function set have the definition domain $D(f)_i = \langle a_i, b_i \rangle$ and the value domain $H(f)_i = \langle \alpha_i, \beta_i \rangle$, where ie $\langle 1, n \rangle$. An example for transforming $g_{134}(x)$ into $g^*_{134}(x)$ is the equation:

$$g^*_{134} = \frac{g_{134}\left(\frac{x-a_{134}}{b_{134}-a_{134}}*(d_{134}-c_{134})+c_{134}\right)-\gamma_{134}}{\delta_{134}-\gamma_{134}}(\beta_{134}-\alpha_{134})+\alpha_{134};$$

$$x \in \langle a, b \rangle.$$

Figure 44:
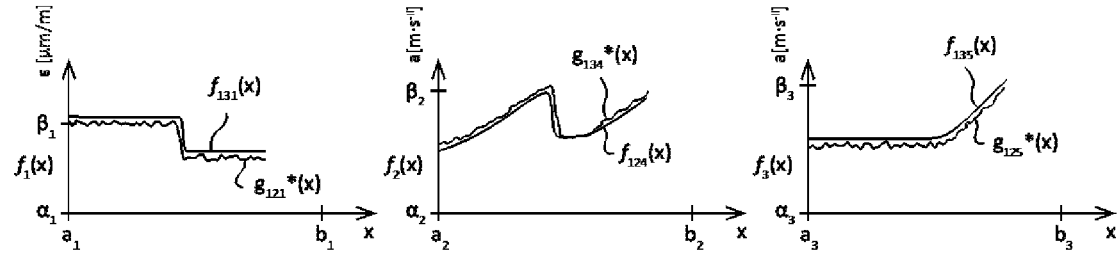
FIG. 44 shows a comparison of subsets $F_{120}$ and $G_{130}$.

The sixth step is the step of evaluating the similarity of the processed data with the model states. The evaluation of similarity in this exemplary embodiment is performed by machine on the basis of the input knowledge, namely using the COM function. In this exemplary embodiment, the COM function inputs are the waveforms of the processed data $G_{130}^*$ and the set of functions $F_{120}$. Functions from the $F_{120}$ function set represent the waveforms of model fault states of the forming machine part. Functions of the processed data waveforms $G_{130}^*$ represent the processed data with the same definition domain and value domain as the functions of the $F_{120}$ function set, as shown in FIG. 44. The COM function for this exemplary embodiment is therefore defined by the equations:

$$\underset{x \in \langle A, B \rangle}{COM}[F_{120} @ G^*_{130}] < E$$

$$\underset{x \in \langle a_1, b_1 \rangle}{COM}[f_{121}(x) @ g^*_{131}(x)] < e_1 \text{ AND}$$

$$\underset{x \in \langle a_2, b_2 \rangle}{COM}[f_{124}(x) @ g^*_{134}(x)] < e_2 \text{ AND}$$

$$\text{AND } \underset{x \in \langle a_3, b_3 \rangle}{COM}[f_{125}(x) @ g^*_{135}(x)] < e_3$$

Figure 45:
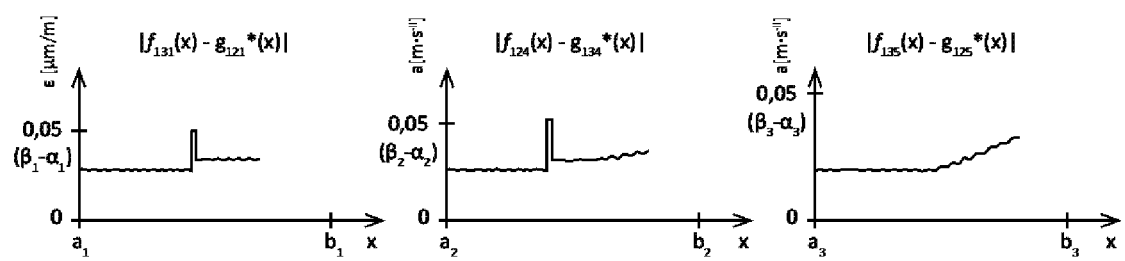
FIG. 45 shows the absolute value of difference in functions of subsets $F_{120}$ and $G_{130}$.

Based on the input knowledge, all functions from the $F_{120}$ function set and the processed data waveforms $G_{130}^*$ must be similar so that the function domain of the absolute value of the function differences shown in FIG. 45, limited by a 95% quantile of all the lowest values in the function difference definition domain is smaller than 5% of the definition domain. Based on this, the COM function equations can be modified as follows:

$$\underset{x \in \langle a_1, b_1 \rangle}{\max 0.95}|f_{121}(x)-g^*_{131}(x)| < e_1 \text{ AND } \underset{x \in \langle a_2, b_2 \rangle}{\max 0.95}|f_{124}(x)-g^*_{134}(x)|e_2 \text{ AND}$$

$$\text{AND } \underset{x \in \langle a_3, b_3 \rangle}{\max 0.95}|f_{124}(x)-g^*_{135}(x)| < e_3 = 1 \text{ AND } 1 \text{ AND } 1$$

The comparison of the functions is shown in FIG. 36, the processed data $\{g_{131}(x), \ldots, g_{136}(x)\}$ and the model fault state of the crack in the clamp 39 $\{f_{131}(x), \ldots, f_{136}(x)\}$ correspond to each other, since the waveforms are similar. Based on the evaluation result, information is sent to the information interface indicating that the fault is a crack on the clamp 39.

Figure 38:
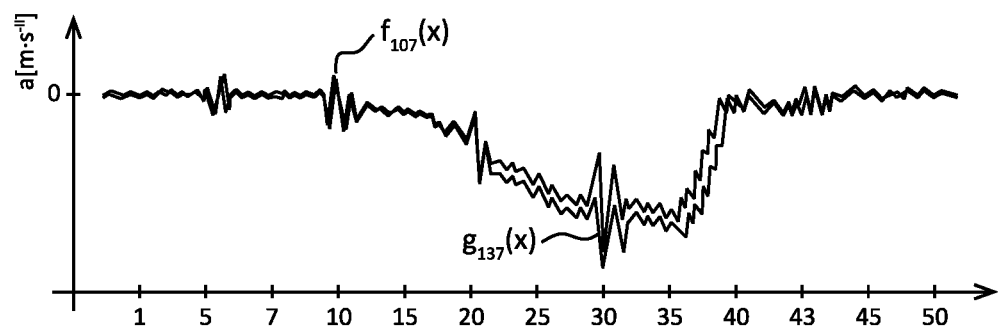
FIG. 38 shows vibration waveforms when comparing the processed data of the third specific exemplary embodiment and the model fault-free state.
Figure 39:
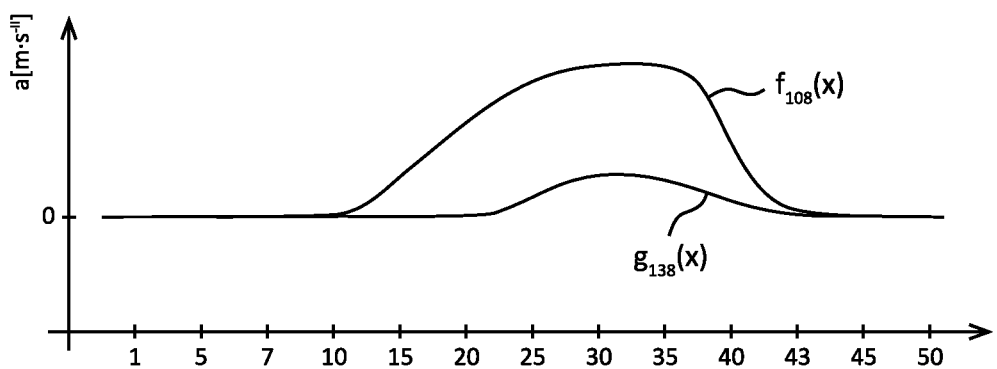
FIG. 39 shows strain waveforms when comparing the processed data of the third specific exemplary embodiment and the model fault-free state.
Figure 46:
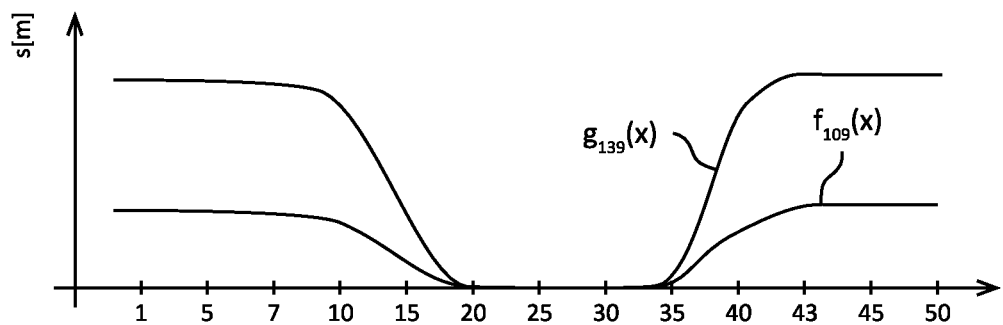
FIG. 46 shows distance waveforms when comparing the processed data of the fourth specific exemplary embodiment and the model fault-free state.
Figure 47:
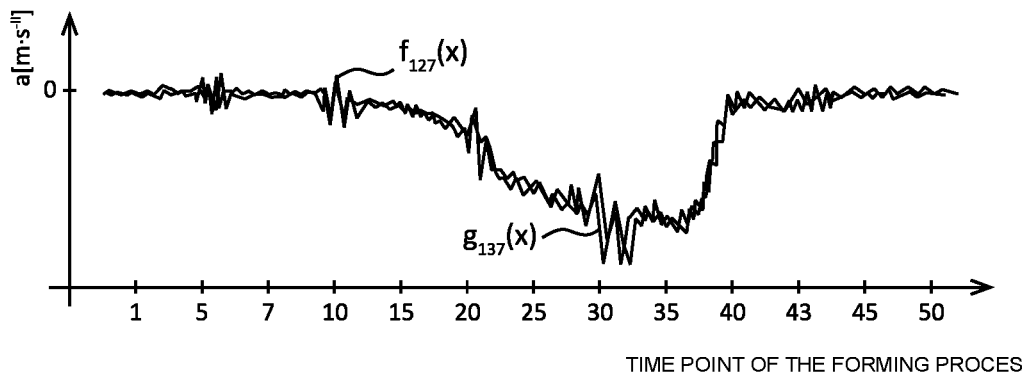
FIG. 47 shows vibration waveforms when comparing the processed data of the fourth specific exemplary embodiment and the model fault state of a crack in a clamp.
Figure 48:
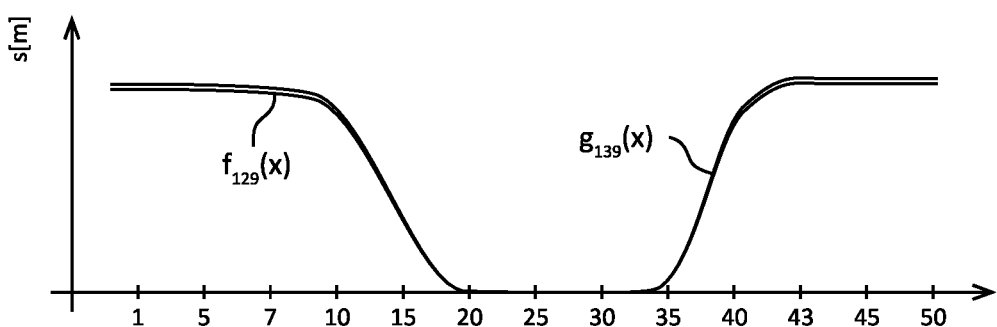
FIG. 48 shows distance waveforms when comparing the processed data of the fourth specific exemplary embodiment and the model fault state of a crack in a clamp.

The fourth specific exemplary embodiment corresponds to the third specific exemplary embodiment, with the difference that the semiconductor strain gauge 31 is replaced by the distance sensor 51, an inductive one in this specific exemplary embodiment, which is located in the lower clamp 39 and measures the distance between the lower clamp 39 and the frame 37. In this exemplary embodiment, the model fault-free state is extended by the $f_{109}(x)$ waveform, the model fault state of the higher ductile resistance of the transformed blank was extended by the $f_{119}(x)$ waveform, the model fault state of the crack on the clamp 39 was extended by the $f_{129}(x)$ waveform, the model fault state of the crack in frame 37 was extended by the $f_{139}(x)$ waveform. The added waveforms describe the change in distance between the clamp 39 and the frame 37 during the forming process. The model fault-free state is formed by a set of data $f_{107}(x), f_{109}(x)$. The model fault state of the higher ductile resistance of the transformed blank is formed by a set of data $f_{117}(x), f_{119}(x)$. The model fault state of the crack on the clamp 39 is formed by a set of data $f_{127}(x), f_{129}(x)$. The model fault state of the crack in frame 37 is formed by a set of data $f_{137}(x), f_{139}(x)$. The processed data used in the step of evaluating the similarity of the processed data to the model states are data $g_{137}(x)$ and $g_{139}(x)$ processed in this exemplary embodiment. The evaluation of similarity in this exemplary embodiment is carried out by means of the information interface, which is in this exemplary embodiment a personal computer. As can be seen in FIGS. 38, 46, the processed data do not correspond to the model fault-free state, since the waveforms are not similar. As can be seen in FIGS. 47 and 48, the processed data and the model fault state of the crack on the clamp 39 correspond to each other, as the waveforms are similar.

Figure 20:
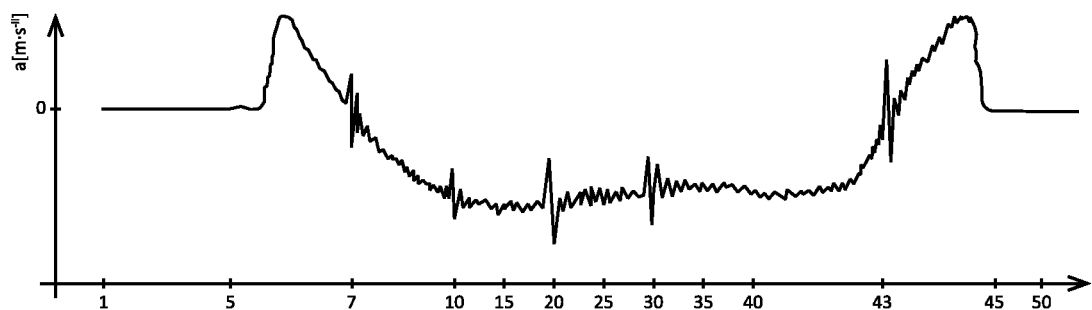
FIG. 20 shows the waveform of the acceleration of an upper clamp in the direction of the ram movement during the forming process.
Figure 21:
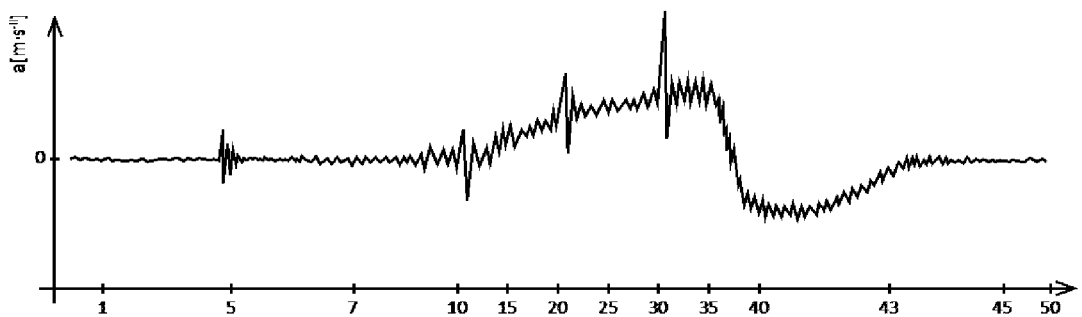
FIG. 21 shows the waveform of the acceleration of the lower die perpendicular to the direction of the ram movement during the forming process.
Figure 53:
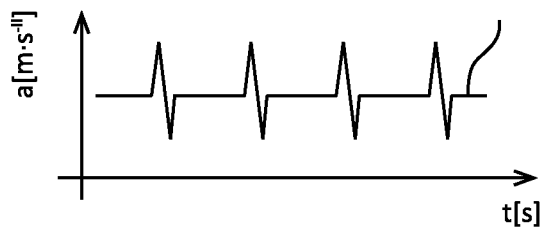
FIG. 53 shows a model fault state of an inner bearing ring in the time domain.
Figure 65:
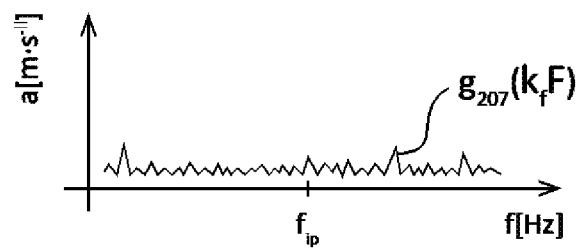
FIG. 65 shows the processed data of the fifth specific exemplary embodiment in the frequency domain.
Figure 66:
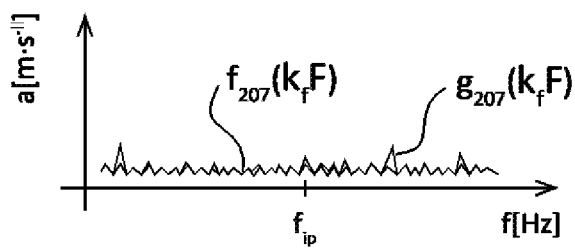
FIG. 66 shows a comparison of the processed data of the fifth specific exemplary embodiment and the model fault-free state in the frequency domain.

In the fifth specific exemplary embodiment, the machine is a forming machine, specifically a crank forging press 54 comprising a drive, a forming part, a guide 32 and a frame. The drive comprises a ram 36 and a transmission gear. The forming part comprises a clamp used to clamp a tool comprising a lower die 41 and an upper die 40. The sensors used in this exemplary embodiment are five accelerometers, piezoelectric ones in this specific exemplary embodiment, and two temperature sensors. The first accelerometer 27 is located in the lower die 41 and scans the vibrations in the y-axis direction, which is the same as the axis of movement of the ram 36. The second accelerometer 28 is located in the upper tool clamp 42 and scans the vibrations in the y-axis direction. The third accelerometer 29 is located on a roller bearing bedding 38, wherein the roller bearing is a gear roller bearing, and scans vibrations in the y-axis direction. The fourth accelerometer 30 is located in the upper clamp 42 and scans vibrations perpendicular to the direction of the axis of movement of the ram 36, i.e. in the x-axis direction. The fifth accelerometer 53 is located in the lower die 41 and scans vibrations in the x-axis direction. The first temperature sensor 43 is located in the lower die 41 and the second temperature sensor 44 is located on the bedding 38 of the roller bearing. The control part comprises a monitoring unit and a computing device, which, in this exemplary embodiment, is a machine control system. The monitoring unit is directly connected to piezoelectric accelerometers and temperature sensors. Further, in this exemplary embodiment, five model states are stored in the memory of the control part: a model fault-free state, the waveform of which can be seen in FIGS. 61, 20, and 21, a model fault state of the guide 32 clearance, the waveform of which can be seen in FIG. 49, a model fault state of the clamp 39 clearance, the waveform of which can be seen in FIG. 51, a model fault state of the inner ring of the bearing, the waveform of which can be seen in FIGS. 52, 53, and a model fault state of the lower die 41, the waveform of which can be seen in FIG. 50. The model fault-free state is formed by machine, based on learned knowledge, wherein the data used for this are obtained by measurements during fault-free operation. The machine creation of the model fault-free state on the basis of the learned knowledge is performed by neural network. By the neural network, the step of pairing the measured data, the step of modifying the processed data, and the step of evaluating the similarity of the processed data to the model states are implemented in this exemplary embodiment. The model fault state of the guide 32 clearance, the model fault state of the clamp 39 clearance and the model fault state of the lower die 41 clearance are formed by the same procedure as described below. The model fault state of the guide 32 clearance, the model fault state of the clamp 39 clearance and the model fault state of the lower die 41 clearance are derived on the basis of the theoretical physical description of the forming machine 54 behaviour during operation adjusted on the basis of previous measurements of the actual behaviour of the forming machine 54 during operation. The derivation is performed by inserting the ram 36 clearance, or the clamp 39 clearance, or the lower die 41 clearance into the refined physical description of the forming machine 54 behaviour and by subsequent simulation of the individual fault states by the finite element method. The simulated waveforms of the fault states are subsequently further processed in a similar way as the measured data, the processing thus involves the step of pairing the measured data, the step of modifying the processed data, the step of filtering the processed data. In the step of modifying the processed data, vibration waveforms are used for two independent types of modification. The first type of vibration waveform modification is filtration through the low pass filter type with a limit frequency of 100 Hz. The second type of vibration waveform modification is filtration by the high pass filter type with a limit frequency of 20 kHz. From the vibration waveforms modified by the first type modification, trends are created by calculating the differences between the minimum and maximum amplitudes. From the vibration waveforms modified by the second type of modification, trends are created by calculating the root mean square (RMS) signal value. The data thus modified are then filtered by the data-filtering step. The vibration waveforms corresponding to the waveform measured by the fifth accelerometer 54 is used for two independent filtrations. During the first filtration, all data outside time points 10 to 35 are filtered off. During the second filtration, all data outside time points 7 to 43 are filtered off. Furthermore, all data outside time points 1 to 7 are filtered off from the vibration waveform corresponding to the waveform measured by the fourth accelerometer 30. In this way simulated and processed waveforms are subsequently stored as a model fault state of the guide 32 clearance, the model fault state of the clamp 39 clearance, and the model fault state of the lower die 41 clearance. The model fault state of the inner ring of the bearing is derived on the basis of the theoretical physical description of the behaviour of the forming machine 54 during operation, wherein this physical description is in this exemplary embodiment represented by the analytical relationship for bearing fault frequencies. The fault frequencies take into account the bearing geometry and the rotation speed of the individual rings. The following equations are used to calculate fault frequencies:

$$f_i = \frac{n_i}{60},$$

$$f_e = \frac{n_e}{60},$$

$$f_{ip} = \left|\frac{z}{2}\left[1 + \frac{D_W}{P}\cos\alpha\right](f_i - f_e)\right|,$$

where $n_i$ [RPM] indicates the internal ring rotation speed, ne [RPM] indicates the outer ring rotation speed, $f_{ip}$ [Hz] indicates the internal ring fault frequency, P [mm] indicates the rolling element pitch, $D_w$ [mm] the diameter of the rolling element, z [−] indicates the number of rolling elements in a row, $\alpha$ [° ] indicates the contact angles of the rolling element, $f_i$ [Hz] indicates the internal ring rotation frequency, $f_e$ [Hz] indicates the outer ring rotation frequency. In order to determine the actual rotation speed of the inner ring or outer ring of the bearing, the monitoring unit is further connected to the engine inverter. Data measured by accelerometers 27, 29 and temperature sensors 43, 44 are evaluated by evaluation process comprising temperature compensation step, step of pairing the measured data, step of data modification using the transmission function, step of filtering the processed data, step of data modification and step of evaluating the similarity of the processed data to the model states. The step of evaluating similarity of the processed data to the model states is in this exemplary embodiment performed by machine on the basis of learned knowledge through neural network. The decision algorithm of the neural network is created on the basis of processed data and model states, where the physical significance of the processed data and model states correspond to each other. As can be seen in FIGS. 63 and 66, in this exemplary embodiment, the measured data $\{g_{201}(x), \ldots, g_{207}(x)\}$ shown in FIGS. 62 and 65 are similar to the model fault-free state $\{f_{201}(x), \ldots, f_{207}(x)\}$, which is shown in FIGS. 61 and 64. The neural network thus informs the information interface that the forming machine 54 is in fault-free state.

Figure 54:
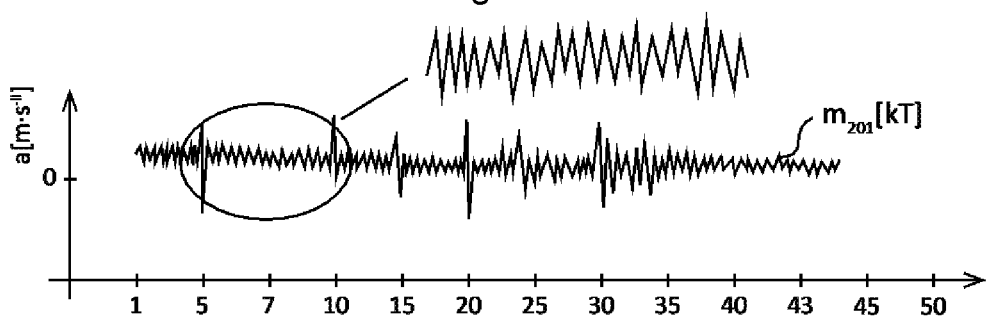
FIG. 54 shows the data measured by the first accelerometer in the time domain.
Figure 55:
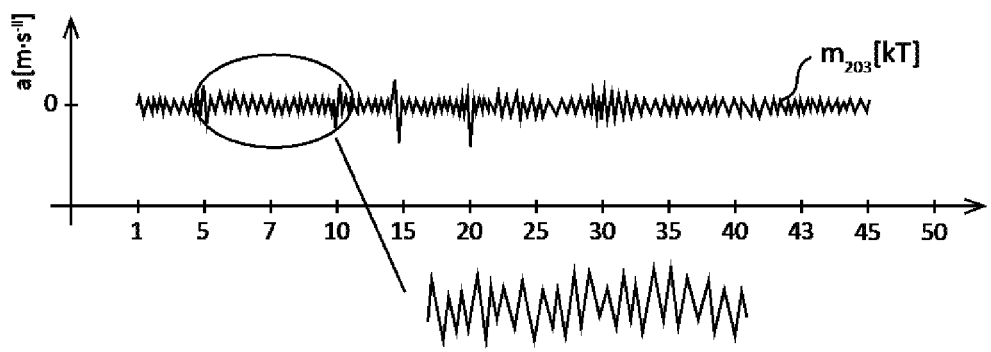
FIG. 55 shows the data measured by the third accelerometer in the time domain.
Figure 56:
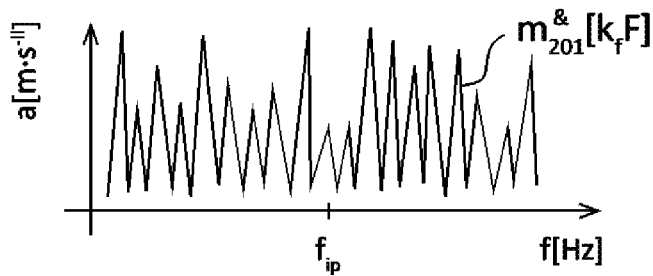
FIG. 56 shows the data measured by the first accelerometer in the frequency domain.

The sixth specific exemplary embodiment, with the exception of the measured data waveforms and the evaluation process, corresponds to the fifth specific exemplary embodiment. The data measured by the first accelerometer 27 are in the form of $m_{201}(kT)=\{m_{201}(1T), \ldots, m_{201}(nT)\}$, as can be seen in FIG. 54, and after the Fourier transform, the same data are $m_{201}(k_fF)=\{m_{201}(1F), \ldots, m_{201}(mF)\}$, as can be seen in FIG. 56, the data measured by the third accelerometer 29 are in the form of $m_{203}(kT)=\{m_{203}(1T), \ldots, m_{203}(mT)\}$, as can be seen in FIG. 55 and in the form of $M_{203}(k_fF)=\{m_{203}(1F), \ldots, m_{203}(mF)\}$, the data measured by the first temperature sensor 43 are in the form of $m_{218}(kT)=\{m_{218}(1T), \ldots, m_{218}(nT)\}$, the data measured by the second temperature sensor 44 are in the form of $m_{219}$ (kT)={$m_{219}$(1T), ..., $m_{219}$(nT)}, wherein n is the number of measured values, T s the measurement period, m is the number of discrete frequencies, and F is the period between individual frequencies. Data measured by accelerometers 29, 17 and temperature sensors 44, 43 are evaluated by the evaluation process comprising temperature compensation step, step of pairing the measured data, the step of data modification using the transmission function, the step of filtering the processed data, step of modification of the processed data and step of evaluating the similarity of the processed data to the model states, respectively. To modify the data using the transmission function, it is necessary to obtain the transmission function first. The transmission function $TF_{13}(z)$ is in this exemplary embodiment obtained experimentally, specifically by means of impulse response, wherein the impulse in this exemplary embodiment is a shock caused by stroke of the ram 36 through the blank to the frame 37. Alternatively, the shock may be created artificially. In order to determine the transmission function, the processed data $m_{201}^{\#}(kT)=\{m_{201}^{\#}(1T), ..., m_{201}^{\#}(nT)\}$, where n is the number of measured values and T is the measurement period are used, wherein this measurement period corresponds to the measurement period of the first accelerometer 27. To determine the transmission function, the data $m_{203}^{\#}(kT)=\{m_{203}^{\#}(1T), ..., m_{203}^{\#}(nT)\}$, where n is the number of measured values and T is the measurement period are further used, wherein the measurement period corresponds to the measurement period of the third accelerometer 29. Measurement of data $m_{201}^{\#}(kT)$ and $m_{203}^{\#}(kT)$ begins before the impulse and ends with the end of its propagation through the material. Measurement takes place in the fault-free state of the forming machine 54. Discrete measured signals are converted by Z-transformation into complex domain. First, a direct Z-transformation is used according to the rule:

$$M_i(z) = Z\{m_i(kT)\} = \sum_{k=0}^{n} m_i(kT)z^{-k} = m_i(0) + m_i(T)z^{-1} + m_i(2T)z^{-2} + ...$$

Through direct Z-transformation, a continuous function of the complex variable $M_i(z)$ from the function $m_i(kT)$ is obtained, thus obtaining the function $M_{201}^{\#}(z)$ and $M_{103}^{\#}(z)$. To derive the transmission function $TF_{13}(z)$ describing signal transmission by the forming machine 54 between the first accelerometer 27 and the third accelerometer 29, the measured discrete data from both accelerometers are used. Measured data from the first accelerometer 27 $M_{201}^{\#}(z)$ represent impulse. Measured data from the second accelerometer 29 $M_{203}^{\#}(z)$, which is located on the roller bearing bedding 38, represent the same impulse affected by the passage through the forming machine 54. The transmission function $TF_{13}(z)$ is obtained from knowledge of both discrete signals and can be expressed as $$TF_{13}(z) = \frac{M_{203}^{\#}(z)}{M_{201}^{\#}(z)},$$

where $M_{201}^{\#}(z)$ is input signal, $M_{203}^{\#}(Z)$ is output signal and $TF_{13}(z)$ is transmission function in the Z-transformation domain. The first step of the evaluation process is the temperature compensation step of data measured by the first accelerometer 27 $m_{201}(kT)$ and by the third accelerometer 29 $m_{203}(kT)$ using data measured by the first temperature sensor 43 $m_{218}(kT)$ and by the second temperature sensor 44 $m_{219}(kT)$. The change in temperature sensitivity is described by the relation $C_A(K)$, where K is the temperature. Data $m_{201}^{\%}(kT)$ and $m_{203}^{\%}(kT)$ are obtained through temperature compensation. Temperature compensation can be described by equations:

$$m_{201}^{\%}(kT)=m_{201}(kT)C_A(m_{218}(kT)),$$

$$m_{203}^{\%}(kT)=m_{203}(kT)C_A(m_{219}(kT)).$$

The second step of the evaluation process is the step of pairing the measured data $m_{201}^{\%}(kT)$ and $m_{203}^{\%}(kT)$, where each $m_{201}^{\%}(kT)$ value is assigned a corresponding $m_{203}^{\%}(kT)$ value. The processed $m_{201}^{\%}(kT)$ data are transformed using the transmission function to $M_{201}^{TF13}(z)$ data. The transformation is done by multiplying $M_{201}^{\%}(z)$ and $TF_{13}(z)$, thus, the transformation can be expressed by the equation:

$$M_{201}^{TF13}(z)=(M_{201}^{\%}(z))TF_{13}(z).$$

Transformed $M_{201}^{TF13}(z)$ data in the complex domain can be converted into the time domain by the reverse Z-transformation according to equation:

$$m_{201}^{TF13}(kT) = Z^{-1}\{M_{201}^{TF13}(z)\} = \frac{1}{2\pi j}\oint_C M_{201}^{TF13}(z)z^{k-1}dz.$$

Figure 58:
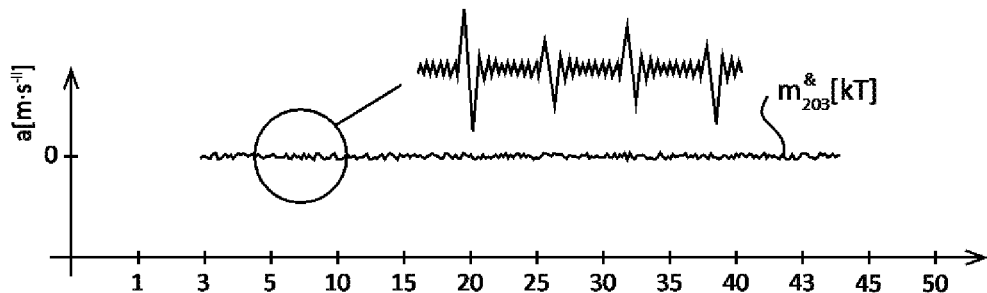
FIG. 58 shows the processed data in the time domain.

Curve C includes all poles of $M_{201}^{TF13}(z)z^{k-1}$. The third step is the step of filtering the processed data, with data $m_{201}^{\%}(kT)$ and $m_{201}^{TF13}(kT)$ being deducted from each other, resulting in processed data $m_{203}^{\&}(kT)$ in FIG. 58. The step of filtering the processed data can therefore be expressed by equation:

$$m_{203}^{\&}(kT)=m_{203}^{\%}(kT)-m_{201}^{TF13}(kT).$$

Figure 57:
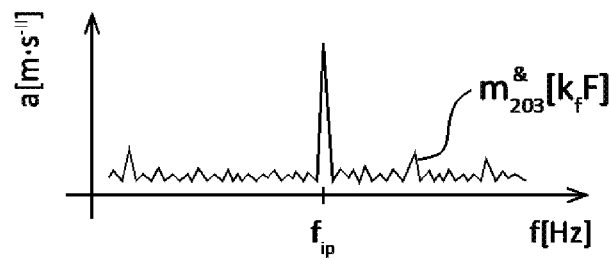
FIG. 57 shows the processed data in the frequency domain.
Figure 59:
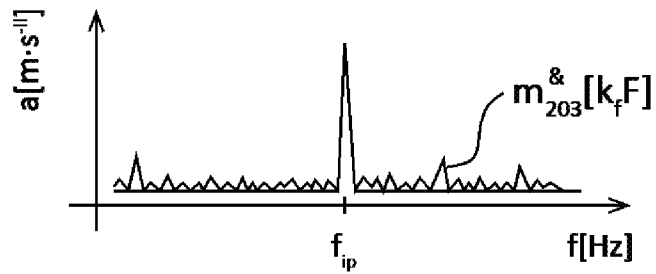
FIG. 59 shows a comparison of the processed data and the model fault state of inner bearing ring in the frequency domain.
Figure 60:
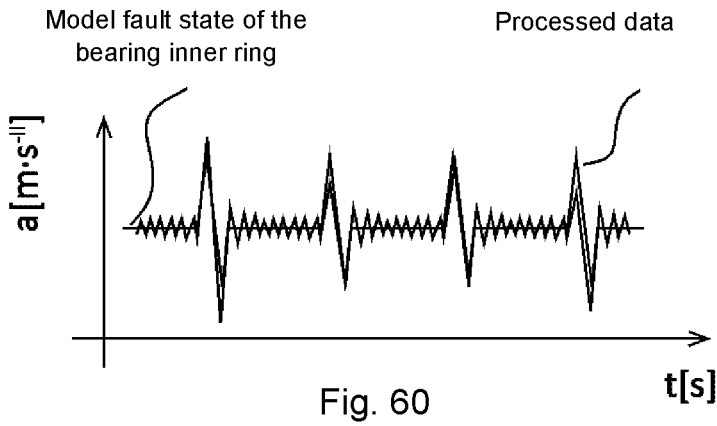
FIG. 60 shows a comparison of the processed data and the model fault state of inner bearing ring in the time domain.

The fourth step is the step of modifying the processed data, in which frequencies other than the fault frequency of the inner ring J are suppressed by filtration in the processed data $m_{203}^{\&}(kT)$. The fifth step is the step of evaluating the similarity of processed data to model states. In the fifth step, a Fourier transform is performed and the data $m_{203}^{\&}(k_fF)$ in FIG. 57 are compared in the frequency domain, wherein the comparison is performed by machine on the basis of the input knowledge. The bearing internal ring fault frequency will manifest itself only in case of its fault. As can be seen in FIGS. 59 and 60, in this exemplary embodiment, the processed data and the model fault state of the bearing inner ring are similar, and the neural network thus informs the information interface that the forming machine 54 is in the model fault state of the bearing inner ring.

Figure 67:
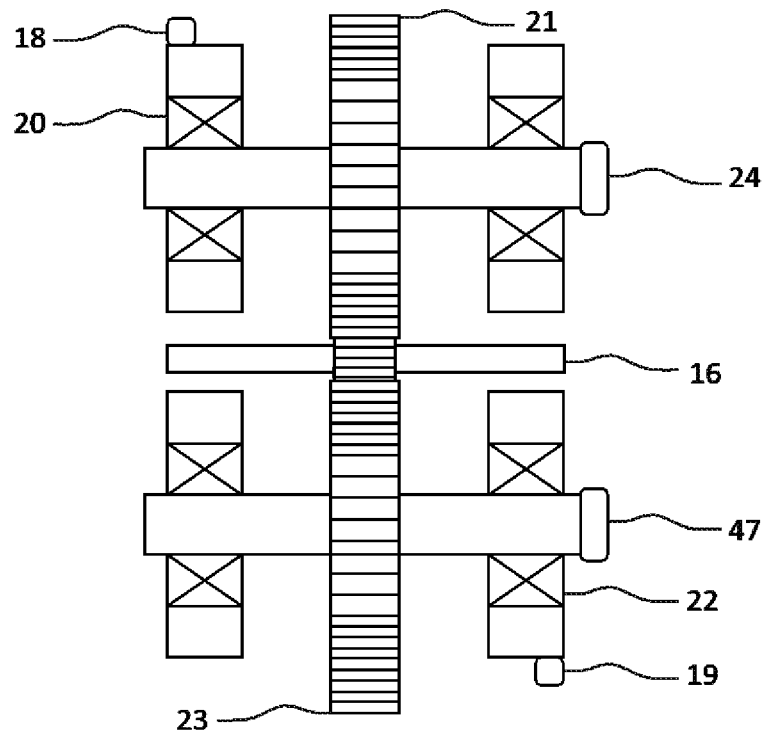
FIG. 67 shows a rolling machine with two tools.

In the seventh specific exemplary embodiment, the machine is a forming machine, specifically two-tool rolling machine depicted in FIG. 67 and comprising a forming part. The sensors used in this exemplary embodiment are two piezoelectric accelerometers 18, 19 and two rotary encoders 24, 47. The first piezoelectric accelerometer 18 is placed on the first roller bearing 20 of the first tool 21 and scans the vibrations of the first tool 21, the second piezoelectric accelerometer 19 is placed on the second roller bearing 22 of the second tool 23 and scans the vibrations of the second tool 23, the first rotary encoder 24 is placed on the first tool 21 and scans the position of the first tool 21, the second rotary encoder 47 is placed on the second tool 23 and scans the position of the second tool 23. The control part includes the monitoring unit and the computing device. The computing device is in this exemplary embodiment a remote server.

The monitoring unit is directly data connected to the piezoelectric accelerometers 18, 19, and via the machine control system it is data connected to the rotary encoders 24, 47. The direct data connection of the monitoring unit with the piezoelectric accelerometers 18, 19 is in this exemplary embodiment provided by wires. The movement of tools 21, 23 during the forming process, in this exemplary embodiment, consists of rotary movement and of translational movement. The rotary movement of tools 21, 23 is a rotary movement around their own axis. The translational movement of tools 21, 23 is a translational movement towards each other. By combining the rotary and translational movements of the tools 21, 23, the individual tool teeth 48 are pushed into the blank 16 shown in FIG. 68. Vibrations occur at contact point 49 of the tool and the formed product during pushing of each tooth 48. In this exemplary embodiment, three model states are stored in the memory of the control part: the model fault-free state including $\{f_{333}(x), f_{334}(x), f_{335}(x), f_{336}(x)\}$, the waveform of which can be seen in FIGS. 69, 70, the model fault state of the tool tooth damage including $\{f_{331}(x), f_{332}(x)\}$, the waveform of which can be seen in FIG. 71, the model fault state of the crack in the blank including $\{f_{337}(x), f_{338}(x)\}$, the waveform of which can be seen in FIG. 72. The model fault state of the tool tooth damage is derived using the theoretical physical description of the behaviour of the forming machine during operation, wherein the simulated waveform $m_{301}(kT)$, where k is the measurement step and T is the measurement period and which can be seen in FIG. 73, corresponds to the waveforms measured by the first piezoelectric accelerometer 18 and the simulated waveform $m_{333}(kT)$, where k is the measurement step and T is the measurement period and which can be seen in FIG. 73, corresponds to the waveforms measured by the first rotary encoder 24. The waveforms thus simulated are further processed by steps that are identical to the steps of the evaluation process. The simulated waveforms are first modified by the step of data modification. In this step, the simulated waveform $m_{331}(kT)$ is filtered by a high pass filter type with a limit frequency of 20 kHz, resulting in a $m_{331}°(kT)$ function. The second step is the step of pairing the measured data, where corresponding value of function $m_{331}°(kT)$ is assigned to each value of the simulated waveform $M_{333}(kT)$. The third step is the step of filtering the processed data, wherein the filter parameters are determined by the processed simulated waveform $m_{333}(kT)$ and the function $m_{331}°(kT)$ is processed by the filtered data. The filtration is carried out so that the time variable kT of the processed simulated waveform $m_{333}°(kT)$ is applied on the time variable kT of the processed function $m_{331}°(kT)$, thereby obtaining function $m_{331}°(jpT_e)$, where j is the order of the tool rotation, p is the positioning step and $T_e$ is the position measurement period. Then, for each p, the arithmetic mean of the absolute value at the given point is obtained and the function $m_{331}{}^{\&}(pT_e)$ is obtained, where p is the positioning step and $T_e$ is the position measurement period, which can be expressed by the equation:

$$m_{331}^{\&}(pT_e) = \frac{1}{j}\sum_{1}^{j}|m_{331}(jpT_e)|.$$

The obtained function $m_{331}{}^{\&}(pT_e)$ has suppressed noise and highlighted status information. The fourth step is the step of data modification. In this step, demodulation of $m_{331}{}^{\&}(pT_e)$ function is performed by means of bandpass filtering comprising a frequency corresponding to the number of teeth z on tool 21, the result of this step being the processed function $m_{331}{}^{\&°}(pT_e)$. The frequency corresponding to the number of teeth $z_t$ on the tool 21 is supposed to mean the reversed value of the number of teeth of the tool 21 in the time domain, which touch the product 16 in one second. The processed function $m_{331}{}^{\&°}(pT_e)$ is further statistically evaluated in the fifth step of the data modification by determining the minimum φ of the function, then dividing the function from the given minimum φ point into z identical intervals of the size of $$\frac{2\pi}{z_t}.$$

Figure 74:
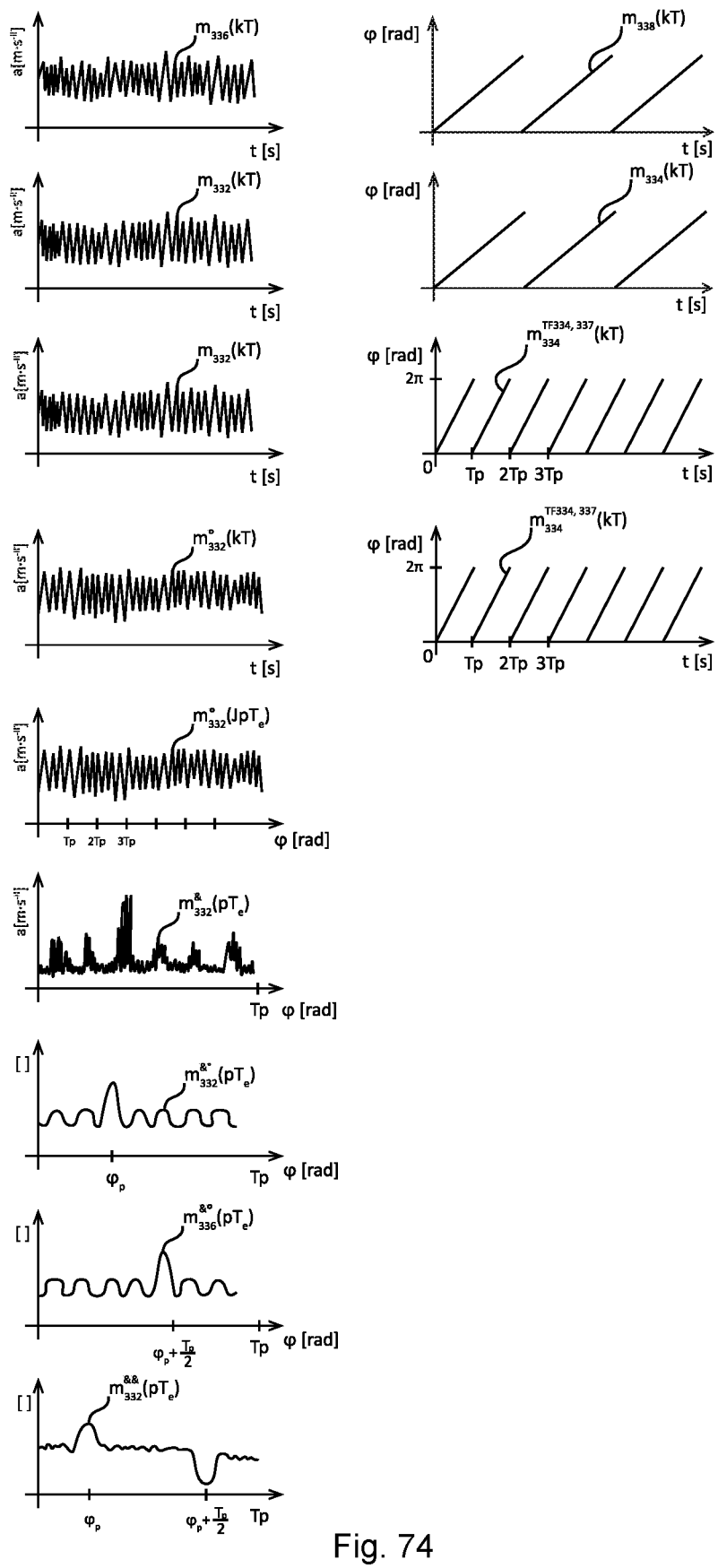
FIG. 74 shows the processing of simulated data in a fault state of a crack in a blank.

A local maximum is determined on each interval $z_i$. The result is a set of local maxima. The set is further statistically evaluated and the minimum and standard deviation are determined. From these values, trends are compiled, represented by the functions of the minima from the maxima $f_{331}(x)$ and the standard deviations of the maxima $f_{332}(x)$. These trends constitute a model fault state of the tool teeth damage. The fault-free model state is created by similar procedure and is therefore represented by set of two functions, the first function being the function of the smallest maxima $f_{333}(x)$ and the second function being the function of the standard deviations of the maxima $f_{334}(x)$. The model fault state of the crack in the blank is derived using the theoretical physical description of the behaviour of the forming machine during operation, wherein the simulated waveform $m_{336}(kT)$, where k is the measurement step and T is the measurement period and which can be seen in FIG. 74, corresponds to the waveforms measured by the first piezoelectric accelerometer 18, the simulated waveform $M_{332}(kT)$, where k is the measurement step and T is the measurement period and which can be seen in FIG. 74, corresponds to the waveforms measured by the second piezoelectric accelerometer 19, the simulated waveform $m_{338}(kT)$, where k is the measurement step and T is the measurement period and which can be seen in FIG. 74, corresponds to the waveforms measured by the first rotary encoder 24 and the simulated waveform $m_{334}(kT)$, where k is the measurement step and T is the measurement period and which can be seen in FIG. 74, corresponds to the waveforms measured by the second rotary encoder 47. The steps thus simulated are further processed by steps that are identical to the steps of the evaluation process. In the first step, the simulated waveforms are modified by the data modification step using the transmission function. The transmission function $TF_{334,337}$, is applied to the simulated waveform $m_{334}(kT)$, which is obtained on the basis of the theoretical physical description of the behaviour of the forming machine during operation. This step can be expressed by equation:

$$m_{334}{}^{TF334,337}(kT)=m_{334}(kT)TF_{334,337}$$

The second step is the step of data modification, where the simulated waveform $m_{332}(kT)$ is modified by a high pass filter type with a limit frequency of 20 kHz, resulting in the function $m_{332}(kT)$. The third step is the step of pairing the measured data, where a corresponding value of function $m_{334}{}^{TF334,337}(kT)$ is assigned to each value of function $m_{332}°(kT)$. The fourth step is the step of filtering the processed data, wherein the filter parameters are determined by the processed function $m_{334}{}^{TF334,337}(kT)$ and the filtered data is the processed function $m_{332}°(kT)$. The filtration is carried out so that the time variable kT of the processed function $m_{334}^{TF334,337}$ is applied on the time variable kT of the processed function $m_{332}^{\circ}(kT)$ thereby obtaining function $m_{332}^{\circ}(jpT_e)$, where j is the order of the tool 47 rotation, p is the positioning step and $T_e$ is the position measurement period. Then, for each p, the arithmetic mean of the absolute value at the given point is obtained and the function $m_{332}^{\&}(pT_e)$ is obtained, where p is the positioning step and $T_e$ is the position measurement period, which can be expressed by equation:

$$m_{332}^{\&}(pT_e) = \frac{1}{j}\sum_{1}^{j}|m_{332}(jpT_e)|$$

The obtained function $m_{332}^{\&}(pT_e)$ has suppressed noise and highlighted status information. The fifth step is the step of data modification. In this step, demodulation of function $m_{332}^{\&}(pT_e)$ is performed by means of bandpass filtering comprising a frequency corresponding to the number of teeth $z_s$ of the tool, the result of this step being the function $m_{332}^{\&\circ}(pT_e)$. The frequency corresponding to the number of teeth $z_s$ of the tool is supposed to mean the reversed value of the number of teeth of the tool 23 in the time domain, which touch the product in one second. Further, the first to fifth steps are repeated for the simulated waveforms $m_{336}(kT)$ and $m_{338}(kT)$, wherein the function $m_{336}^{\&\circ}(pT_e)$ is the result of the fifth step. The sixth step is the step of filtering the processed data, wherein the filter parameters are determined by the processed function $m_{332}^{\&\circ}(pT_e)$ and the filtered data is the processed function $m_{336}^{\&\circ}(pT_e)$. The filtering operation is performed so that the processed functions $m_{332}^{\&\circ}(pT_e)$ and $m_{336}^{\&\circ}(pT_e)$ are deducted from each other and the result is the processed function $m_{332}^{\&\&}(pT_e)$, which can be expressed by equation:

$$m_{332}^{\&\&}(pT_e) = m_{332}^{\&\circ}(pT_e) - m_{336}^{\&\circ}(pT_e)$$

The processed function $m_{332}^{\&\&}(pT_e)$ is further statistically evaluated in the data modification step by determining the minimum and maximum function, and the angular distance between the maximum and the minimum and the difference of the maximum and minimum of the processed function $m_{332}^{\&\&}(pT_e)$ are observed, and trends are subsequently created from these values, where the angular distance between the minimum and maximum is represented by function $f_{337}(x)$ and the difference between the maximum and the minimum is represented by function $f_{338}(x)$. These trends represent a model fault state of the crack in the blank. In this exemplary embodiment, the measured data are for the determination of the damage of the tool teeth processed by the same steps as the simulated waveforms $m_{331}(kT)$ and $m_{333}(kT)$ to derive a model fault state of the tool tooth. Functions $g_{333}(x)$ and $g_{334}(x)$ in FIG. 75 then correspond to the processed waveforms. In this exemplary embodiment, in order to determine the crack in the blank, the measured data are processed by the same steps as the simulated waveforms $m_{332}(kT)$, $m_{334}(kT)$, $m_{336}(kT)$ and $m_{338}(kT)$ to derive the model fault state of the crack in the blank. Functions $g_{335}(x)$ and $g_{336}(x)$ in the FIG. 76 then correspond to the processed waveforms. The step of evaluating the similarity of the processed data to the model states is performed in this exemplary embodiment via the information interface, namely via the touch screen of the machine control system. As can be seen in in FIGS. 77 and 80, the processed data $g_{333}(x)$ and $g_{334}(x)$, $g_{335}(x)$ and $g_{336}(x)$, the model fault-free state $f_{333}(x)$ and $f_{334}(x)$, $f_{335}(x)$ and $f_{336}(x)$ correspond to each other, since the waveforms are similar. As can be seen in FIG. 78, the processed data $g_{333}(x)$, $g_{334}(x)$ do not correspond to the model fault state of the tool tooth damage $f_{331}(x)$, $f_{332}(x)$, since the waveforms are not similar. As can be seen in FIG. 79, the processed data $g_{335}(x)$, $g_{336}(x)$ do not correspond to the model fault state of the crack in the blank $f_{337}(x)$, $f_{338}(x)$, since the waveforms are not similar. Based on the results of the comparison, information is issued on the information interface that the rolling machine is in a fault-free state.

The eighth specific exemplary embodiment, with the exception of the measured data waveforms and the result of the step of evaluating similarity of the processed data to the model states, corresponds to the seventh specific exemplary embodiment. In this exemplary embodiment, to determine the tool tooth damage, the measured data are processed by the same steps as the simulated waveforms $m_{331}(kT)$ and $m_{333}(kT)$ for deriving the model fault state of the tool tooth damage in the seventh specific exemplary embodiment. Functions $g_{331}(x)$ and $g_{332}(x)$ in FIG. 81 then correspond to the processed waveforms. In this exemplary embodiment, in order to determine the crack in the blank, the measured data are processed by the same steps as the simulated waveforms $m_{332}(kT)$, $m_{334}(kT)$, $m_{336}(kT)$ and $m_{338}(kT)$ for deriving the model fault state of the crack in the blank. Functions $g_{337}(x)$ and $g_{338}(x)$ in the FIG. 82 then correspond to the processed waveforms. The step of evaluating the similarity of the processed data to the model states is performed in this exemplary embodiment via the information interface, namely via touch screen of the machine control system. As can be seen in FIGS. 83 and 84, the processed data $g_{331}(x)$ and $g_{332}(x)$, $g_{337}(x)$ and $g_{338}(x)$, the model fault-free state $f_{333}(x)$ and $f_{334}(x)$, $f_{335}(x)$ and $f_{336}(x)$ do not correspond to each other, since the waveforms are not similar. As can be seen in FIG. 85, the processed data $g_{331}(x)$, $g_{332}(x)$ correspond to the model fault state of the tool tooth damage $f_{331}(x)$, $f_{332}(x)$, since the waveforms are similar. As can be seen in FIG. 86, the processed data $g_{337}(x)$, $g_{338}(x)$ do not correspond to the model fault state of the crack in the blank $f_{337}(x)$, $f_{338}(x)$, since the waveforms are not similar. Based on the results of the comparison, information is issued to the information interface that the rolling machine is in tool tooth damage fault state, with the damage of the tooth 17.

Figure 92:
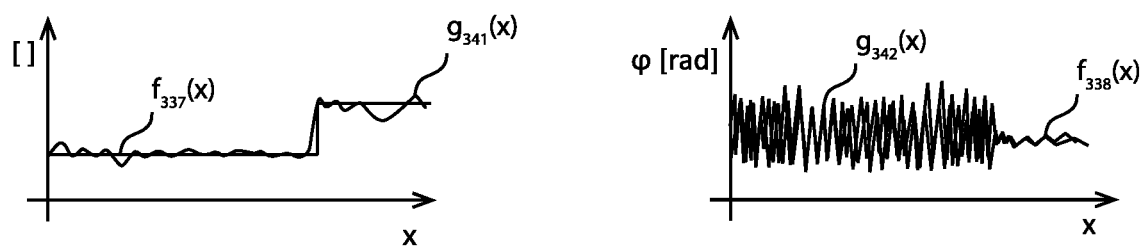
FIG. 92 shows a comparison of the processed data of the ninth specific exemplary embodiment and the model fault state of a crack in a blank.

The ninth specific exemplary embodiment, with the exception of the measured data waveforms and the result of the step of evaluating similarity of the processed data to the model states, corresponds to the seventh specific exemplary embodiment. In this exemplary embodiment, to determine the tool tooth damage, the measured data are processed by the same steps as the simulated waveforms $m_{331}(kT)$ and $m_{333}(kT)$ for deriving a model fault state of the tool tooth damage in the seventh specific exemplary embodiment. Functions $g_{339}(x)$ and $g_{340}(x)$ in FIG. 87 then correspond to the processed waveforms. In this exemplary embodiment, in order to determine the crack in the blank, the measured data are processed by the same steps as the simulated waveforms $m_{332}(kT)$, $m_{334}(kT)$, $m_{336}(kT)$ and $m_{338}(kT)$ for deriving the model fault state of the crack in the blank. Functions $g_{341}(x)$ and $g_{342}(x)$ in the FIG. 88 then correspond to the processed waveforms. The step of evaluating the similarity of the processed data to the model states is performed in this exemplary embodiment via the information interface, namely via touch screen of the machine control system. As can be seen in FIGS. 89 and 90, the processed data $g_{339}(x)$ and $g_{340}(x)$, $g_{341}(x)$ and $g_{342}(x)$, the model fault-free state $f_{333}(x)$ and $f_{334}(x)$, $f_{335}(x)$ and $f_{336}(x)$ do not correspond to each other, since the waveforms are not similar. As can be seen in FIG. 91, the processed data $g_{339}(x)$, $g_{340}(x)$ do not correspond to the model fault state of the tool tooth damage $f_{331}(x)$, $f_{332}(x)$, since the waveforms are not similar. As can be seen in FIG. 92, the processed data $g_{341}(x)$, $g_{342}(x)$ correspond to the model fault state of the crack in the blank $f_{337}(x)$, $f_{338}(x)$, since the waveforms are similar. Based on the results of the comparison, information is issued on the information interface that the rolling machine is in the fault state of the crack in the blank.

Figure 5:
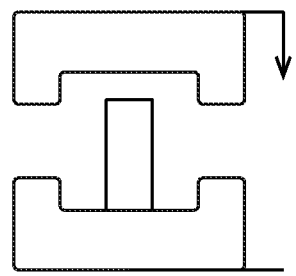
FIG. 5 shows a time point of forming 7.
Figure 6:
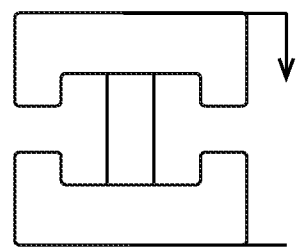
FIG. 6 shows a time point of forming 10.
Figure 7:
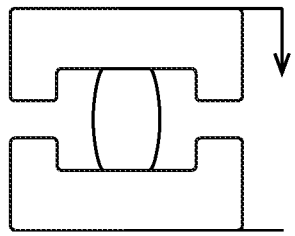
FIG. 7 shows a time point of forming 15.
Figure 8:
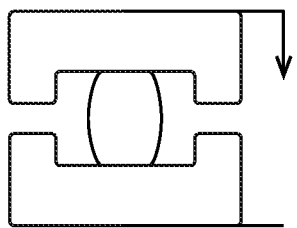
FIG. 8 shows a time point of forming 20.
Figure 9:
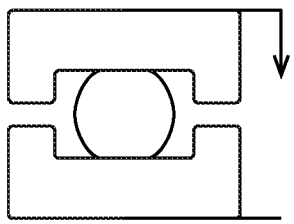
FIG. 9 shows a time point of forming 25.
Figure 10:
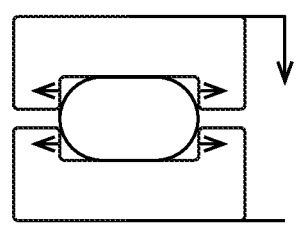
FIG. 10 shows a time point of forming 30.
Figure 11:
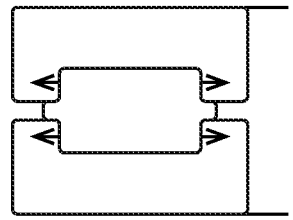
FIG. 11 shows a time point of forming 35.
Figure 12:
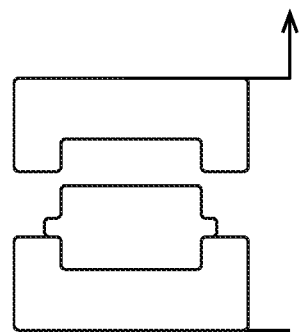
FIG. 12 shows a time point of forming 40.
Figure 13:
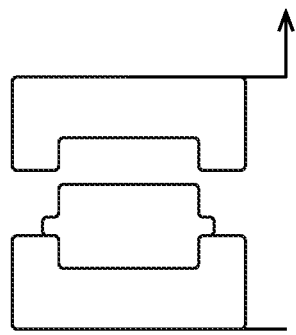
FIG. 13 shows a time point of forming 43.
Figure 14:
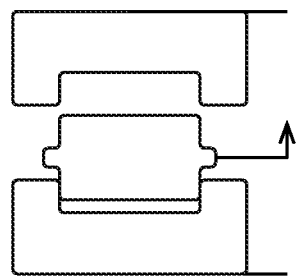
FIG. 14 shows a time point of forming 45.
Figure 15:
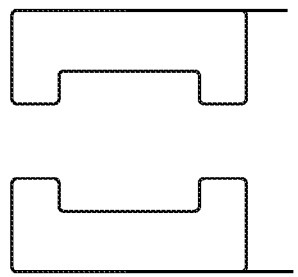
FIG. 15 shows a time point of forming 50.
Figure 16:
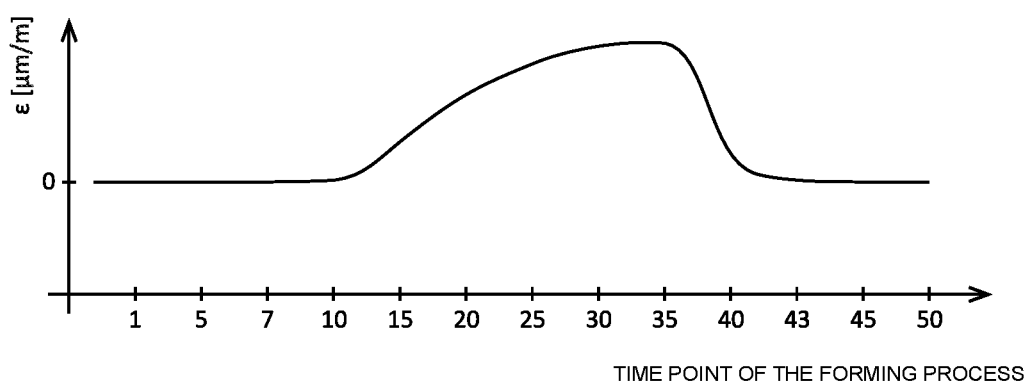
FIG. 16 shows the lower die deformation waveform during the forming process.
Figure 17:
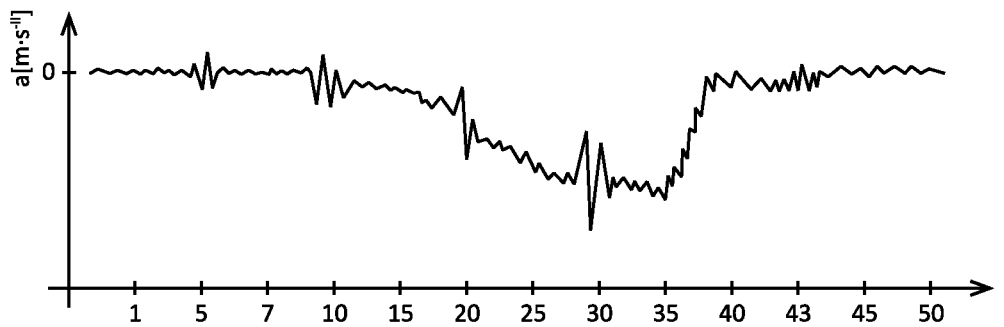
FIG. 17 shows the lower die vibration waveform during the forming process.
Figure 18:
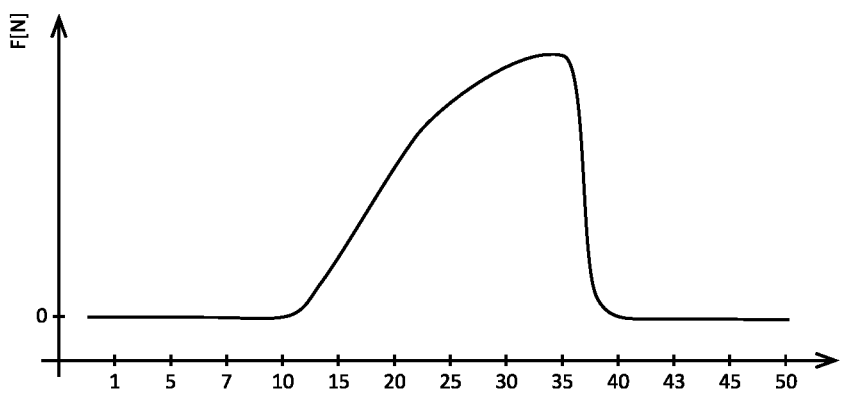
FIG. 18 shows the forging force waveform during the forming process.
Figure 19:
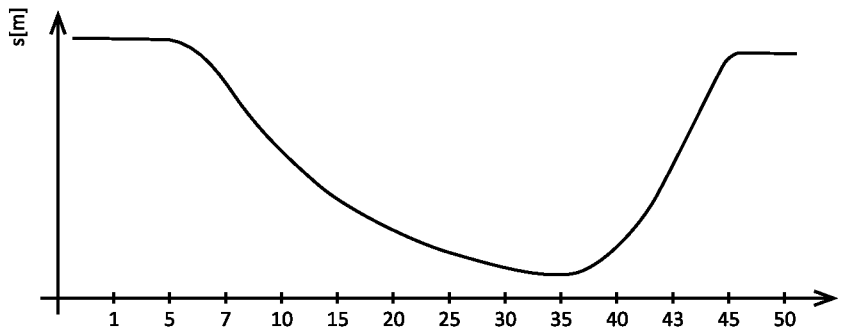
FIG. 19 shows the position of the ram waveform during the forming process.
Figure 93:
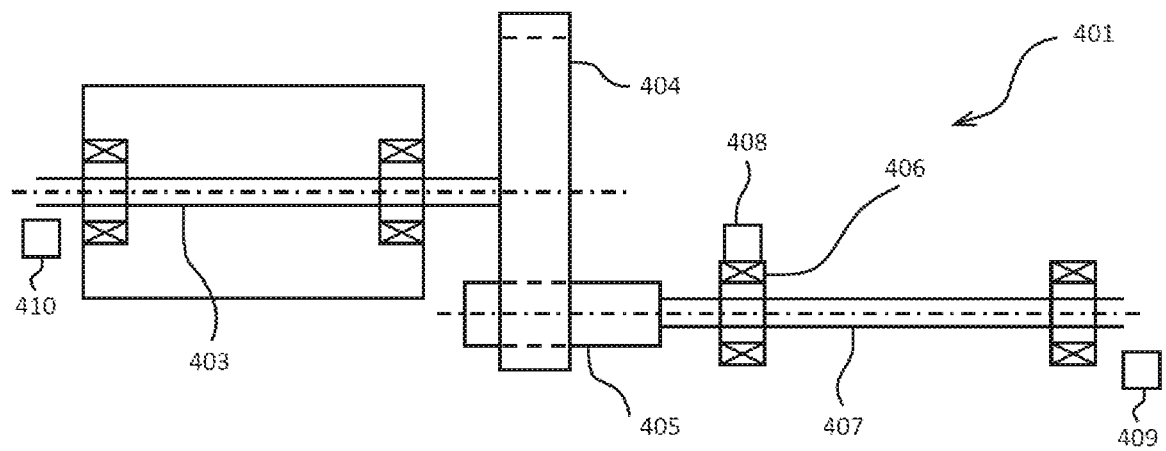
FIG. 93 shows a scheme of a diagnosed grinder.
Figure 94:
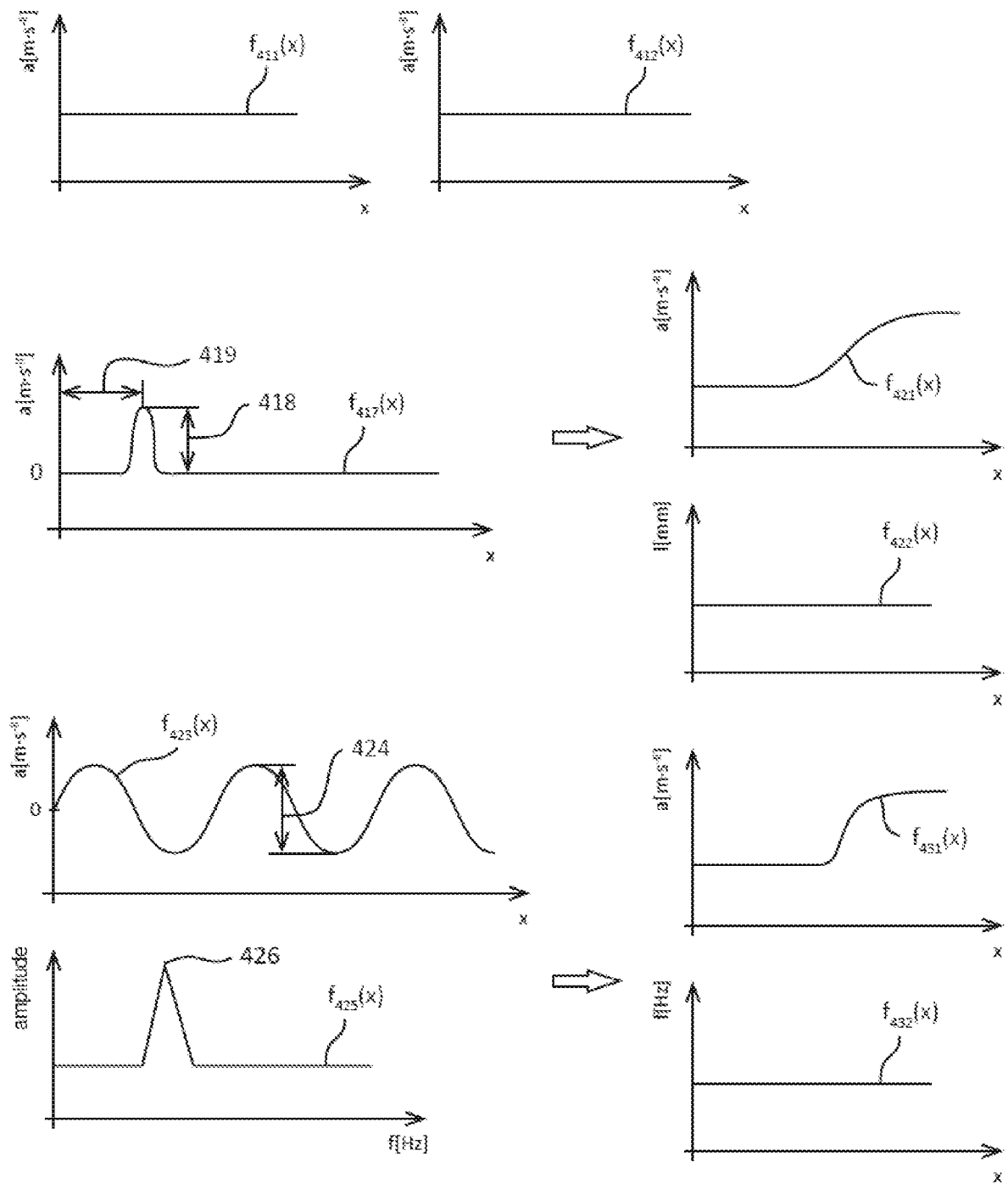
FIG. 94 shows a model fault-free state, a model fault state of wear of machine parts, and model fault state of the workpiece geometry.
Figure 95:
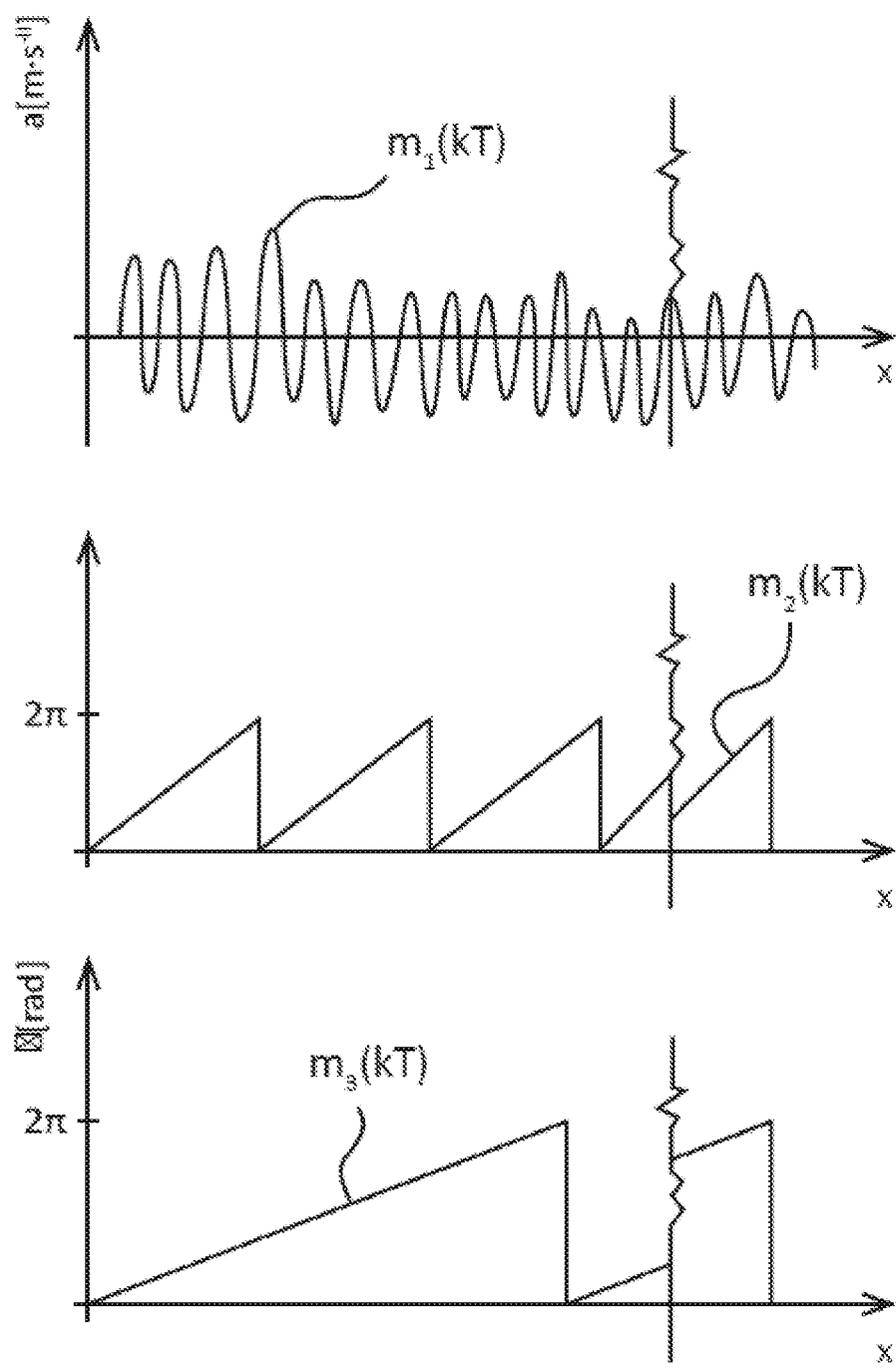
FIG. 95 shows paired data from piezoelectric accelerometer and the first rotary encoder and the second rotary encoder.
Figure 96:
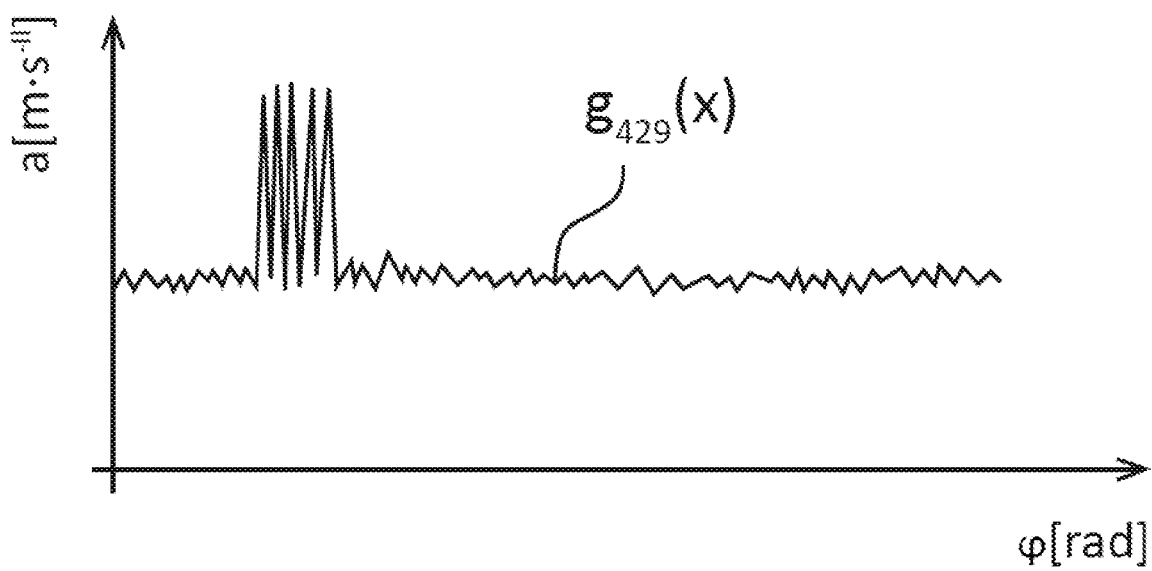
FIG. 96 shows waveform of processed data $g_{429}(x)$.
Figure 97:
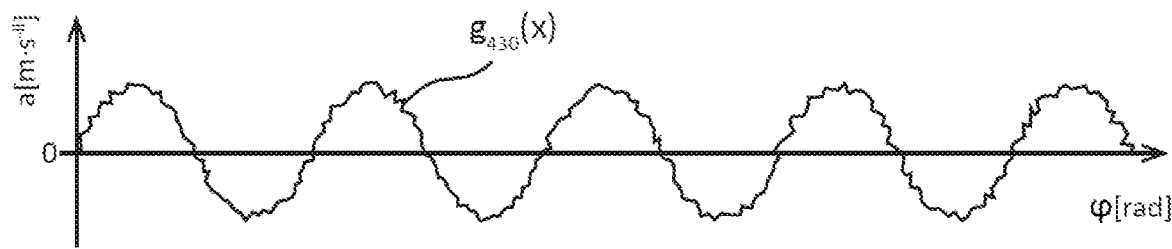
FIG. 97 shows waveform of processed data $g_{430}(x)$.
Figure 98:
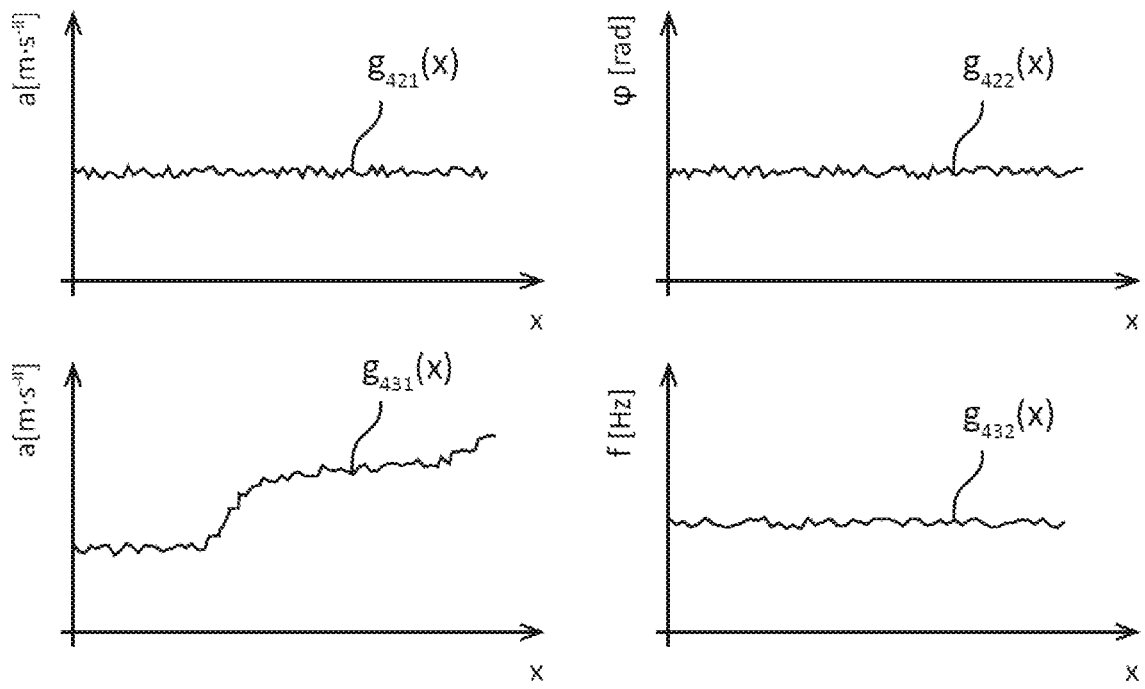
FIG. 98 shows trends of processed data $g_{420}(x)$, $g_{421}(x)$, $g_{430}(x)$, and $g_{431}(x)$.
Figure 99:
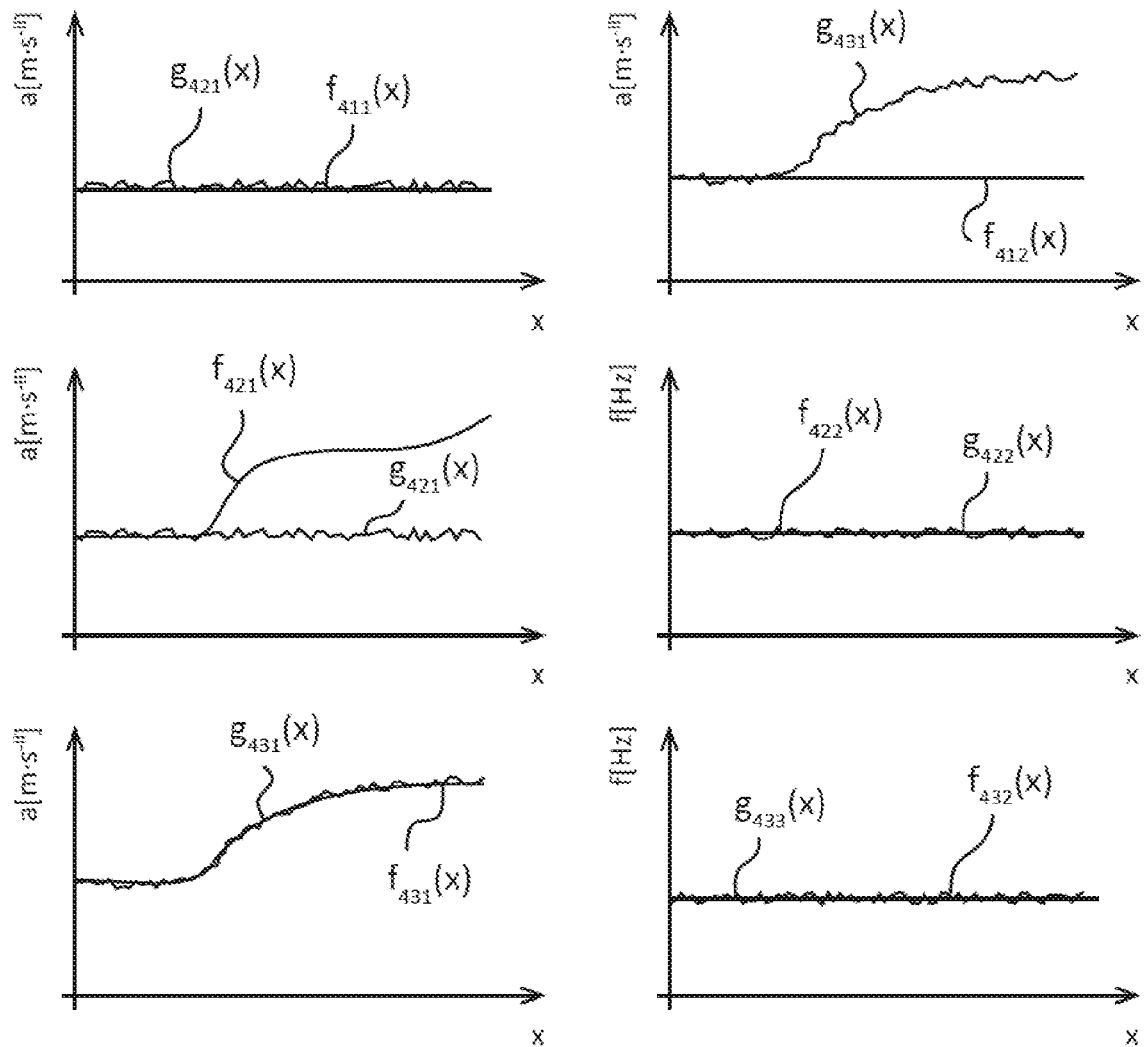
FIG. 99 shows a comparison of waveforms of processed data and model states.

In the tenth specific exemplary embodiment, the machine is a production machine, specifically a grinder 401 illustrated in FIG. 93. The sensors used are a piezoelectric accelerometer 408 and two rotary encoders 409, 410. The piezoelectric accelerometer 408 is located on a bearing house of a bearing 406 of the grinding spindle 407 of the grinder 401. The first rotary encoder 409 is located on the grinding spindle 407 of the grinder 401 and it scans the position of the grinding spindle 407 or the position of the grinding tool 405, respectively. The second rotary encoder 410 is located on the driving spindle 403 of the grinder 401 and it scans the position of the driving spindle 403 or the position of the workpiece 404, respectively. The control part of the diagnostic system consists of a monitoring unit and a computing device, which is a remote server. The monitoring unit is directly data-connected to the piezoelectric accelerometer 408 and to both rotary encoders 409, 410. In this exemplary embodiment, three model states are saved in the control part memory: model fault-free state, illustrated in FIG. 94 and described by curves $\{f_{411}(x), f_{412}(x)\}$, model fault state of wear of a grinding tool 405 part, illustrated in FIG. 5 and described by curves $\{f_{421}(x), f_{422}(x)\}$, and model fault state of a workpiece 404 geometry, illustrated in FIG. 94 and described by curves $\{f_{431}(x), f_{432}(x)\}$. The waveforms of the model fault-free state, model fault state of the wear of grinding tool 405 part and the model fault state of the workpiece 404 geometry are simulated on the basis of theoretical physical description of the behavior of the grinder 401 during operation modified on the basis of preceding measurements of the real behavior of the grinder during operation and they are processed by means of the same steps used for processing measured data according to this exemplary embodiment. The model fault state of the workpiece 404 geometry is, in this exemplary embodiment, caused by the fault of a remote transmission device of the grinder 401 hydraulic aggregate. The fault in the model fault state of the wear of the grinding tool 405 is manifested by a change in the size 418 of the amplitude of the model waveform of curve $f_{417}$ in a specific angular rotation 419 of the shaft. The fault in the model fault state of the workpiece 404 geometry is manifested by the frequency 426 of the workpiece 404 geometry fault, which is visualized on the model waveform of the curve $f_{423}$, wherein the frequency 426 of workpiece 404 geometry faults is determined by the biggest amplitude in the frequency spectrum of the curve $f_{423}$, determined by the curve $f_{425}$ and the amplitude size 424 of the waveform of the model curve $f_{423}$. The measured data from the piezoelectric accelerometer 408 are marked as $m_1(kT)=\{m_1(1T), \ldots, m_1(nT)\}$, the measured data from the first rotary encoder 409 are marked as $m_2(kT)=\{m_2(1T), \ldots, m_2(nT)\}$, and the measured data from the second rotary encoder 410 are marked as $m_3(kT)=\{m_3(1T), \ldots, m_3(nT)\}$, wherein n is a number of measured values and T is a measurement period. These measured data are evaluated by an evaluating process, in which the first step is the step of pairing the measured data. In the step of pairing the measured data, every value $m_1(kT)$ is being assigned a corresponding value $m_2(kT)$ and $m_3(kT)$. Data paired in such a way already carry information of vibration value in every position of the shaft 407, 403. Paired data are depicted in FIG. 95. The second step is the step of filtrating the processed data. In this step, data from the piezoelectric accelerometer 408 are summed up in relation to the position of the grinding spindle 407 and driving spindle 403, and to the kinematics of the diagnosed assembly. Thus, data are formed, which correspond exactly to one period of the diagnosed machine part. In this step, filtration of data $m_1(kT)$ from the piezoelectric accelerometer 408 by a filter determined by data $m_2(kT)$ from the first rotary encoder 409 located on the grinding spindle 407 is thus performed. Data $m_1(kT)$ are thus summed up exactly in every measured point $T_{409}=t_n+2\pi$ of the grinding spindle 407, wherein $t_n$ is the given point of measurement. At the same time, the filtration of data $m_1(kT)$ from the piezoelectric accelerometer 408 is performed using the filter determined by data $m_3(kT)$ of the second rotary encoder 410 located on the driving spindle 403. Data $m_1(kT)$ are thus summed up simultaneously exactly in every measured point $T_{410}=t_n+2\pi$ of the driving spindle 403, wherein $t_n$ is the given point of measurement. For every measured point of the position p, arithmetic mean of processed data according to formulas is further determined:

$$m_{12}^{\&}(pT_2) = g_{429}(x) = \frac{1}{j}\sum_{1}^{j} m_1(jpT_2)$$

$$m_{13}^{\&}(pT_3) = g_{430}(x) = \frac{1}{j}\sum_{1}^{j} |m_1(jpT_3)|$$

wherein j is the rank of the turn of the said shaft. With such modified data, while summing up the data from sufficient amount of turns, suppression of noise occurs, which is high in case of data measured on machine-tools, and thus the carrier information is highlighted. The third step is a data modification step, in which the processed data are filtered by lower die-type filter with the marginal frequency of 100 Hz. Waveforms of the processed data $g_{429}$ and $g_{430}$ are shown in FIGS. 96 and 97. Further, a modification of data $g_{429}$ is performed in this step, from which trend sets $\{g_{421}, g_{122}\}$ are created, as well as a modification of data $g_{430}$, from which trend sets $\{g_{431}, g_{432}\}$ are created. The processed data $g_{430}$ are transformed by fast Fourier transformation into frequency field and they are monitored for the fault frequency of the model fault state of a grinding tool 405. The fault frequency value creates the curve $g_{432}$. The fault amplitude size is analyzed by Min-Max method, which consists of the deduction of the lowest value of the processed data from the highest one. The trend of these amplitudes creates the curve $g_{431}$. The processed data $g_{429}$ are monitored for the fault in the same angular rotation of the grinding spindle 407. The value trend of these angular rotations creates the curve $g_{422}$. The fault amplitude size is analyzed by the Min-Max method. The trend of these amplitudes creates the curve $g_{421}$, which can be seen in FIG. 98. The fourth step is a step of evaluating similarity of the processed data and the model states. The similarity evaluation is, in this exemplary embodiment, performed by information interface, which is, in this exemplary embodiment, represented by a personal computer. As can be seen in FIG. 99, the processed groups of data $\{g_{421}, g_{431}\}$ do not correspond to the model fault-free state described by the curves $\{f_{411}, f_{412}\}$, because waveforms are not similar to each other. As it is shown in FIG. 99, the processed data sets $\{g_{421}, g_{431}\}$ do not correspond to the model fault state of the wear of the grinding tool 405 described by the curves {$f_{411}$, $f_{412}$} because waveforms are not similar to each other. As it is shown in FIG. 99, the processed data sets {$g_{431}$, $g_{432}$} correspond to the model fault state of workpiece 404 geometry described by the curves {$f_{411}$, $f_{412}$} because the waveforms are similar to each other.

Figure 100:
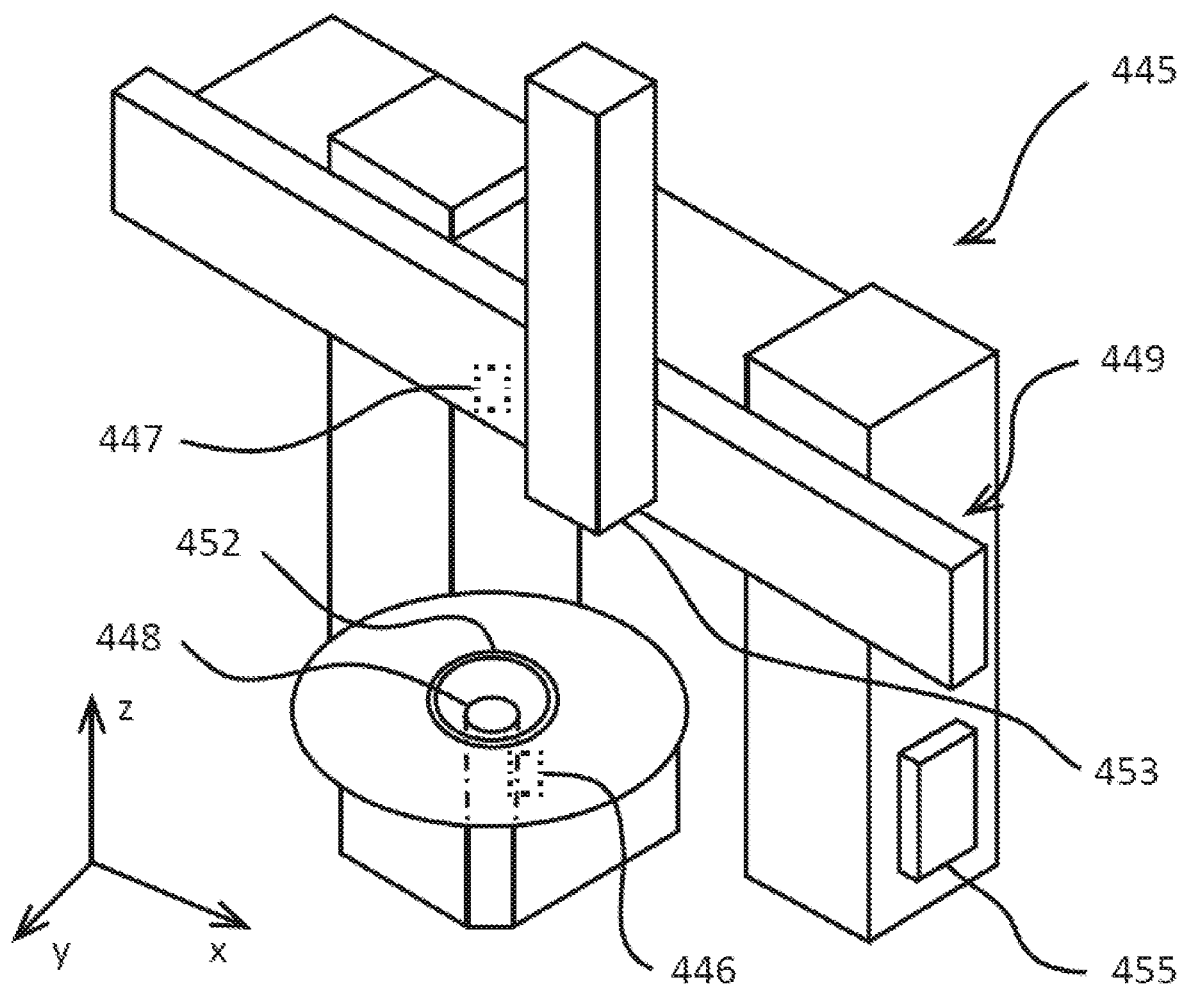
FIG. 100 is a scheme of diagnosed carousel lathe.
Figure 101:
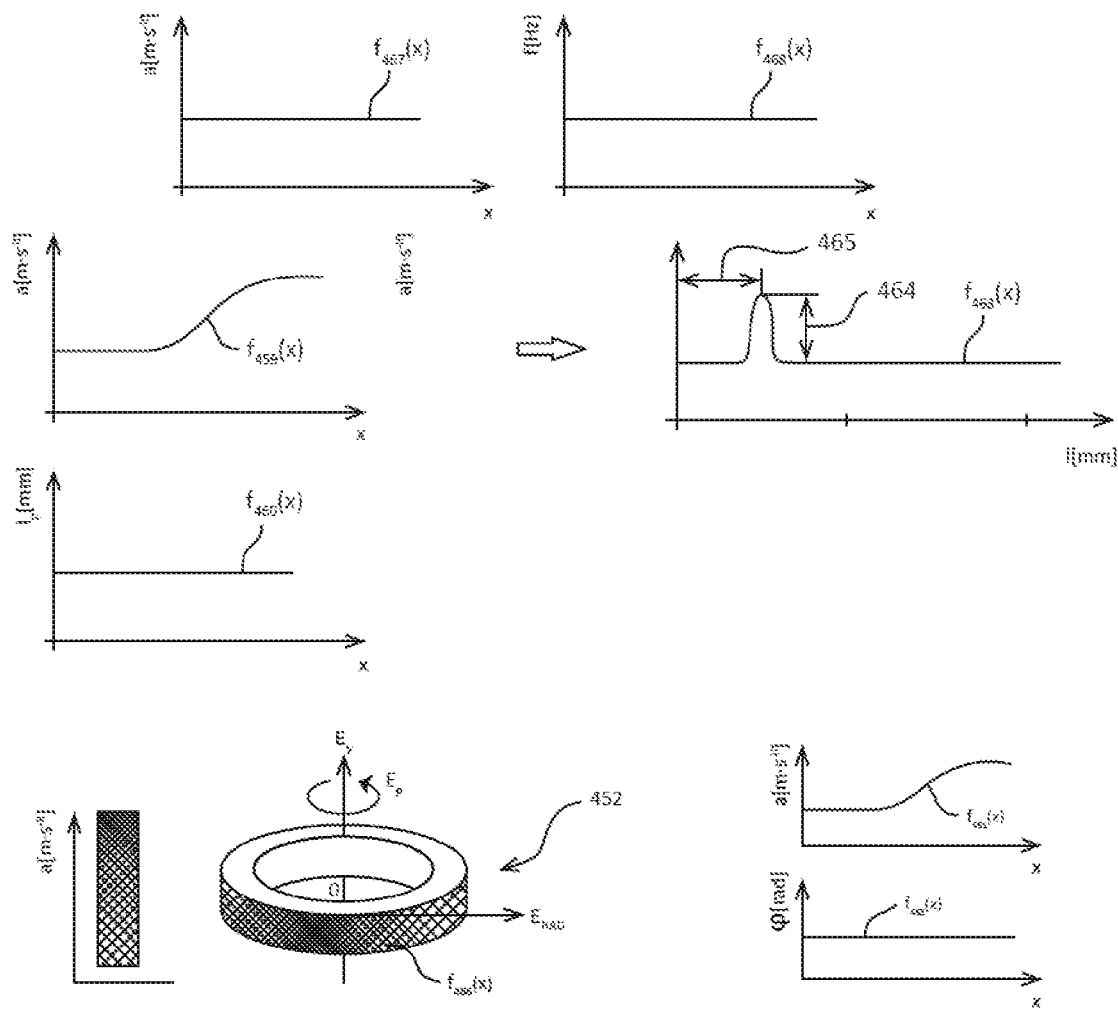
FIG. 101 shows a model fault-free state, a model fault state of a linear guide in the direction of axis x and a model fault state of a workpiece.

In the eleventh specific exemplary embodiment, the machine is a production machine, namely carousel lathe 445 illustrated in FIG. 100. The sensors used are two piezoelectric accelerometers 446, 447 with integrated temperature sensors. The first piezoelectric accelerometer 446 is located on the bed spindle 448. The second piezoelectric accelerometer 446 is located on the linear guide 449 of the crossbar support. The control part of the machine-tool diagnostic system consists of a monitoring unit and a computing device, which is a remote server. The monitoring unit is directly data-connected with the piezoelectric accelerometers 446, 447 and it is further data-connected to the control system of the carousel lathe 445. Information about the position of the crossbar support on the linear guide 449 in the axis x direction, the angular position of a workpiece 452 in relation to the tool 453, and the position of the tool 453 in relation to the workpiece 452 on axis z, are obtained from the carousel lathe 445 control system. In this exemplary embodiment, three model states are stored in the control part memory: a model fault-free state, shown in FIG. 101 and described by the plurality of curves $F_1(x)=\{f_{467}(x), f_{468}(x)\}$ a model fault state of the linear guide 449 in axis x, shown in FIG. 101 and described by the plurality of curves $F_2(x)=\{f_{459}(x), f_{460}(x)\}$, and a model fault state of the workpiece 452, shown in FIG. 101 and described by curves $F_3(x)=\{f_{461}(x), f_{462}(x)\}$. The model fault state of the linear guide 449 in axis x is derived on the basis of theoretical physical description of behaviour of the carousel lathe 445 during operation, where the fault represents a change in amplitude 464 size of the model waveform of the curve $f_{463}$ in the specific fault position 465 of the linear guide 449. The model fault state of the workpiece 452 is derived on the basis of theoretical physical description of the carousel lathe 445 during operation, namely using the Finite Element Method. The measured data from the first piezoelectric accelerometer 446 are marked as $m_1(kT)=\{m_1(1T), \ldots m_1(nT)\}$, the measured data from the second piezoelectric accelerometer 447 are marked as $m_2(kT)=\{m_2(1T), \ldots m_2(nT)\}$, the measured data from the first temperature sensor integrated on the first piezoelectric accelerometer 446 are marked as $m_3(kT)=\{m_3(1T), \ldots, m_3(nT)\}$, the measured data from the second temperature sensor integrated on the second piezoelectric accelerometer 447 are marked as $m_4(kT)=\{m_4(1T), \ldots, m_4(nT)\}$, the data of the angular rotation of the workpiece 452 in relation to the tool 453 are marked as $m_5(kT)=\{m_5(1T), \ldots, m_5(nT)\}$, the data of tool 453 position in relation to the workpiece 452 in axis z are marked as $m_6(kT)=\{m_6(1T), \ldots, m_6(nT)\}$, and the data of tool 452 position in relation to the linear guide 449 in the axis x direction are marked as $m_7(kT)=\{m_7(1T), \ldots, m_7(nT)\}$, wherein n is a number of measured values and T is a measuring period. The first step is a temperature compensation step, wherein temperature compensated data are $m_1(kT)$ and $m_2(kT)$ measured data and they are compensated by the measured data $m_3(kT)$ and $m_4(kT)$. The change in temperature sensitivity is described by the relation $C_A(K)$, wherein K is temperature. The $m_1^\%(kT)$ and $m_2^\%(kT)$ data are obtained by temperature compensation.

$$m_1^\%(kT)=m_1(kT)*\ C_A(m_3(kT))$$

$$m_2^\%(kT)=m_2(kT)C_A(m_4(kT)).$$

The second step is a modification data step by transfer function. Considering that only the first piezoelectric accelerometer 446 is remotely positioned from the source of vibration that occurred during the machining process, the transfer function is applied only to the measured data of the first piezoelectric accelerometer 446. The transfer function is obtained experimentally by impulse responses, wherein the impulse is an impulse from the machining process. In an alternative exemplary embodiment, it is possible as well to create the impulse artificially and monitor its spread throughout the material. To obtain the transfer function, the measured data $m_1^\#(kT)=\{m_1^\#(1T), \ldots, m_1^\#(nT)\}$ are used, wherein n is a number of measured values and T is a measuring period. Scanning of the data starts before the impulse and it finishes with the end of its spread throughout the material. The discrete measured data are transferred into a complex domain by Z-transformation. First, a direct Z-transformation is used according to its prescription:

$$M_i(z) = Z\{m_i(kT)\} = \sum_{k=0}^{n} m_i(kT)z^{-k} = m_i(0) + m_i(T)z^{-1} + m_i(2T)z^{-2} + \ldots$$

The continuous function of a complex variable $M_i(z)$ is obtained from the function $m_i(kT)$ by direct Z-transformation. Then, $M_1^\#(z)$ and $M_p^\#(z)$ may be obtained by substituting $m_1^\#(kT)$ and $m_p^\#(kT)$ into the formula. The $M_p^\#(z)$ data represent the impulse. The measured data from the sensor $M_1^\#(z)$, which is located on the housing of the bed spindle 448 bearing, represent the same impulse, which is influenced by the nature of the system, thus by the transfer function. The transfer function $TF_{1p}(z)$ is obtained by the knowledge of both signals and it can be expressed this way:

$$TF_{1p}(z) = \frac{M_p^\#(z)}{M_1^\#(z)}$$

The application of the transfer function is conducted by multiplying $M_m^\%(z)$ and $TF_{1p}(z)$. It is thus necessary to transfer all the data $m_m^\%(kT)$ by Z-transformation to $M_m^\%(z)$ at first, and the application can then be expressed by the formula:

$$M_m^{TF1p}(z)=(M_m^\%z)TF_{1p}(z)$$

Transfer from the complex domain to the time domain by reverse Z-transformation is performed according to the prescription:

$$m_m^{TF1p}(kT) = Z^{-1}\{M_m^{TF1p}(z)\} = \frac{1}{2\pi j}\oint_C M_m^{TF1p}(z)z^{k-1}dz$$

Figure 102:
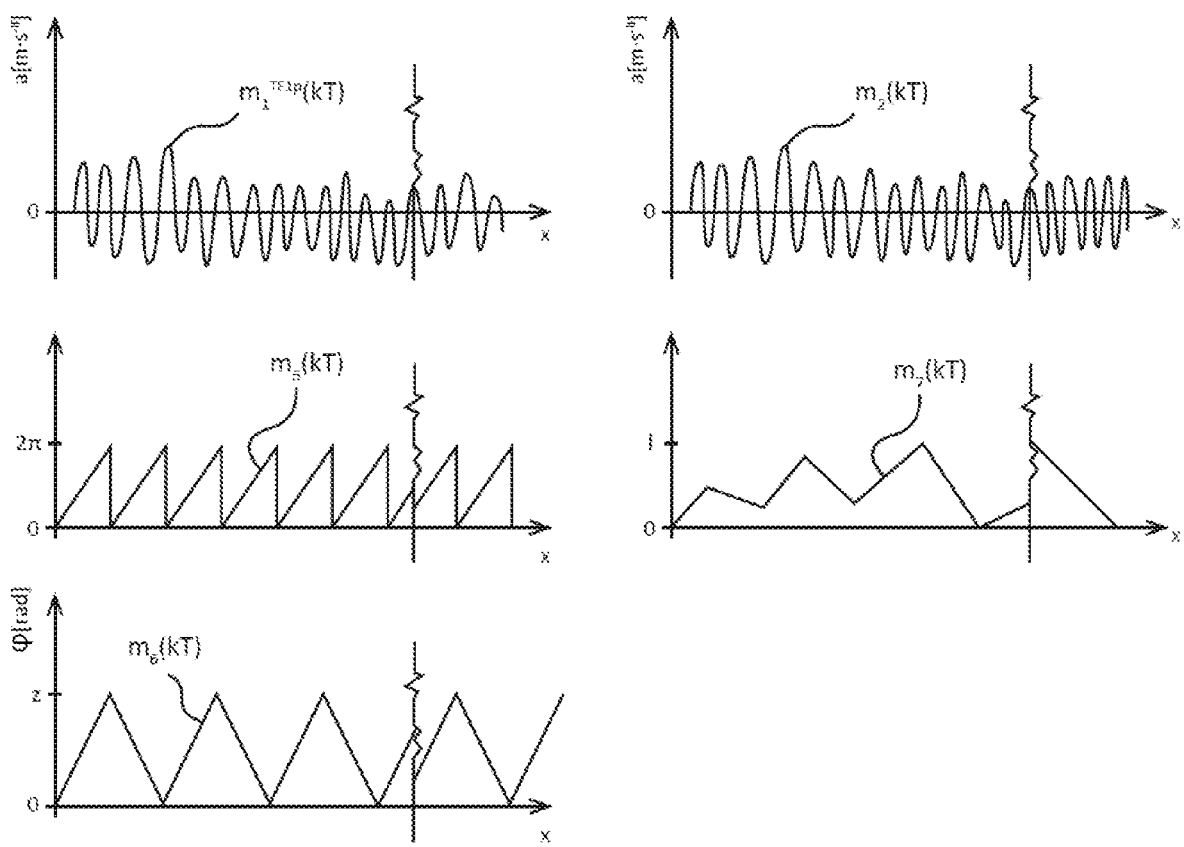
FIG. 102 shows paired data from piezoelectric accelerometers and position sensors.
Figure 103:
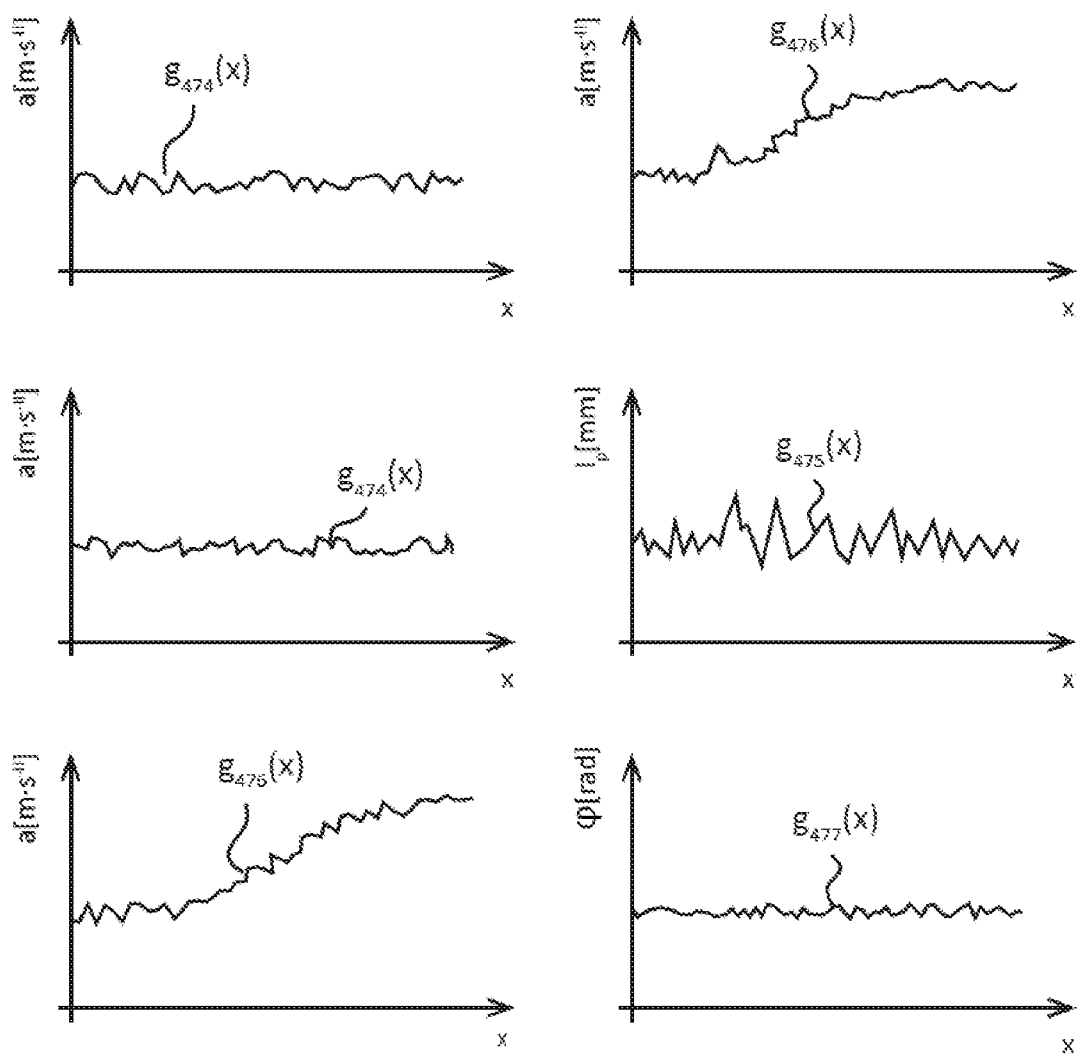
FIG. 103 shows trends of processed data $g_{474}(x)$, $g_{475}(x)$, $g_{476}(x)$, and $g_{477}(x)$.

The curve C includes all poles of the expression $M_m^{TF1p}(z)$ $z^{k-1}$. The third step is a measured data pairing step. In the measured data pairing step, there is a corresponding value $m_5(kT)$ and $m_6(kT)$ assigned to each value $m_1^{TF1p}(kT)$, and a corresponding value $m_7(kT)$ is assigned to each value $m_2(kT)$. Such paired data already carry the information of vibration value in each measuring point. The paired data are shown in FIG. 102. The fourth step is a processed data filtration step, in which the processed data $m_1^{TF1p}(kT)$ are averaged in the same space points determined by the processed position data $m_5(kT)$ and $m_6(kT)$. The processed data $m_2(kT)$ are averaged in the same points determined by the position data $m_7(kT)$. With such filtrated data, suppression of noise occurs, which is high in case of data measured on machine-tools, when data from sufficient number of turns is summed up. The fifth step is the data modification step, in which the processed data are further filtrated by high pass filter with the marginal frequency of 20 kHz. The plurality of G value trends is created from such processed data using the process corresponding to the process of creating model states. The plurality G contains data pluralities $\{g_{474}(x), g_{476}(x)\}$, $\{g_{474}(x), g_{475}(x)\}$, $\{g_{476}(x), g_{477}(x)\}$ shown in FIG. 103. The sixth step is a step of evaluating similarity of the processed data with the model states. Similarity evaluation is in this exemplary embodiment performed by a machine on the basis of inserted knowledge, wherein the input is a plurality of states F consisting of the model states $\{f_{459}(x), f_{460}(x)\}$, $\{f_{461}(x), f_{462}(x)\}$, $\{f_{467}(x), f_{468}(x)\}$ and a plurality of modified data G consisting of the modified data $\{g_{474}(x), g_{476}(x)\}$, $\{g_{474}(x), g_{475}(x)\}$, $\{g_{476}(x), g_{477}(x)\}$. The step of evaluating similarity of the processed data with the model states, in this exemplary embodiment, comprises a processed data normalisation step, in which the plurality G is transformed to the plurality G*, which has the same definition domain and function domain as the functions F. Functions F have the defining domain $Df_i = \langle a_i, b_i \rangle$ and the function domain $Hf_i = \langle \alpha_i, \beta_i \rangle$, wherein i=1, 2, 3. An example of a transformation is the transformation of $g_{474}(t)$ to $g^*_{474}(t)$ according to the formula:

$$g^*_{474} = \frac{g_{474}\left(\frac{t - a_{474}}{b_{474} - a_{474}} * (d_{474} - c_{474}) + c_{474}\right) - \gamma_{474}}{\delta_{474} - \gamma_{474}} (\beta_{474} - \alpha_{474}) + \alpha_{474};$$

$$t \in \langle a, b \rangle$$

Figure 104:
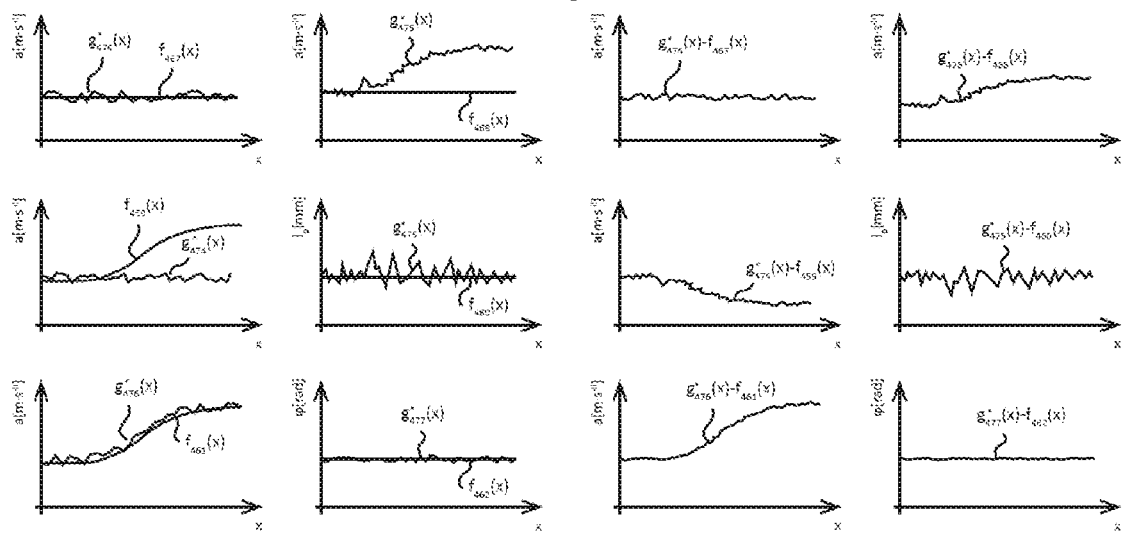
FIG. 104 shows a comparison of waveforms of processed data and model states.

The comparison of the functions is realised by the COM operation, which determines the similarity of the functions:

$$\underset{x \in \langle A, B \rangle}{COM} [F @ G^*] < E,$$

wherein E is a plurality of conditions $\{e_1, e_3, e_3\}$. The comparison of functions can be seen in FIG. 104, wherein in this exemplary embodiment it is evaluated by the COM function that the carousal lathe 445 finds itself in the state of a workpiece 452 geometry fault state and it gives this information to information interface.

Figure 105:
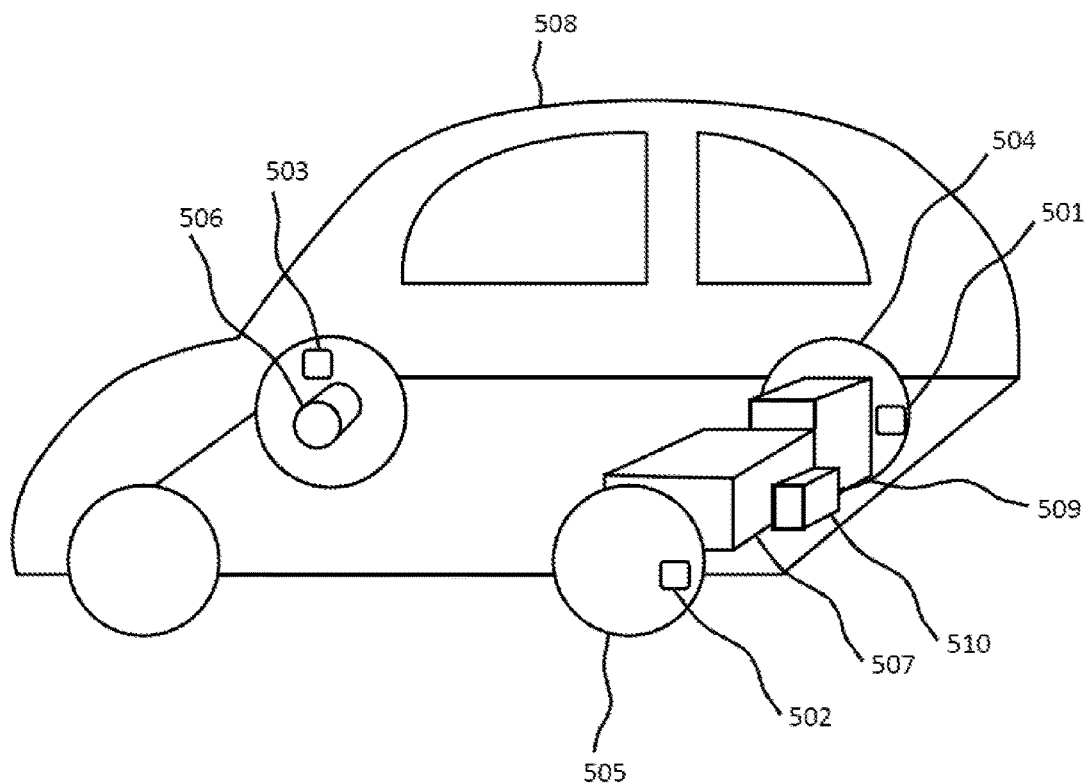
FIG. 105 shows a two-track vehicle.
Figure 106:
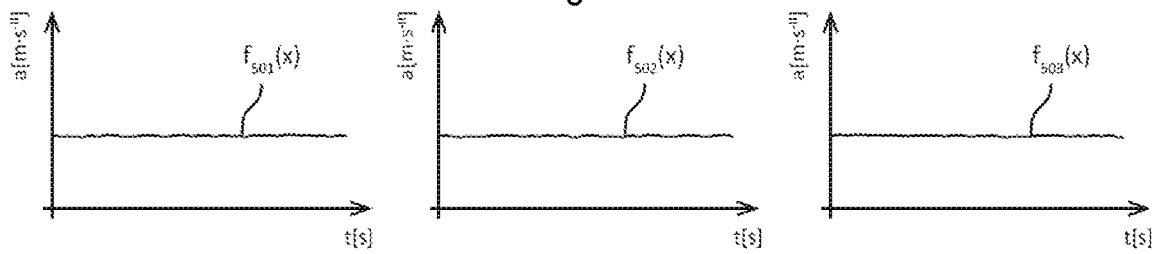
FIG. 106 shows a model fault-free state of a vehicle.
Figure 107:
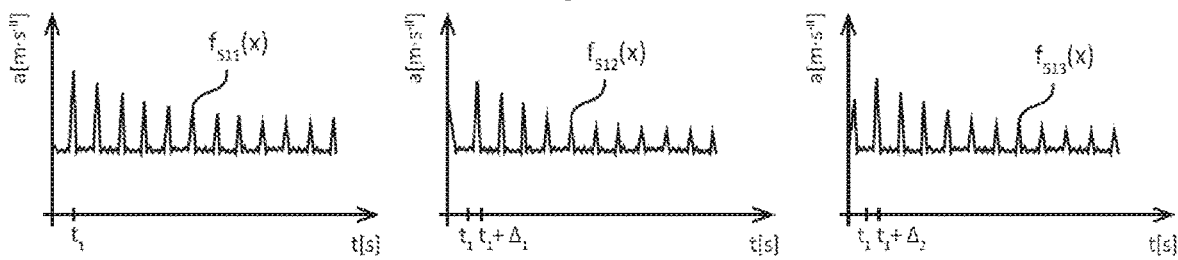
FIG. 107 shows a model fault state of a first axle bearing.
Figure 108:
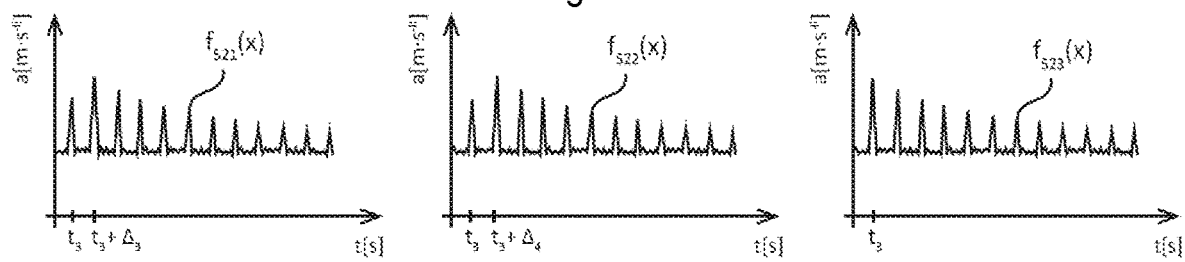
FIG. 108 shows a model fault state of a third axle bearing.

In the twelfth specific exemplary embodiment, the machine is a two-track land vehicle 508, specifically a two-track vehicle with self-supporting body and three axles 504, 505 and 506. Each of the axles 504, 505 and 506 comprises a bearing and a mechanical break, shown in FIG. 105. The two-track vehicle 508 is driven by a drive unit 507 with a transmission device 509. The used sensors, according to this exemplary embodiment, are three piezoelectric accelerometers 501, 502, 503. The first piezoelectric accelerometer 501 is located on the first axle 504, wherein the first axle 504 comprises the first bearing, the second piezoelectric accelerometer 502 is located on the second axle 505, wherein the second axle 505 comprises the second bearing, and the third piezoelectric accelerometer 503 is located on the third axle 506, wherein the third axle 506 comprises the third bearing. The control part includes a monitoring unit 510 and a computing device, which is, in this exemplary embodiment, a remote server. The monitoring unit 510 is directly data-connected with piezoelectric accelerometers 501, 502, 503, and it is further data-connected to the control unit of the two-track vehicle 508. Moreover, five model states are stored in the control part memory in this exemplary embodiment: model fault-free state represented by functions $f_{501}(x)$, $f_{502}(x)$ and $f_{503}(x)$, the waveform of which can be seen in FIG. 106, model fault state of the first bearing represented by functions $f_{511}(x)$, $f_{512}(x)$, $f_{513}(x)$ and where the delay of signal $\Delta_1$ is smaller than the delay of signal $\Delta_2$, the waveform of which can be seen in FIG. 107, model fault state of the second bearing represented by functions $f_{521}(x)$, $f_{522}(x)$, $f_{523}(x)$ and where the delay of signal $\Delta_3$ is smaller than the delay of signal $\Delta_4$, the waveform of which can be seen in FIG. 108, model fault state of the third axle 506 break represented by functions $f_{531}(x)$, $f_{532}(x)$, $f_{533}(x)$ and where the delay of signal $\Delta_5$ is smaller than the delay of signal $\Delta_6$, the waveform of which can be seen in FIG. 109, and model fault state of the transmission device 509 represented by functions $f_{541}(x), f_{542}(x), f_{543}(x)$ and where the delay of signal $\Delta_7$ is smaller than the delay of signal $\Delta_8$ the waveform of which can be seen in FIG. 110. All model states were created on the basis of theoretical physical description of behaviour of the machine 508 during machine operation modified on the basis of previous measuring of the real behaviour of the two-track vehicle 508 during operation of the two-track vehicle 508. The measured data are processed by evaluating process comprising a measured data pairing step and a data modification step. The processed data are represented by functions $g_{101}(x)$, $g_{102}(x)$, $g_{103}(x)$ depicted in FIG. 111, wherein the processing corresponds to the processing of waveforms of model states. Another step of the evaluating process is a step of evaluating the similarity of the processed data and the model states. The step of evaluating the similarity of the processed data and the model states is, in this exemplary embodiment, performed by machine with inserted knowledge. As shown in FIG. 112, the processed data do not correspond to the model fault-free state, as waveforms are not similar to each other. As shown in FIG. 113, the processed data correspond to the model fault state of the third bearing, as waveforms are similar to each other. Based on the results of the comparison, the information is given to the information interface that the two-track vehicle finds itself in the fault state of the second bearing.

Figure 114:
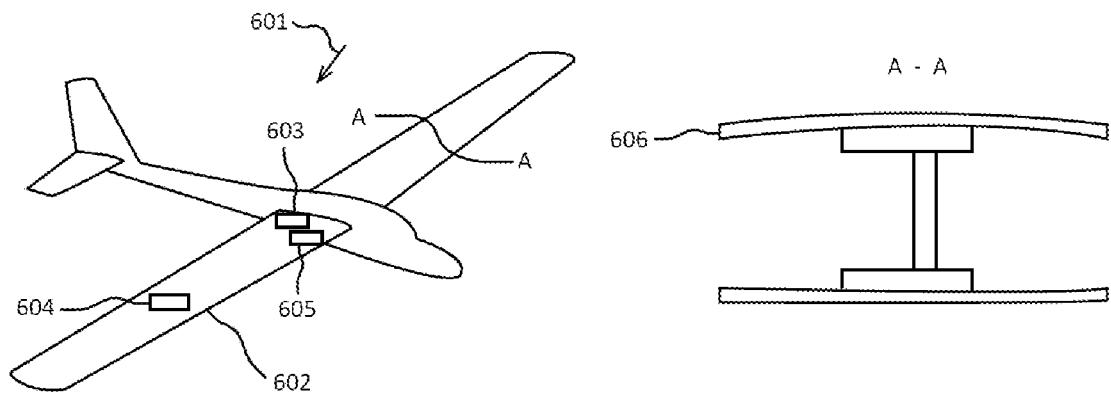
FIG. 114 is a scheme of a plane with sensor location.
Figure 115:
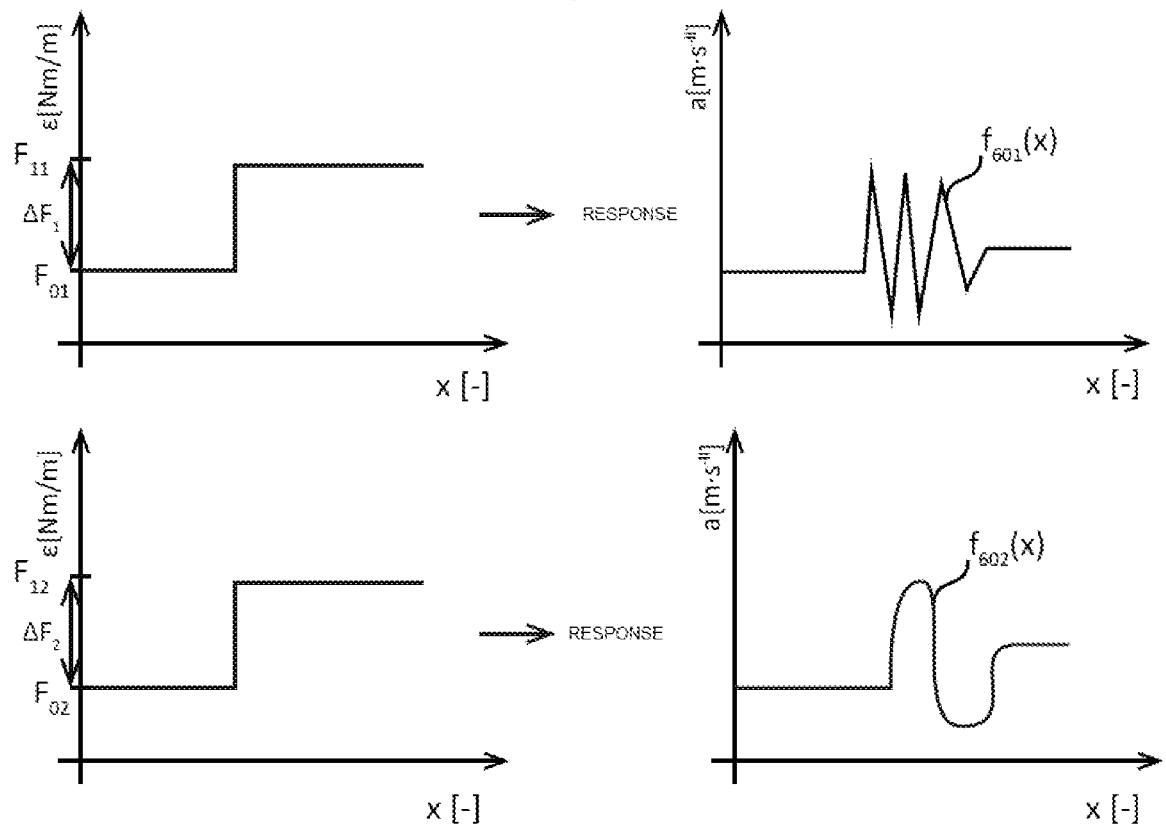
FIG. 115 shows a model fault-free state and a model fault state of a crack in the wing heel.
Figure 116:
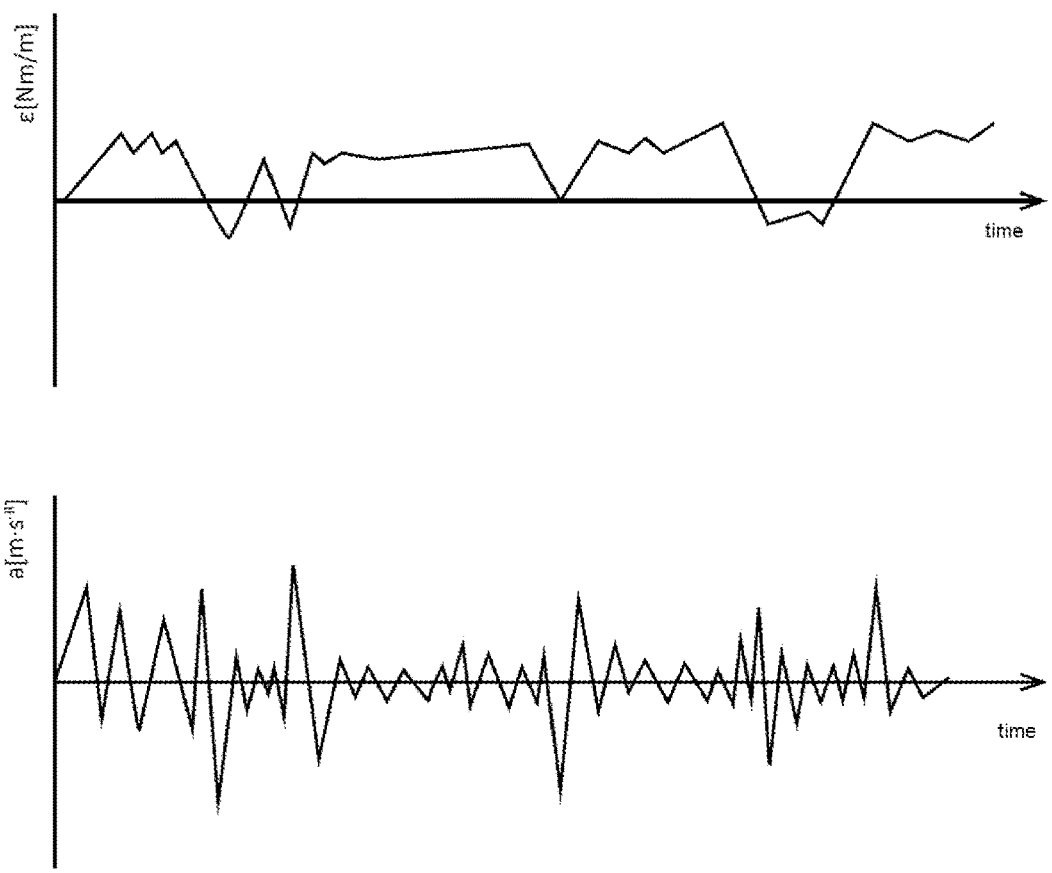
FIG. 116 shows the paired data.
Figure 117:
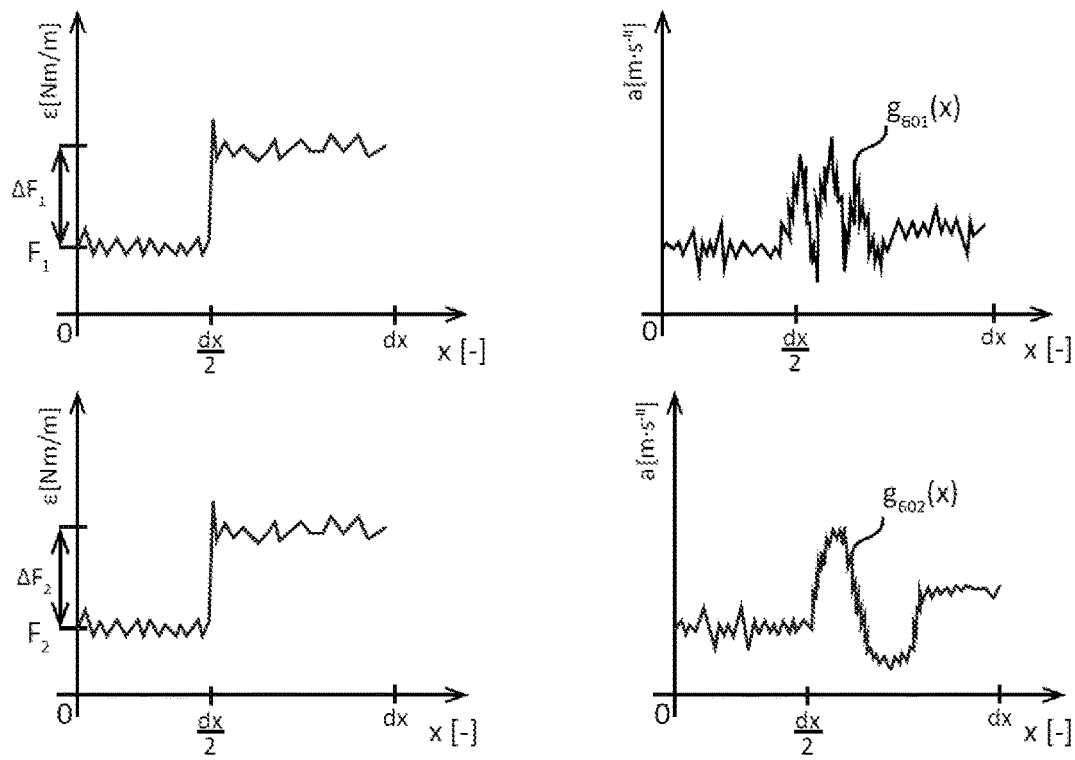
FIG. 117 shows the filtered processed data.

In the thirteenth exemplary embodiment, the machine is an air vehicle, namely an airplane 601, as shown in FIG. 114. The used sensors, according to this exemplary embodiment, are a thin-walled strain sensor 603, a piezoelectric accelerometer 604 and a temperature sensor 605. The thin-walled strain sensor 603 is located on the supporting profile 606 of the wing 602 in the heel of the wing 602, the piezoelectric accelerometer 604 is located on the supporting profile 606 of the wing 602 in the centre of the wing 602, and the temperature sensor 605 is located in the proximity of the thin-walled strain sensor 603. The control part comprises a monitoring unit and a calculating device, which is, in this exemplary embodiment, a control system of the airplane 601. The monitoring unit is directly data-connected with sensors. Further, there are three model states stored in the control part memory in this exemplary embodiment: a model fault-free state, a model fault state of a crack in the wing 602 heel, and a model fault state of a crack in the wing 602 centre. The model fault-free state, the model fault state of a crack in the wing 602 heel, and the model fault state of a crack in the wing 602 centre are derived on the basis of simulation of theoretical physical description of behaviour of the machine 601 during operation, particularly by the Finite Element Method, wherein the wing 602 preload and the size of the changes in forces applied to the wing 602, the size of the crack in the wing 602 heel and the size of the crack in the wing 602 centre, are entered as variables. The output of this simulation is the wing 602 rigidity represented by a system response measured by the piezoelectric accelerometer 604 and described by the function $f_n=f(F, \Delta F, t_1, t_2)$. The function $f_n$ is further divided into pluralities of individual curves of model fault states $\{f_{601}(F_1, \Delta F_1, t_{11}, t_{21}), \ldots, f_{6nn}(F_n, \Delta F_n, t_{1n}, t_{2n})\}$. FIG. 115 shows a model fault state for the values of the power of preload $F_{02}$ and the change in force applied to the wing 602 $\Delta F_2$. FIG. 115 further shows a model fault state of the crack in the wing 602 heel for value of force of preload $F_{01}$, the change of force applied to the wing $\Delta F_1$, and the size of crack $t_{11}$. The measured data from the thin-walled strain sensor 603 are marked as $m_1(kT)=\{m_1(1T), \ldots, m_1(nT)\}$, the measured data from the piezoelectric accelerometer 604 are marked as $m_2(kT)=\{m_2(1T), \ldots, m_2(nT)\}$ and the measured data from the temperature sensor 605 are marked as $m_3(kT)=\{m_3(1T), \ldots, m_3(nT)\}$ wherein n is a number of the measured values and T is a measuring period. The measured data are evaluated by evaluation process, in which the first step is a temperature compensation step, the second step is a measured data pairing step, and the third step is a data modification step. The processed data by the measured data pairing step can be seen in FIG. 116. In the third step, data sections $g_{6nm}$ of the $d_x$ length are searched in the processed data from the thin-walled strain sensor 603. Data sections $g_{6nn}$ capture the change of strain in the size of at least $\Delta F_{min}$ of the original value and of the value before this change, which has a stable state, which is characterised by its maximal standard deviation from the mean $\Delta F_{min}/10$ to at least the period dx/2, and which is characterised by its maximal standard deviation from mean $\Delta F_{min}/10$ to period dx/2, as can be seen in FIG. 117. The processed data from piezoelectric accelerometer 604 are consequently assigned to data sections $g_{6nn}$ as can be seen in FIG. 117. The fourth step is a step of evaluating similarity of the processed data and the model states. The similarity evaluation is performed by machine on the basis of inserted knowledge. The plurality of the processed data $\{g_{601}(F_1, \Delta F_1), \ldots, g_{6nn}(F_n, \Delta F_n)\}$ is compared to the plurality of data describing the model fault-free state, the model fault state of the crack in the wing heel, and the model fault state of the crack in wing centre $\{f_{601}(F_1, \Delta F_1, t_{11}, t_{21}), \ldots, f_{6nn}(F_n, \Delta F_n, t_{1n}, t_{2n})\}$ during the similarity evaluation. Information on whether the machine finds itself in the fault-free state, the fault state of the crack in the wing 602 heel, the fault state of the crack in the wing 602 centre, or in the unknown state, is given to information interface by the control part according to the result of the similarity evaluation.

LIST OF REFERENCE NUMBERS

1—Machine
2—First sensor
3—Second sensor
4—Monitoring unit
5—Computing device
6—Control part
7—Peripheral device
8—Information interface
9—Original notch
10—Enlarged notch
11—First vibration sensor
12—Second vibration sensor
13—Strain with a notch waveform
14—Strain with an enlarged notch waveform
15—Built-in beam
16—Blank
17—Tooth damage
18—First piezoelectric accelerometer
19—Second piezoelectric accelerometer
20—First roller bearing
21—First tool
22—Second roller bearing
23—Second tool
24—First rotary encoder
25—Measured data with temperature compensation waveform
26—Measured data without temperature compensation waveform
27—First accelerometer
28—Second accelerometer
29—Third accelerometer
30—Fourth accelerometer
31—Strain sensor
32—Contact point of the ram and the frame when moving downward
33—Point of the smallest distance between the ram and the frame
34—Contact point of the ram and the frame when moving upward
35—Point of the smallest distance of the dies
36—Ram
37—Frame
38—Roller bearing bedding
39—Lower clamp
40—Upper die
41—Lower die
42—Upper clamp
43—First temperature sensor
44—Second temperature sensor
45—Crankshaft
46—Ram guide on the frame
47—Second rotary encoder
48—Tooth
49—Contact point of the tool and the product
50—Force sensor
51—Distance sensor
52—Ram guide on the ram
53—Fifth accelerometer
54—Crank forging press
401—Grinder
403—Driving spindle
404—Workpiece
405—Tool
406—Grinding spindle bearing
407—Grinding spindle
408—Piezoelectric accelerometer
409—First rotary encoder
410—Second rotary encoder
418—Amplitude size of the model waveform of curve $f_{417}$
419—Angular shaft rotation
424—Amplitude size of the waveform of the model curve $f_{423}$
426—Frequency of workpiece geometry fault
445—Carousel lathe
446 First piezoelectric accelerometer with integrated temperature sensor
447 Second piezoelectric accelerometer with integrated temperature sensor
448 Bed spindle
449 Linear guide of crossbar support
452—Workpiece 453 Grinding tool
464—Amplitude of model waveform of curve $f_{463}$
465—Position of linear guide fault
501—First accelerometer on first axle of two-track vehicle
502—Second accelerometer on second axle of two-track vehicle
503—Third accelerometer on third axle of two-track vehicle
504—First axle of two-track vehicle
505—Second axle of two-track vehicle
506—Third axle of two-track vehicle
507 Driving unit of two-track vehicle
508 Two-track vehicle
509 Transmission device of two-track vehicle
510 Monitoring unit
601 Airplane
602 Airplane wing
603—Thin-walled strain sensor
604—Piezoelectric accelerometer
605—Temperature sensor
606—Supporting airplane wing profile

The invention claimed is:

1. A method of performing technical diagnostics of machines by means of a diagnostic system of machines, the diagnostic system comprising an information interface and a control part, wherein the control part comprises a memory, wherein the diagnostic system of machines further comprises at least a first sensor and a second sensor for placement on a machine selected from a group of vibration sensors, strain sensors, position sensors and distance sensors, in the memory of the control part is further stored a model fault-free state comprising waveforms corresponding to waveforms and quantities measured by the at least first sensor and second sensor in fault-free operation, and further, at least a first model fault state and a second model fault state are stored in the memory of the control part, wherein the first model fault state and the second model fault state comprise waveforms corresponding to waveforms and quantities measured by the at least first sensor and second sensor during a fault in the operation, the method comprising the steps of:
a) sending measured waveforms from the at least first sensor and second sensor to the control part,
b) processing the measured waveforms from the at least first sensor and second sensor in the control part by an evaluation process comprising the steps of:
c) pairing the measured waveforms so that the measured waveforms from individual sensors correspond time-wise and
d) filtering the paired waveforms, wherein waveforms from at least one of the at least first sensor and second sensor are used to set filter parameters for filtering data from at least one other sensor from the at least first sensor and second sensor, wherein the filter parameters comprise a time waveform measured by one of the at least first sensor and second sensor, wherein the time waveform comprises multiple values measured at different times, a filter with these parameters being subsequently applied to a waveform measured by another one of the at least first sensor and second sensor, and the processed waveforms
e) subsequently comparing the processed waveforms to the model states in the control part, and on the basis of this comparison sending information by the control part to the information interface that the machine is in a fault-free state or in at least one of the model fault states.

2. A method of performing technical diagnostics according to claim 1 wherein the evaluation process further comprises a step of waveform modification using a transmission function.

3. A method of performing technical diagnostics according to claim 1 wherein the filter parameters further comprise a kinematic model of the diagnosed machine during operation.

4. A diagnostic system for machines for performing the method according to claim 1, the diagnostic system including
an information interface and
a control part, wherein the control part comprises a memory wherein the diagnostics system for machines comprises at least:
a first sensor and a second sensor for placing on a machine, selected from the group of vibration sensors, strain sensors, position sensors and distance sensors,
further stored in the memory of the control part is:
a fault-free state comprising waveforms corresponding to waveforms and quantities measured by the at least first sensor and second sensor in fault-free operation, and further,
at least a first model fault state and a second model fault state are stored in the memory of the control part, wherein the first model fault state and the second model fault state comprise waveforms corresponding to waveforms and quantities measured by the at least first sensor and second sensor during a fault in the operation.

5. A diagnostic system of machines according to claim 4 wherein it is a diagnostic system of a production machine.

6. A diagnostic system of machines according to claim 4 wherein the model fault-free state is a model fault-free state of a part of the machine, model fault-free state of a tool of the machine, or a model fault-free state of a product of the machine.

7. A diagnostic system of machines according to claim 6 wherein one of the model fault states is any model fault state selected from the group of a model fault state of the part of the machine, a model fault state of the tool or a model fault state of the product.

8. A diagnostic system of machines according to claim 4 wherein at least one of the at least first sensor and second sensor is a vibration sensor and at least one other sensor of the at least first sensor and second sensor is a position sensor.

9. A diagnostic system of machines according to claim 4 wherein at least one of the at least first sensor and second sensor is a vibration sensor and at least one other sensor of the at least first sensor and second sensor is a strain sensor.

10. A diagnostic system of machines according to claim 4 wherein at least two sensors of the at least first sensor and second sensor are vibration sensors.

* * * * *